United States Patent [19]

Kawata et al.

[11] Patent Number: 5,635,105

[45] Date of Patent: Jun. 3, 1997

[54] LIQUID CRYSTAL DISPLAY AND OPTICAL COMPENSATORY SHEET AND PROCESS FOR PREPARATION OF THE SAME

[75] Inventors: Ken Kawata; Masayuki Negoro; Hideyuki Nishikawa; Masaki Okazaki; Hideki Maeta; Koh Kamada, all of Kanagawa, Japan

[73] Assignee: Fuji Photo Film Co., Ltd., Minami-ashigara, Japan

[21] Appl. No.: 440,250

[22] Filed: May 12, 1995

[30] Foreign Application Priority Data

| May 20, 1994 | [JP] | Japan | 6-106846 |
| May 13, 1994 | [JP] | Japan | 6-100077 |
| Oct. 13, 1994 | [JP] | Japan | 6-247936 |

[51] Int. Cl.⁶ ............ C09K 19/52; C09K 19/32; G02F 1/1335; C08F 20/10
[52] U.S. Cl. ............ 252/299.01; 252/299.62; 526/328; 526/319; 349/93; 349/183
[58] Field of Search ............ 252/299.01, 299.62; 526/328, 319; 359/73

[56] References Cited

U.S. PATENT DOCUMENTS

| 4,702,562 | 10/1987 | Scheuble et al. | 359/103 X |
| 4,980,081 | 12/1990 | Ringsdorf et al. | 252/299.01 |
| 5,062,990 | 11/1991 | Yamamoto et al. | 252/299.61 |
| 5,206,752 | 4/1993 | Itoh et al. | 359/106 |
| 5,260,109 | 11/1993 | Iida et al. | 428/1 |
| 5,279,932 | 1/1994 | Miyasaka et al. | 430/495 |
| 5,308,535 | 5/1994 | Scheuble et al. | 252/299.01 |
| 5,326,496 | 7/1994 | Iida et al. | 252/299.01 |
| 5,496,498 | 3/1996 | Toyooka et al. | 252/299.01 |

*Primary Examiner*—C. H. Kelly
*Attorney, Agent, or Firm*—Burns, Doane, Swecker & Mathis, LLP

[57] ABSTRACT

Disclosed are a liquid crystal display provided with an optical compensatory sheet comprising an optically anisotropic layer which has negative birefringence and comprises a polymer having a discotic structure in its molecule, and an optical compensatory sheet which comprises a transparent support, an orientation layer provided thereon and the optically anisotropic layer provided on the orientation layer. Further, a process for preparation of the optical compensatory sheet and a liquid crystal composition which is useful as material for preparing the optical compensatory sheet are also disclosed.

13 Claims, 3 Drawing Sheets

LIQUID CRYSTAL DISPLAY AND OPTICAL COMPENSATORY SHEET AND PROCESS FOR PREPARATION OF THE SAME

BACKGROUND OF THE INVENTION

1. Field of the Invention

The present invention relates to a liquid crystal display, an optical compensatory sheet which is useful for preparing the liquid crystal display, a process for preparation of the optical compensatory sheet, a liquid crystalline composition which is useful as material for the optical compensatory sheet and a compound which is useful for the liquid crystalline composition.

2. Description of Prior Art

As a display for electronic office system-devices such as a desk-top personal computer and a word processor, CRT (cathode ray tube) has been employed so far. Recently, a liquid crystal display (hereinafter referred to as LCD) is widely employed instead of the CRT because of its thin thickness, light weight and low power consumption. LCD generally has a structure that a liquid crystal cell is disposed between a pair of polarizing sheets. Most of LCD use a twisted nematic liquid crystal. Operational mode of LCD using the twisted nematic liquid crystal is roughly divided into birefringence mode and optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large volume by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing angle to a liquid crystal display, and its display characteristics are not comparable to display characteristics of CRT.

In order to improve the viewing angle characteristics (i.e. to enlarge the viewable angle), arrangement of a phase difference film (optical compensatory sheet) between a pair of polarizing plates and TN liquid crystal cell has been proposed by Japanese Patent Provisional Publications No. 4(1992)-229828 and No. 4(1992)-258923.

The optical compensatory sheets proposed in these Publications show no optical effect when a liquid crystal display is seen from the direction vertical to a screen of the display because phase difference in the direction perpendicular to a surface of the liquid crystal display is almost zero. However, the optical compensatory sheet serves for compensation of phase difference (depending upon wavelengths of light) that occurs when the liquid crystal display is viewed from an oblique direction. The phase difference results in unfavorable viewing angle characteristics such as coloring and disappearance of displayed image.

It is known that the optical compensatory sheet is needed to have negative birefringenece for compensating positive birefringence of twisted nematic liquid crystal and an inclined optic axis.

Japanese Patent Provisional Publications No. 4(1992)-113301, No. 5(1993)-80323 and No. 5(1993)-157913 disclose an optical compensatory sheet having the negative birefringence and inclined optic axis. In more detail, the disclosed sheet is made of polymer having a polymer chain whose optic axis or an optical elastic axis is inclined from a surface of a liquid crystal cell, and is prepared by slicing obliquely a uniaxial polycarbonate film. Therefore an optical compensatory sheet of a large area cannot be easily prepared according to the disclosed process.

It is also known that an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993-)-215921 discloses the use of a birefringence plate (optical compensatory sheet) comprising a support and a polymerizable lod-like compound showing liquid crystal property and positive birefringence. The birefringence plate is prepared by coating a solution of the compound on the support and curing the compound under heating. However, the cured layer dose not show negative birefringence. Hence, the resulting compensatory sheet scarcely enlarges the viewing angle from all directions.

SUMMERY OF THE INVENTION

It is an object of the present invention to provide an optical compensatory sheet which has an enlarged viewing angle and can be easily prepared.

It is another object of the invention to provide an optical compensatory sheet which has the negative birefringence and inclined optic axis and can be easily prepared.

It is a further object of the invention to provide a liquid crystal display provided with a optical compensatory sheet which has an enlarged viewing angle.

It is a further object of the invention to provide a process which can be advantageously utilized for preparation of the optical compensatory sheet having the negative birefringence and inclined optic axis.

There is provided by the invention an optical compensatory sheet which comprises a transparent support, an orientation layer provided thereon and an optically anisotropic layer provided on the orientation layer, wherein the optically anisotropic layer has negative birefringence and comprises a polymer having a discotic structure in its molecule.

Preferred embodiments of the optical compensatory sheet of the invention are as follows:

1) The optical compensatory sheet wherein the polymer is a homopolymer of a polymerizable discotic compound having liquid crystalline property.

2) The optical compensatory sheet wherein the polymer is a copolymer of a polymerizable discotic compound having liquid crystalline property and at least one of a polymerizable discotic compound having no liquid crystalline property and a polymerizable non-discotic compound (preferably ratio of the former and the latter is 99:1 to 50:50, especially 99:1 to 80:20 (former:latter), by weight).

3) The optical compensatory sheet described above 1) or 2), wherein the polymerizable discotic compound having liquid crystalline property is at least one compound having liquid crystalline property selected from the group consisting of compounds having the formula (8):

$$(B)_{n5}D5(L5\text{—}P5)_{k5} \quad (3)$$

wherein D5 represents a triphenylene ring, a truxene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene, B represents a group having no reactivity, P5 represents an isocyanato group, a thiocyanato group, an amino group, an alkylamino group, an arylamino group, a mercapto group, a formyl group, an acyl group, a hydroxy group, a carboxyl group, a sulfo group, a phosphoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L5 represents a divalent connective group for linking D5 to P5, n5 represents an integer of 0 to 7 and k5 represents an integer of 1 to 8, under the condition of n5+k5≦8.

4) The optical compensatory sheet described above 3), wherein D5 represents a triphenylene ring.

5) The optical compensatory sheet described above 1) or 2), wherein the polymerizable discotic compound having liquid crystalline property has the formula (1), (2) or (3):

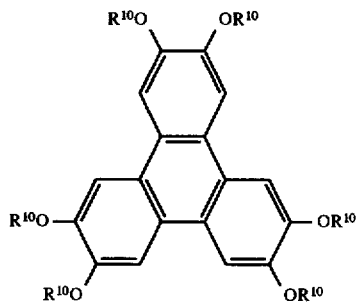

(1)

wherein $R^{10}$ is the following group:

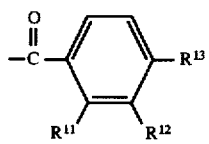

in which each of $R^{11}$ and $R^{12}$ represents independently a hydrogen atom or a methyl group, and $R^{13}$ represents an alkoxy group of 1 to 12 carbon atoms or the following group:

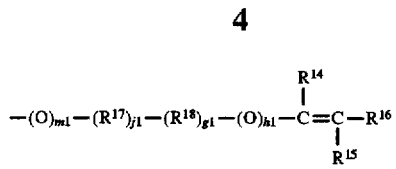

in which m1 represents 0 or 1, $R^{17}$ represents an alkyleneoxy group of 1 to 6 carbon atoms, j1 represents an integer of 0 to 4, $R^{18}$ represents an alkylene group of 1 to 12 carbon atoms, g1 represents an integer of 0 to 4, h1 represents 0 or 1, and each of $R^{14}$, $R^{15}$ and $R^{16}$ represents independently a hydrogen atom or an alkyl group of 1 to 12 carbon atoms;

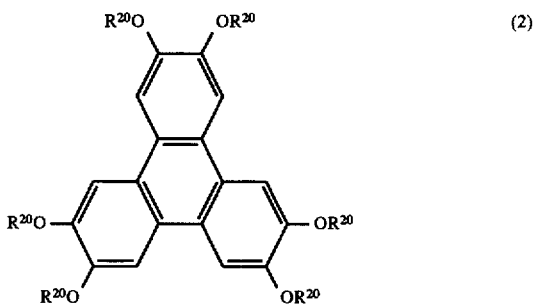

(2)

wherein $R^{20}$ is the following group:

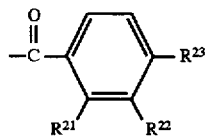

in which each of $R^{21}$ and $R^{22}$ represents independently a hydrogen atom or a methyl group, and $R^{23}$ represents an alkoxy group of 1 to 12 carbon atoms or the following group:

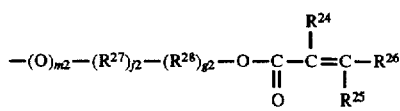

in which m2 represents 0 or 1, $R^{27}$ represents an alkyleneoxy group of 1 to 6 carbon atoms, j2 represents an integer of 0 to 4, $R^{28}$ represents an alkylene group of 1 to 12 carbon atoms, g2 represents an integer of 0 to 4, and each of $R^{24}$, $R^{25}$ and $R^{26}$ represents independently a hydrogen atom or an alkyl group of 1 to 12 carbon atoms;

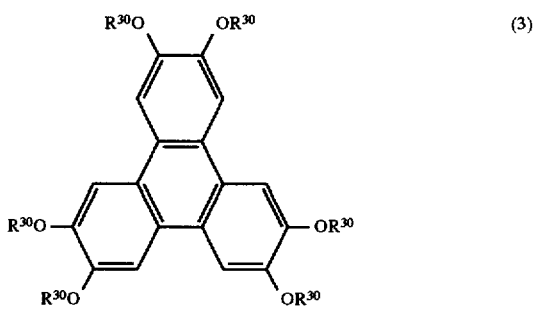

(3)

wherein R³⁰ is the following group:

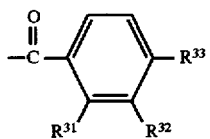

in which each of R³¹ and R³² represents independently a hydrogen atom or a methyl group, and R³³ represents an alkoxy group of 1 to 12 carbon atoms or the following group:

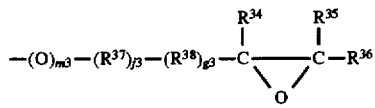

in which m3 represents 0 or 1, R³⁷ represents an alkyleneoxy group of 1 to 6 carbon atoms, j3 represents an integer of 0 to 4, R³⁸ represents an alkylene group of 1 to 12 carbon atoms, g3 represents an integer of 0 to 4, and each of R³⁴, R³⁵ and R³⁶ represents independently a hydrogen atom or an alkyl group of 1 to 12 carbon atoms.

6) The optical compensatory sheet described above 2), wherein said at least one of a polymerizable discotic compound having no liquid crystalline property and a polymerizable non-discotic compound is at least one compound having no liquid crystalline property selected from the group consisting of compounds having the formula (9):

(9)

wherein D6 represents a benzene ring, a naphthalene ring, an anthracene ring, a pyrene ring, a phenanthrene ring, a truxene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene, E represents a group having no reactivity, P6 represents an isocyanato group, a thiocyanato group, an amino group, an alkylamino group, an arylamino group, a mercapto group, a formyl group, an acyl group, a hydroxy group, a carboxyl group, a sulfo group, a phsophoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L6 represents a divalent connective group for linking D6 to P6, n6 represents an integer of 0 to 7 and k6 represents an integer of 1 to 8, under the condition of n6+k6≦8.

7) The optical compensatory sheet described above 6), wherein D6 represents a benzene ring, a naphthalene ring, a benzene ring, a naphthalene ring, an anthracene ring, a pyrene ring or a phenanthrene ring.

8) The optical compensatory sheet described above 2), wherein the polymerizable non-discotic compound has the formula (4), (5) or (6):

(4)

wherein D1 represents a benzene ring or naphthalene ring, X represents a hydrogen atom, an alkyl group of 1 to 12 carbon atoms or an alkoxy group of 1 to 12 carbon atoms, k1 represents 1, 2 or 3 under the condition of n1+k1=6 when D1 represents a benzene ring and k1 represents 1, 2 or 3 under the condition of n1+k1=6 when D1 represents a naphthalene ring, s1 represents 0 or 1, L1 is the following group:

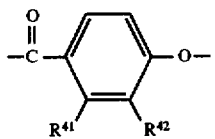

in which each of R⁴¹ and R⁴² represents independently a hydrogen atom or a methyl group, and P1 represents the following group:

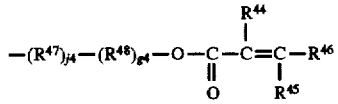

in which R⁴⁷ represents an alkyleneoxy group of 1 to 6 carbon atoms, j4 represents an integer of 0 to 4, R⁴⁸ represents an alkylene group of 1 to 12 carbon atoms, g4 represents an integer of 0 to 4, and each of R⁴¹, R⁴⁵ and R⁴⁶ represents independently a hydrogen atom or an alkyl group of 1 to 12 carbon atoms;

(5)

wherein D2 represents a benzene ring or naphthalene ring, Y represents a hydrogen atom, an alkyl group of 1 to 12 carbon atoms or an alkoxy group of 1 to 12 carbon atoms, k2 represents 1, 2 or 3 under the condition of n2+k2=6 when D2 represents a benzene ring and k2 represents 1, 2 or 3 under the condition of n2+k2=6 when D2 represents a naphthalene ring, s2 represents 0 or 1, L2 is the following group:

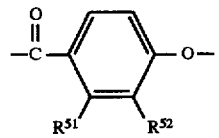

in which each of R⁵¹ and R⁵² represents independently a hydrogen atom or methyl group, and P2 represents the following group:

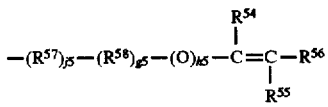

in which R⁵⁷ represents an alkyleneoxy group of 1 to 6 carbon atoms, j5 represents an integer of 0 to 4, R⁵⁸ represents an alkylene group of 1 to 12 carbon atoms, g5 represents an integer of 0 to 4, h5 represents 0 or 1, and each of R⁵⁴, R⁵⁵ and R⁵⁶ represents independently a hydrogen atom or an alkyl group of 1 to 12 carbon atoms;

(6)

wherein D3 represents a benzene ring or naphthalene ring, Z represents a hydrogen atom, an alkyl group of 1 to 12 carbon atoms or an alkoxy group of 1 to 12 carbon atoms, k3 represents 1, 2 or 3 under the condition of n3+k3=6 when D3 represents a benzene ring and k2 represents 1, 2 or 3 under the condition of n3+k3=6 when D3 represents a naphthalene ring, s3 represents 0 or 1. L3 is the following group:

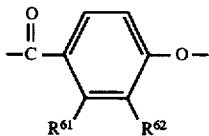

in which each of $R^{61}$ and $R^{62}$ represents independently a hydrogen atom or methyl group, and P3 represents the following group:

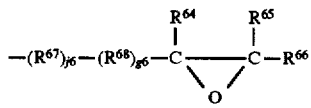

in which $R^{67}$ represents an alkyleneoxy group of 1 to 6 carbon atoms, j6 represents an integer of 0 to 4, $R^{68}$ represents an alkylene group of 1 to 12 carbon atoms, g6 represents an integer of 0 to 4, and each of $R^{64}$, $R^{65}$ and $R^{66}$ represents independently a hydrogen atom or an alkyl group of 1 to 12 carbon atoms.

9) The optical compensatory sheet wherein the orientation layer is a polymer layer which has been subjected to rubbing treatment.

10) The optical compensatory sheet wherein the orientation layer is prepared by obliquely depositing an inorganic compound on the support.

11) The optical compensatory sheet wherein the optic axis is inclined from the normal of the sheet.

12) The optical compensatory sheet wherein the transparent support has a light transmittance of not less than 80%, shows optically isotropy on the plane of the film, and satisfies the condition of:

$$30 \leq [(nx+ny)/2-nz] \times d \leq 150$$

in which fix and ny are main refractictive indices on the plane of the support, nz is a main refractive index in the thickness direction, and d is the thickness of the film, unit of d being nm.

The optical compensatory sheet can be advantageously obtained by a process which comprises the steps of:

coating a solution which contains a polymerizable discotic compound having liquid crystalline property, or a polymerizable discotic compound having liquid crystalline property and at least one of a polymerizable discotic compound having no liquid crystalline property and a polymerizable non-discotic compound on an orientation layer provided on a transparent support to form a coated layer, heating the coated layer to temperature for forming the discotic nematic phase, radiating light on the coated layer to cure, and cooling the cured layer.

Otherwise, the optical compensatory sheet can be obtained by a process comprising the steps of:

casting a solution containing a polymer having a discotic structure in its molecule on a support to form a film, and squeezing the film between two rolls having different peripheral speeds from each other to give shearing stress between both sides of the sheet.

Further, there is provided by the invention a liquid crystal display comprising a liquid crystal cell which comprises a pair of substrates provided with a transparent electrode and twist-oriented or super twist-oriented nematic liquid crystal sealed therebetween, a pair of polarizing sheets arranged on both sides of the cell, and an optical compensatory sheet provided between the liquid crystal cell and the polarizing sheet;

wherein the optical compensatory sheet comprises an optically anisotropic layer having negative birefringence which comprises a polymer having a discotic structure in its molecule.

Preferred embodiments of the liquid crystal display of the invention are as follows:

1) The liquid crystal display wherein the polymer is a homopolymer of a polymerizable discotic compound having liquid crystalline property.

2) The liquid crystal display wherein the polymer is a copolymer of a polymerizable discotic compound having liquid crystalline property and at least one of a polymerizable discotic compound having no liquid crystalline property and a polymerizable non-discotic compound.

3) The liquid crystal display wherein the optically anisotropic layer is provided on a transparent support.

4) The liquid crystal display wherein an orientation layer is provided between the transparent support and the layer having negative birefringence.

5) The liquid crystal display as described above 1) or 2), wherein the polymerizable discotic compound having liquid crystalline property is at least one compound having liquid crystalline property selected from the group consisting of compounds having the formula (8):

$$(B)_{n5}D5(L5—P5)_{k5} \qquad (8)$$

wherein D5 represents a triphenylene ring, a truxene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene, B represents a group having no reactivity, P5 represents an isocyanato group, a thiocyanato group, an amino group, an alkylamino group, an arylamino group, a mercapto group, a formyl group, an acyl group, a hydroxy group, a carboxyl group, a sulfo group, a phosphoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L5 represents a divalent connective group for linking D5 to P5, n5 represents an integer of 0 to 7 and k5 represents an integer of 1 to 8, under the condition of n5+k5≦8.

Furthermore, there is provided by the invention a liquid crystalline composition which comprises a polymerizable discotic compound having liquid crystalline property and a polymerizable non-discotic compound (preferably, ratio of the former and the latter is 99:1 to 50:50, especially 99:1 to 80:20 (former:latter), by weight).

Preferred embodiments of the liquid crystalline composition of the invention are as follows:

1) The liquid crystalline composition wherein the polymerizable discotic compound has the formula (1), (2) or (3) as defined above.

2) The liquid crystalline composition wherein the a polymerizable non-discotic compound having no liquid crystalline property has the formula (4), (5) or (6) as defined above.

Moreover, there is provided by the invention a compound having the formula (7):

$(Q)_{n4}D4(O-L4-P4)_{k4}$ (7)

wherein D4 represents a benzene ring or naphthalene ring, Q represents a hydrogen atom, an alkyl group of 1 to 12 carbon atoms or an alkoxy group of 1 to 12 carbon atoms, k4 represents 1, 2 or 3 under the condition of n4+k4=6 when D4 represents a benzene ring and k4 represents 1, 2 or 3 under the condition of n4+k4=8 when D4 represents a naphthalene ring, L4 is the following group:

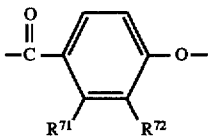

in which each of $R^{71}$ and $R^{72}$ represents independently a hydrogen atom or a methyl group, and P4 represents the following group:

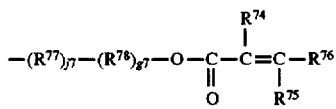

which $R^{77}$ represents an alkyleneoxy group of 1 to 6 carbon atoms, j7 represents an integer of 0 to 4, $R^{78}$ represents an alkylene group of 1 to 12 carbon atoms, g7 represents an integer of 0 to 4, and each of $R^{74}$, $R^{75}$ and $R^{76}$ represents independently a hydrogen atom or an alkyl group of 1 to 12 carbon atoms.

Further, there is provided by the invention a compound having the formula (10):

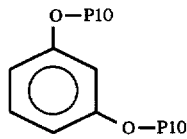 (10)

wherein P10 represents the following group:

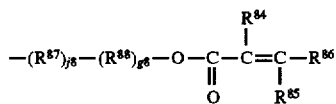

which $R^{87}$ represents an alkyleneoxy group of 1 to 6 carbon atoms, j8 represents an integer of 0 to 4, $R^{88}$ represents an alkylene group of 1 to 12 carbon atoms, g8 represents an integer of 0 to 4, and each of $R^{84}$, $R^{85}$ and $R^{86}$ represents independently a hydrogen atom or an alkyl group of 1 to 12 carbon atoms.

The liquid crystal display of the invention is provided with an optical compensatory sheet which has negative birefringence and comprises a polymer having a discotic structure in its molecule. The display is improved in viewing characteristics such as coloring of a displayed image and reversing of black-and-white image when the viewing direction to the liquid crystal display is greatly inclined from the normal to a surface of the screen.

The optical compensatory sheet of the invention has a structure that an optically anisotropic layer which has negative birefringence and comprises a polymer having a discotic structure in its molecule is formed on the orientation layer provided on a transparent support, Therefore, the optical compensatory sheet is, in the case of providing a liquid crystal cell with the sheet, capable of greatly enlarging viewing angle. Further, the sheet shows excellent heat resistance and good durability in environment of high temperature because the layer is formed of a polymer having discotic structure, i.e., the layer contain a discotic liquid crystalline compound (monomer).

Particularly, in the case that the optical compensatory sheet has an optically anisotropic layer prepared by coating a solution of polymerizable compounds containing the polymerizable discotic compound having liquid crystalline property, on an orientation layer provided on a transparent support to form a coated layer, heating the coated layer to temperature for forming the discotic nematic phase, radiating light on the coated layer to cure, the resultant optical compensatory sheet is capable of greatly enlarging viewing angle and has excellent heat-resistance because the layer having negative birefringenece and inclined optic axis from the normal of the layer is cured.

Further, in the case employing, as the polymerizable compound, the polymerizable discotic compound and at least one of a polymerizable discotic compound having no liquid crystalline property and a polymerizable non-discotic compound, heat-treatment for orientation of the discotic compounds can be performed at lower temperature by using the above two kinds of compounds. Therefore, inclined angle of the discotic compound can be controlled under heating at low temperatures without imparting damage to the transparent support or the optically anisotropic layer.

Thus, the optical compensatory sheet of the invention has excellent viewing characteristics, satisfactory heat-resistance and durability at high temperatures.

DETAILED DESCRIPTION OF THE INVENTION

Figure 1:
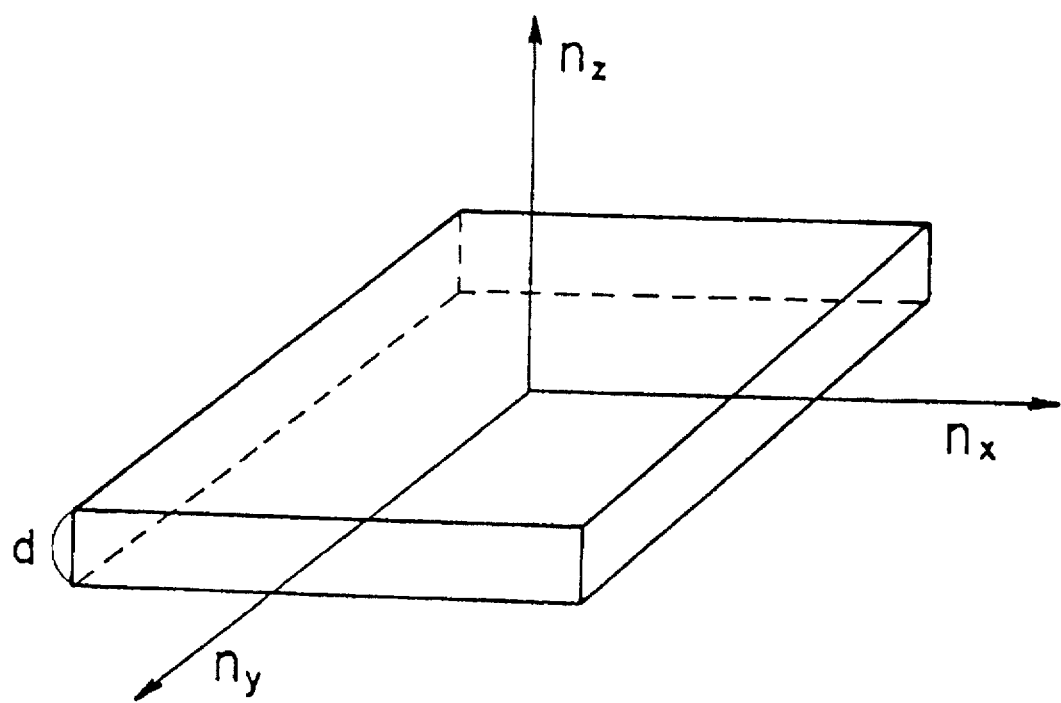
FIG. 1 is a view schematically showing the refractive indices of the three axes of the transparent film of the invention.

The liquid crystal display of the invention is provided with an optical compensatory sheet comprising an optically anisotropic layer which has negative birefringence and comprises a polymer having a discotic structure in its molecule. The optical compensatory sheet can be composed of only an optically anisotropic layer. Generally, the sheet of the invention has a basic structure comprising a transparent support, an orientation layer provided thereon and the optically anisotropic layer provided on the orientation layer. The polymer of the optically anisotropic layer is a homopolymer of a polymerizable discotic compound having liquid crystalline property or copolymer of polymerizable compounds containing the polymerizable discotic compound.

Examples of the discotic liquid crystalline compounds include benzene and triphenylene derivatives described in C. Destrade et al., Mol. Cryst. vol. 71, pp. 111, 1981, truxene derivatives described in C. Destrade et al., Mol Cryst. vol. 122, pp. 141, 1985, Physics lett. A, vol. 78, pp. 82, 1980, cyclohexane derivatives described in B. Kohn et al., Angew. Chem. vol. 96, pp. 70, 1984, macrocyclic compounds of azacrown-type or phenylacetylene-type described in J. M.

Lehn et al., J. Chem. Commun. pp. 1794, 1985, and J. Zhang et al., J. Am. Chem. Soc. vol. 116, pp. 2655, 1994. The discotic liquid crystal generally has a structure that the above compound is located at a center of the crystal as a parent core and further straight chain groups such as alkyl, alkoxy and benzoyl having a substituent are radially bonded to the compound. Further, discotic liquid crystals of organometallic complex are described in Chemistry of Liquid Crystal, Elements of Chemistry, vol. 22, pp. 135, 1994, The Chemical Society of Japan. These discotic liquid crystals have a structure that a metal atom in the center of a molecule is surrounded on the same plane by its ligands, and therefore the crystals are considered to have discotic liquid crystalline property.

The discotic liquid crystalline compound generally has negative birefringence. The invention has been attained by utilizing the negative birefringence of a polymer of the discotic liquid crystalline compound. Therefore, the optically compensatory sheet of the invention comprises the polymer having discotic structure.

The optically anisotropic layer of the optically compensatory sheet can be, for example, prepared by the steps of: coating a solution which contains a polymerizable discotic compound having liquid crystalline property, or a polymerizable discotic compound having liquid crystalline property and at least one of a polymerizable discotic compound having no liquid crystalline property and a polymerizable non-discotic compound; heating the coated layer to temperature for forming the discotic nematic phase; radiating light on the coated layer or applying heat to the coated layer to cure, and cooling the cured layer.

Otherwise, the optically anisotropic layer can be prepared by the steps of: coating a solution which contains a solution of the polymer in an organic solvent on an orientation layer provided on a transparent support to form a coated layer; heating the coated layer to a temperature for forming the discotic nematic phase; and cooling the layer.

Hence, the polymer is generally obtained by polymerization of compounds containing a polymerizable discotic compound having liquid crystalline property. However, the polymer may be one obtained by reaction of the discotic compound with a polymer having functional groups capable of reacting with the discotic compound.

The polymerizable discotic compound having liquid crystalline property generally is a compound having the formula (8):

$$(B)_{n5}D5(L5—P5)_{k5} \qquad (8)$$

wherein D5 represents a triphenylene ring, a truxene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene. B represents a group having no reactivity, P5 represents an isocyanato group, a thiocyanato group, an amino group, an alkylamino group, an arylamino group, a mercapto group, a formyl group, an acyl group, a hydroxy group, a carboxyl group, a sulfo group, a phosphoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L5 represents a divalent connective group for linking D5 to P5, n5 represents an integer of 0 to 7 and k5 represents an integer of 1 to 8, under the condition of n5+k5≦8.

P5 preferably is mercapto, formyl, hydroxy, halocarbonyl, acryloyl, vinyloxy or epoxy.

B generally is alkyl, alkoxy, oligo-oxyethylene (group in which plural oxyethylenes are combined), acyl, acyloxy, benzoyloxy or benzoyl. The compound of the formula (8) has B of the number of n5, and one of groups represented by B may be combined to a group (represented by B) adjacent to said group (of B) to form a ring so long as the compound has one or two side chain radially bonded to D5.

L5 represents a divalent connective group for linking D5 with P5. Examples of the divalent connective group include an alkylene group (e.g., ethylene, propylene, butylene, pentylene, hexylene, heptylene, octylene or nonylene), an alkyleneoxy group (e.g., ethyleneoxy, propyleneoxy, butyleneoxy, pentyleneoxy, hexyleneoxy, heptyleneoxy, octyleneoxy or nonyleneoxy), a phenylene group, and an alkylene group having carbonyl at one end (e.g., 1-oxononylene). Preferred is an alkyleneoxy group. Especially, ethyleneoxy and hexyleneoxy are preferred. Otherwise, one of groups represented by L8 may be combined to a group (represented by L5) adjacent to said group (of L5) to form a ring, and one or two side chain radially bonded to the ring may be combined with P5.

Examples of the polymerizable discotic compound having liquid crystalline property are set forth below.

Formula (A):

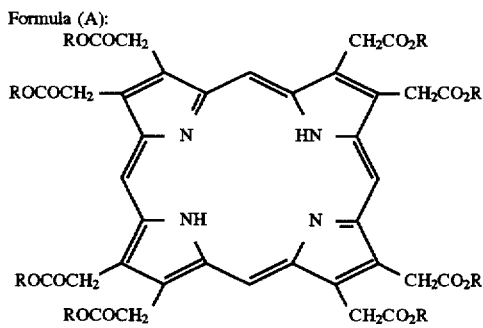

Examples of R of the formula (A), are as follows:

| | |
|---|---|
| $—C_2H_4OCOCH=CH_2$ | A-1 |
| $—C_4H_8OCOCH=CH_2$ | A-2 |
| $—C_6H_{12}OCOCH=CH_2$ | A-3 |
| $—C_9H_{18}OCOCH=CH_2$ | A-4 |
| $—C_2H_4OC\equiv CH$ | A-5 |
| $—C_4H_8OCH_2C\equiv CH$ | A-6 |
| $—C_6H_{12}OCH=CH_2$ | A-7 |
| $—C_9H_{18}OCH=CH_2$ | A-8 |
| $—C_2H_4OCH_2CH_2NH_2$ | A-9 |
| $—C_4H_8SO_3H$ | A-10 |
| $—C_6H_{12}OCH_2CH\underset{O}{\overset{\diagdown \diagup}{—}}CH_2$ | A-11 |
| $—C_9H_{18}OCH_2CH\underset{O}{\overset{\diagdown \diagup}{—}}CH_2$ | A-12 |

Formula (B):

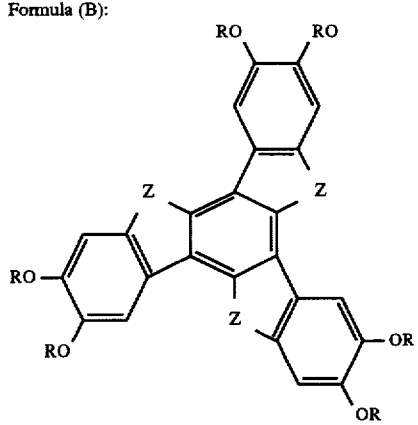

Examples of R and Z of the formula (B), are as follows:

| R | Z | |
|---|---|---|
| —C₂H₄OCOC(CH₃)=CH₂ | —CH₂— | B-1 |
| —C₄H₈OCOCH=CH₂ | —O— | B-2 |
| —C₆H₁₂OCOCH=CH₂ | —S— | B-3 |
| —C₉H₁₈OCOCH=CHCH₃ | —S— | B-4 |
| —C₂H₄OCH=CH₂ | —CH₂— | B-5 |
| —C₄H₈OCH=CH₂ | —O— | B-6 |
| —C₆H₁₂OCONHC₂H₄NCS | —CH₂— | B-7 |
| —C₉H₁₈OCH=CH₂ | —S— | B-8 |
| —C₂H₄SC₂H₄SH | —O— | B-9 |
| —C₄H₈CHO | —CH₂— | B-10 |
| —C₆H₁₂OCH₂CH(O)CH₂ | —CH₂— | B-11 |
| —C₉H₁₈OCH₂CH(O)CH₂ | —O— | B-12 |

Formula (C):

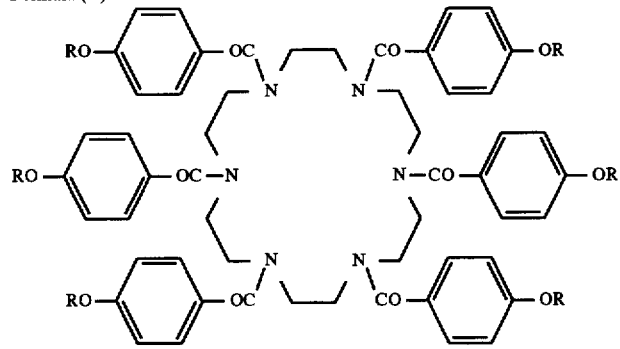

Examples of R of the formula (C), are as follows:

| | |
|---|---|
| —C₂H₄OCOCH=CH₂ | C-1 |
| —C₄H₈OCOCH=CH₂ | C-2 |
| —C₆H₁₂OCOCH=CH₂ | C-3 |
| —C₉H₁₈OH | C-4 |
| —C₂H₄OCH=CH₂ | C-5 |
| —C₄H₈CO₂H | C-6 |
| —C₆H₁₂OCH=CH₂ | C-7 |
| —C₉H₁₈OCH=CH₂ | C-8 |
| —C₂H₄OCH₂CH(O)CH₂ | C-9 |
| —C₄H₈OCH₂CH(O)CH₂ | C-10 |
| —C₆H₁₂OCH₂C≡CH | C-11 |
| —C₉H₁₈OCH₂CH(O)CH₂ | C-12 |

Further, an example of the formula (C), is as follows:

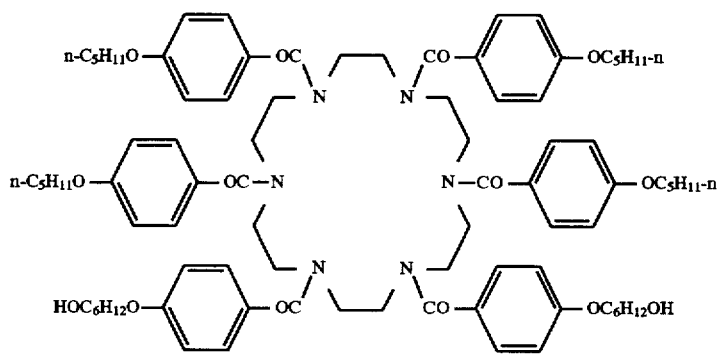

Furthermore, another example, which has a structure similar to that of the formula (C), is as follows:

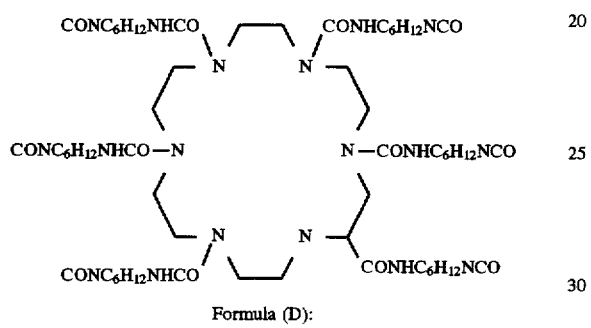

Formula (D):

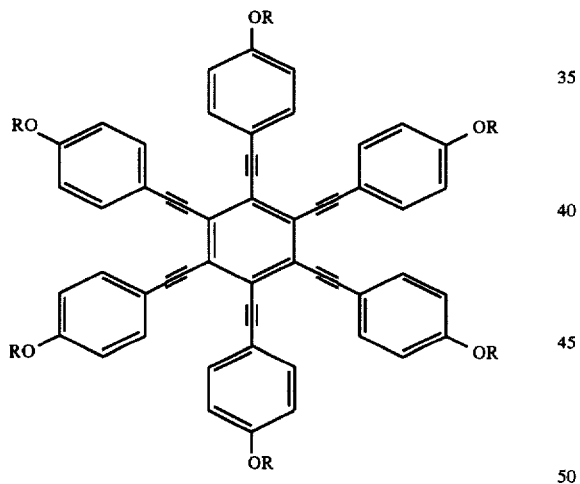

Examples of R of the formula (D) are as follows:

 D-1
 D-2
 D-3
 D-4
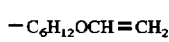 D-5
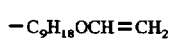 D-6
 D-7

-continued

—$C_4H_8OCH_2CH\!-\!\!-\!\!-\!CH_2$  D-8
　　　　　　　　　　　$\diagdown_O\diagup$

—$C_6H_{12}OCH_2CH\!-\!\!-\!\!-\!CH_2$  D-9
　　　　　　　　　　　$\diagdown_O\diagup$

Further, an example of the formula (D), is as follows:

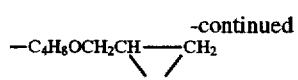

Formula (E):

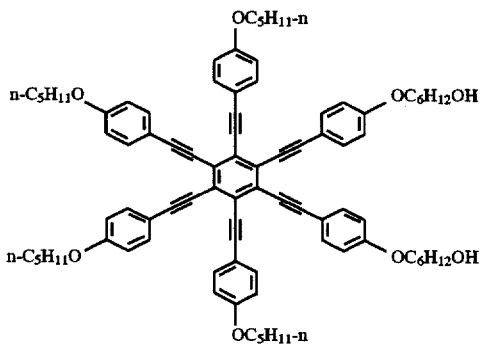

Examples of R of the formula (E), are as follows:

 E-1
 E-2
 E-3
 E-4
 E-5
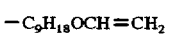 E-6

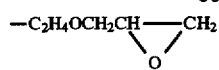 E-7
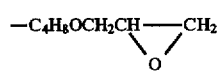 E-8
 E-9
Further, an example of the formula (E), is as follows:
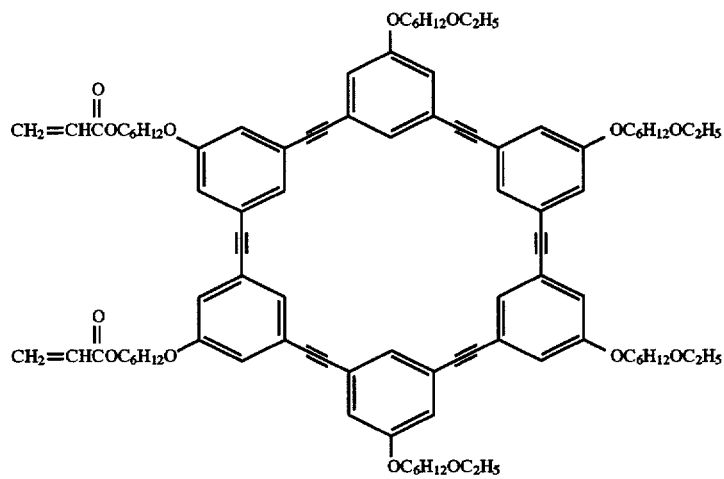
Formula (F):
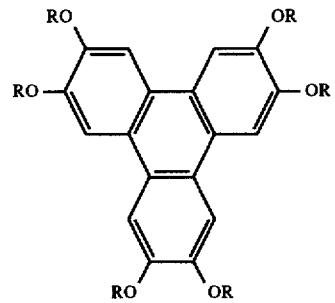
Examples of R of the formula (F) are as follows:
—$C_2H_4OCOCH=CH_2$     F-1
—$C_4H_8OCOCH=CH_2$     F-2
—$C_6H_{12}OCOCH=CH_2$     F-3
—$C_9H_{18}OH$     F-4
—$C_2H_4OCH=CH_2$     F-5
—$C_4H_8CO_2H$     F-6
—$C_6H_{12}OCH=CH_2$     F-7
—$C_9H_{18}OCH=CH_2$     F-8
 F-9
 F-10
—$C_6H_{12}OCH_2{\equiv}CH$     F-11
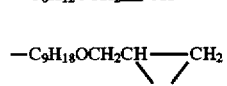 F-12
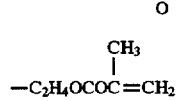 F-13
—$C_4H_8OCOCH=CH_2$     F-14
—$C_6H_{12}OCOCH=CH_2$     F-15
—$C_9H_{18}OCOCH=CHCH_3$     F-16
—$C_2H_4OCH=CH_2$     F-17
—$C_4H_8OCH=CH_2$     F-18
—$C_6H_{12}OCONHC_2H_4NCS$     F-19
—$C_9H_{18}OCH=CH_2$     F-20
—$C_2H_4SC_2H_4SH$     F-21

-continued

—C₄H₈CHO    F-22

    F-23

    F-24

Formula (G):

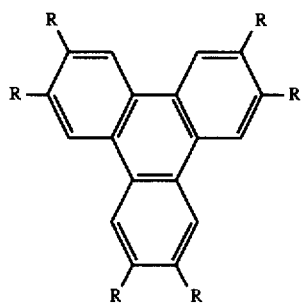

Examples of R of the formula (G), are as follows:

    G-1

—OC₅H₁₀OCOCH=CH₂    G-2

—NHC₆H₁₂OCOCH=CH₂    G-3

—OC₈H₁₆OCOCH=CHCH₃    G-4

—NHC₂H₄OCH=CH₂    G-5

—OC₃H₆OCH=CH₂    G-6

—OC₆H₁₂OCONHC₂H₄NCO    G-7

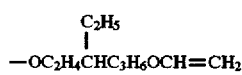    G-8

—SC₂H₄SC₂H₄SH    G-9

—SC₄H₈CHO    G-10

    G-11

    G-12

The polymerizable discotic compound having liquid crystalline property preferably is a compound having the formula (1), (2) or (3).

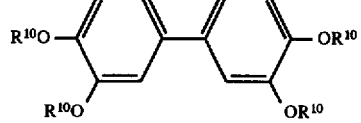 (1)

wherein $R^{10}$ is the following group:

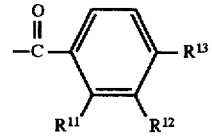

in which each of $R^{11}$ and $R^{12}$ represents independently a hydrogen atom or a methyl group, and $R^{13}$ represents an alkoxy group of 1 to 12 carbon atoms or the following group:

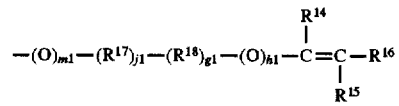

in which m1 represents 0 or 1, $R^{17}$ represents an alkyleneoxy group of 1 to 6 carbon atoms, j1 represents an integer of 0 to 4, $R^{18}$ represents an alkylene group of 1 to 12 carbon atoms, g1 represents an integer of 0 to 4, h1 represents 0 or 1, and each of $R^{14}$, $R^{15}$ and $R^{16}$ represents independently a hydrogen atom or an alkyl group of 1 to 12 carbon atoms.

$R^{11}$ and $R^{12}$ represent independently a hydrogen atom or a methyl group. $R^{13}$ represents an alkoxy group of 1 to 12 carbon atoms (preferably 1 to 9 carbon atoms) or the group of the above formula. All of $R^{13}$ preferably are groups of the above formula.

Examples of the alkoxy include ethoxy, propoxy, butoxy, pentyloxy, hexyloxy or heptyloxy.

Each of $R^{14}$ and $R^{15}$ represents independently a hydrogen atom or an alkyl group (e.g., methyl, ethyl, n-propyl, isopropyl, n-butyl, pentyl, hexyl, heptyl, octyl or nonyl). $R^{14}$ and $R^{15}$ preferably are a hydrogen atom or an lower alkyl group such as methyl or ethyl, and it is especially preferred that $R^{14}$ is methyl and $R^{15}$ is hydrogen, or that $R^{14}$ and $R^{15}$ are hydrogen.

$R^{16}$ represents a hydrogen atom, an alkyl group (e.g., methyl, ethyl, n-propyl, isopropyl, n-butyl, pentyl, hexyl, heptyl, octyl or nonyl). $R^{16}$ generally is a hydrogen atom or a lower alkyl (e.g., methyl, ethyl, n-propyl or isopropyl), preferably is hydrogen or methyl, and especially is hydrogen. $R^{16}$ may be a substituted alkyl group (e.g., 2-chloroethyl, 3-methoxyethyl or methoxyethoxyethyl).

m1 generally is 1.

$R^{17}$ represents an alkyleneoxy group of 1 to 6 carbon atoms, preferably an alkyleneoxy group of 1 to 4 carbon atoms. j1 represents an integer of 0 to 4, preferably an integer of 0 to 3. Examples of the alkyleneoxy group include ethyleneoxy, propyleneoxy, butyleneoxy, pentyleneoxy, hexyleneoxy, heptyleneoxy, and substituted alkyleneoxy (e.g., ethyleneoxyethoxy). Examples of polyalkyleneoxy group include diethyleneoxy, triethyleneoxy, tetraethyleneoxy, dipropyleneoxy and dibutyleneoxy.

$R^{18}$ represents an alkylene group of 1 to 12 carbon atoms, preferably an alkylene group of 1 to 9 carbon atoms. g1 represents an integer of 0 to 1. Examples of the alkylene group include ethylene, propoylene, butylene, pentylene, hexylene and heptylene.
Preferred examples of $R^{10}$ of the formula (1), are as follows:
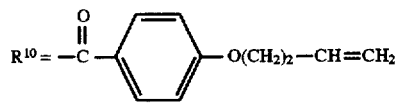
1-1
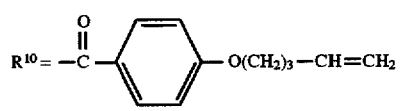
1-2
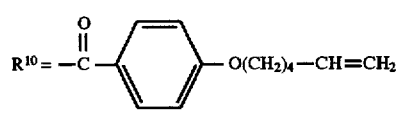
1-3
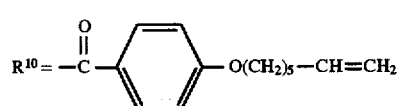
1-4
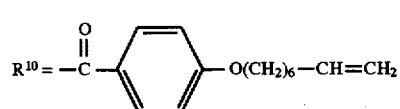
1-5
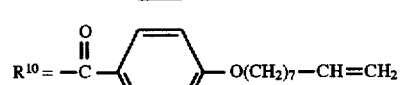
1-6
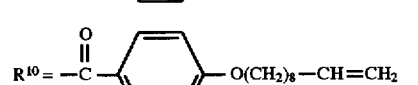
1-7
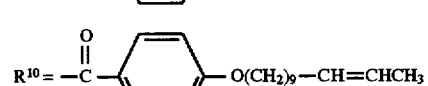
1-8
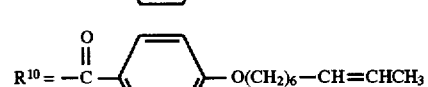
1-9
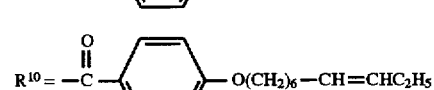
1-10
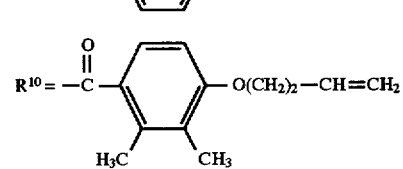
1-11
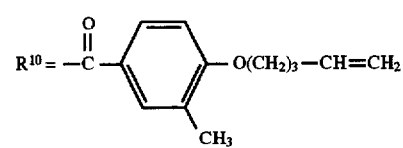
1-12
-continued
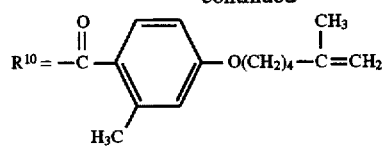
1-13
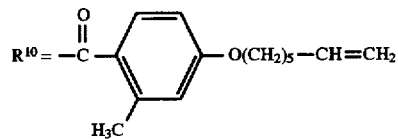
1-14
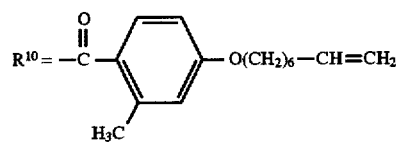
1-15
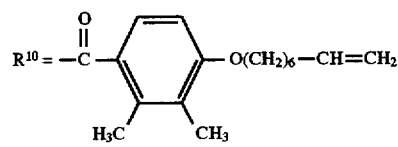
1-16
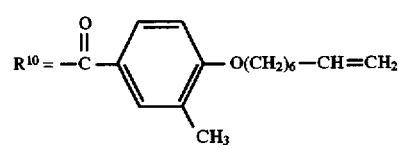
1-17
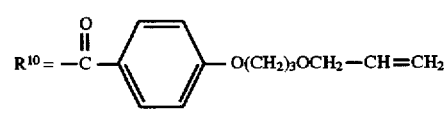
1-18
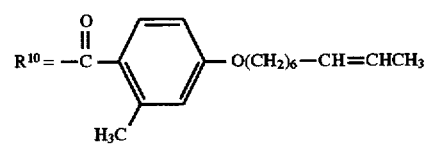
1-19
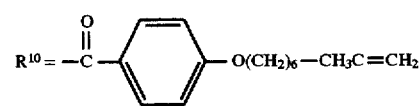
1-20
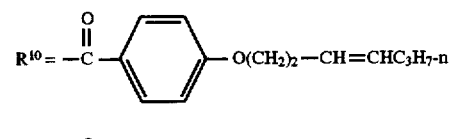
1-21
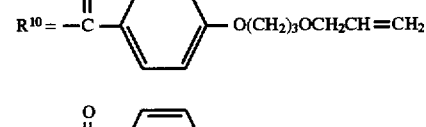
1-22
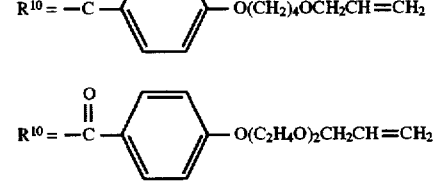
1-23
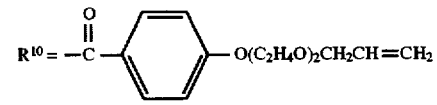
1-24

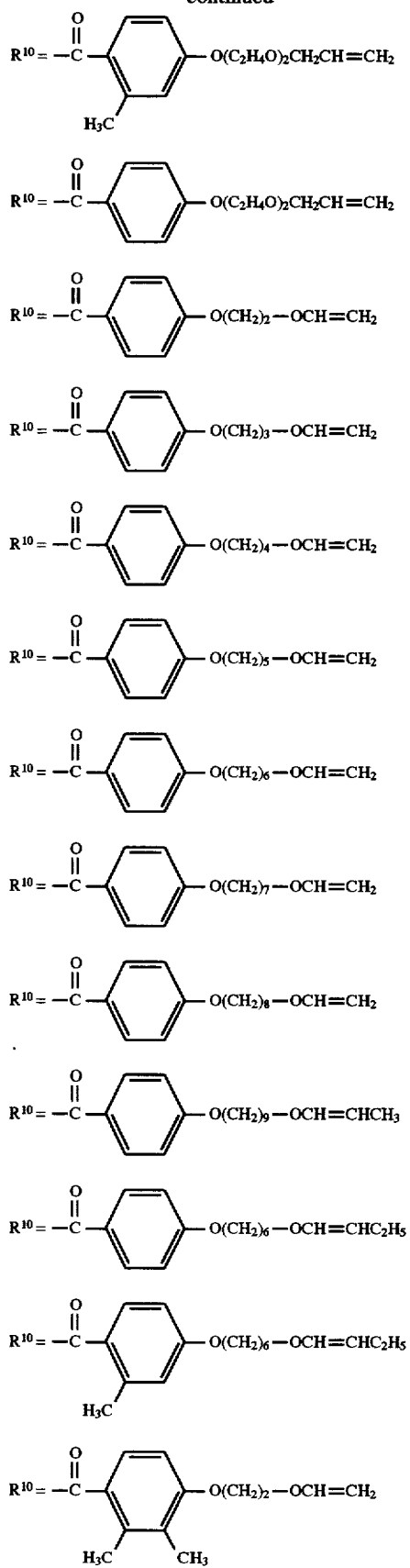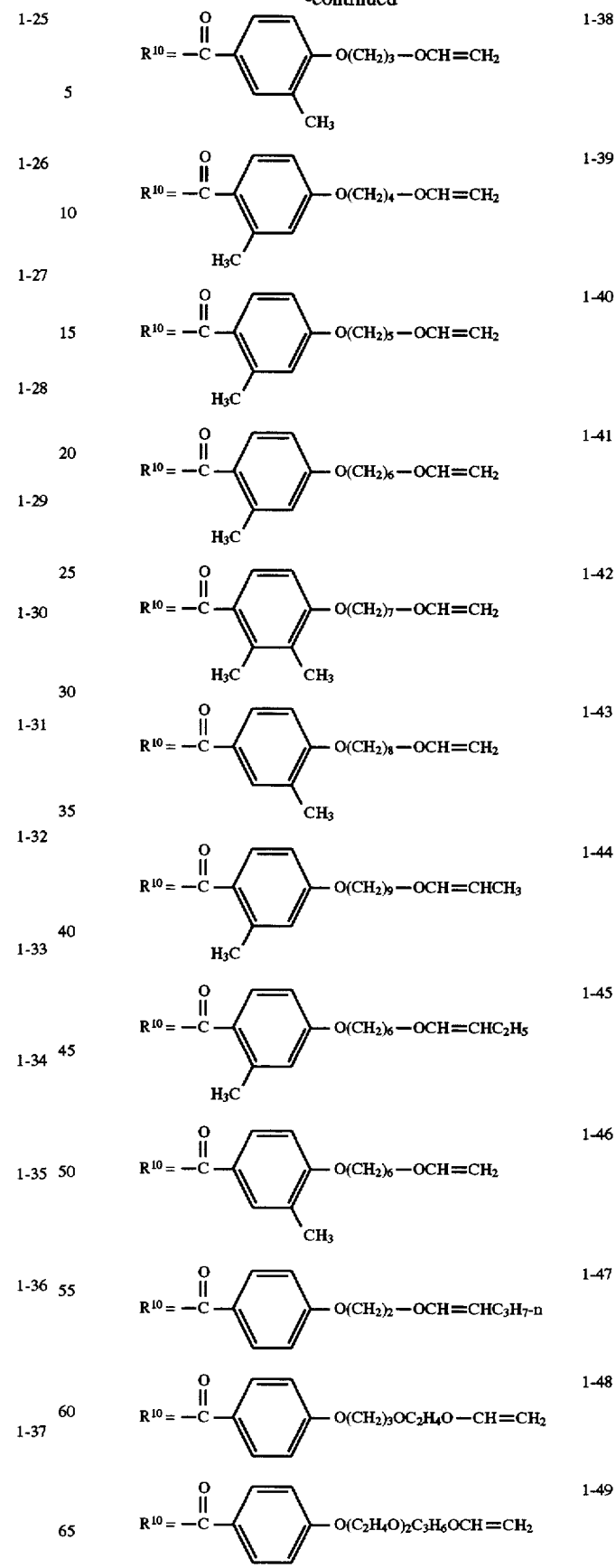

-continued

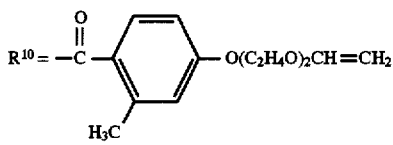

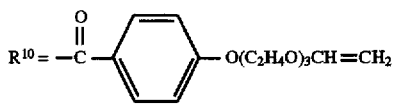

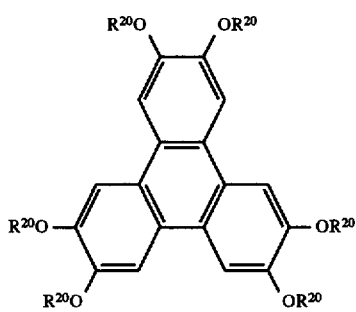

wherein $R^{20}$ is the following group:

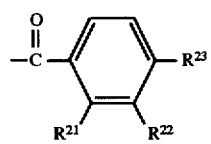

in which each of $R^{21}$ and $R^{22}$ represents independently a hydrogen atom or a methyl group and $R^{23}$ represents an alkoxy gorup of 1 to 12 atoms or the following group:

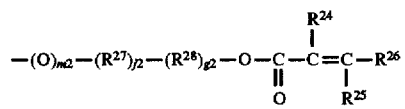

in which m2 represents 0 or 1, $R^{27}$ represents an alkyleneoxy group of 1 to 6 carbon atoms, j2 represents an integer of 0 to 4, $R^{28}$ represents an alkylene group of 1 to 12 carbon atoms, g2 represents an integer of 0 to 4, and each of $R^{24}$, $R^{25}$ and $R^{26}$ represents independently a hydrogen atom or an alkyl group of 1 to 12 carbon atoms.

$R^{21}$ and $R^{22}$ represent independently a hydrogen atom or a methyl group, and $R^{23}$ represents an alkoxy group of 1 to 12 carbon atoms (preferably 1 to 9 carbon atoms) or the group of the above formula. Preferably, all of $R^{23}$ are groups of the above formula.

Examples of the atkoxy include ethoxy, propoxy, butoxy, pentyloxy, hexytoxy or heptytoxy.

Each of $R^{24}$ and $R^{25}$ represents independently a hydrogen atom or an alkyl group (e.g., methyl, ethyl, n-propyl, isopropyl, n-butyl, pentyl, hexyl, heptyl, octyl or nonyl). $R^{24}$ and $R^{25}$ preferably are a hydrogen atom or an lower alkyl group such as methyl or ethyl, and it is especially preferred that $R^{24}$ is methyl and $R^{25}$ is hydrogen, or that $R^{24}$ and $R^{25}$ are hydrogen.

$R^{26}$ represents a hydrogen atom, an alkyl group (e.g., methyl, ethyl, n-propyl, isopropyl, n-butyl, pentyl, hexyl, heptyl, octyl or nonyl). $R^{26}$ generally is a hydrogen atom or a lower alkyl (e.g., methyl, ethyl, n-propyl or isopropyl), preferably is hydrogen or methyl, and especially is hydrogen. $R^{26}$ may be a substituted alkyl group (e.g., 2-chloroethyl, 3-methoxyethyl or methoxyethoxyethyl).

m2 generally is 1.

$R^{27}$ represents an alkyleneoxy group of 1 to 6 carbon atoms, preferably an alkyleneoxy group of 1 to 4 carbon atoms. j2 represents an integer of 0 to 4, preferably an integer of 0 to 3. Examples of the alkyleneoxy group include ethyleneoxy, propyleneoxy, butyleneoxy, pentyleneoxy, hexyleneoxy, heptyleneoxy, and substituted alkyleneoxy (e.g., ethyleneoxyethoxy). Examples of polyalkyleneoxy group include diethyleneoxy, triethyleneoxy, tetraethyleneoxy, dipropyleneoxy and dibutyleneoxy.

$R^{28}$ represents an alkylene group of 1 to 12 carbon atoms, preferably an alkylene group of 1 to 9 carbon atoms. g2 represents an integer of 0 to 1. Examples of the alkylene groups include ethylene, propoylene, butylene, pentylene, hexylene and heptylene.

Preferred groups represented by the aforementioned formula of $R^{23}$ include an unsubstituted acryloyloxy group, an unsubstituted methacryloyloxy group and an unsubstituted crotonyloxy group, which have high polymerizability.

Preferred examples of $R^{20}$ of the formula (2) are as follows:

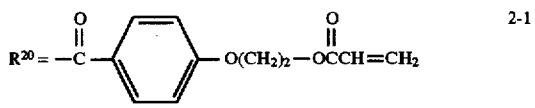

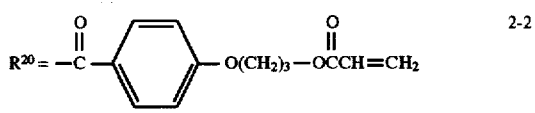

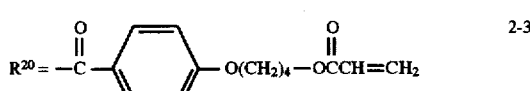

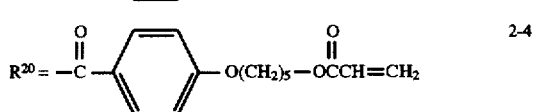

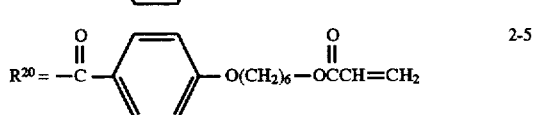

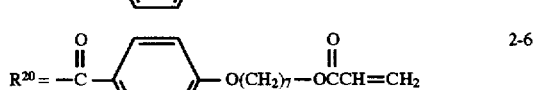

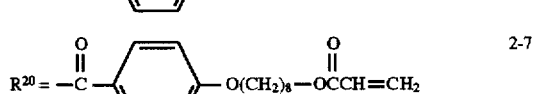

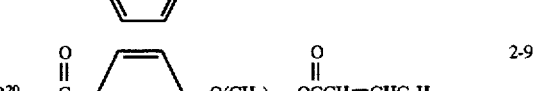

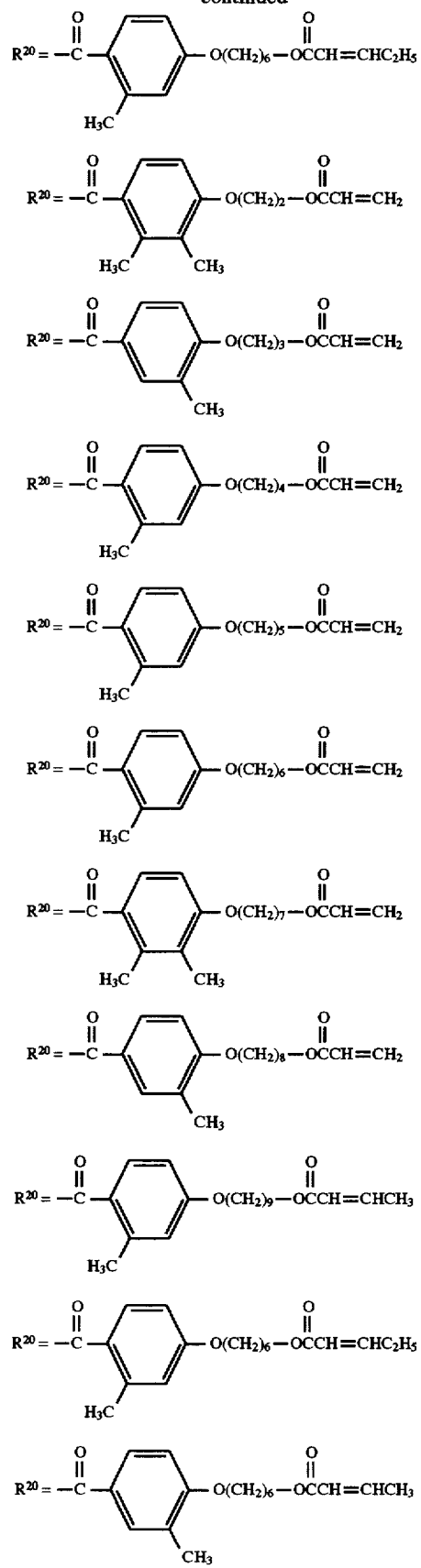
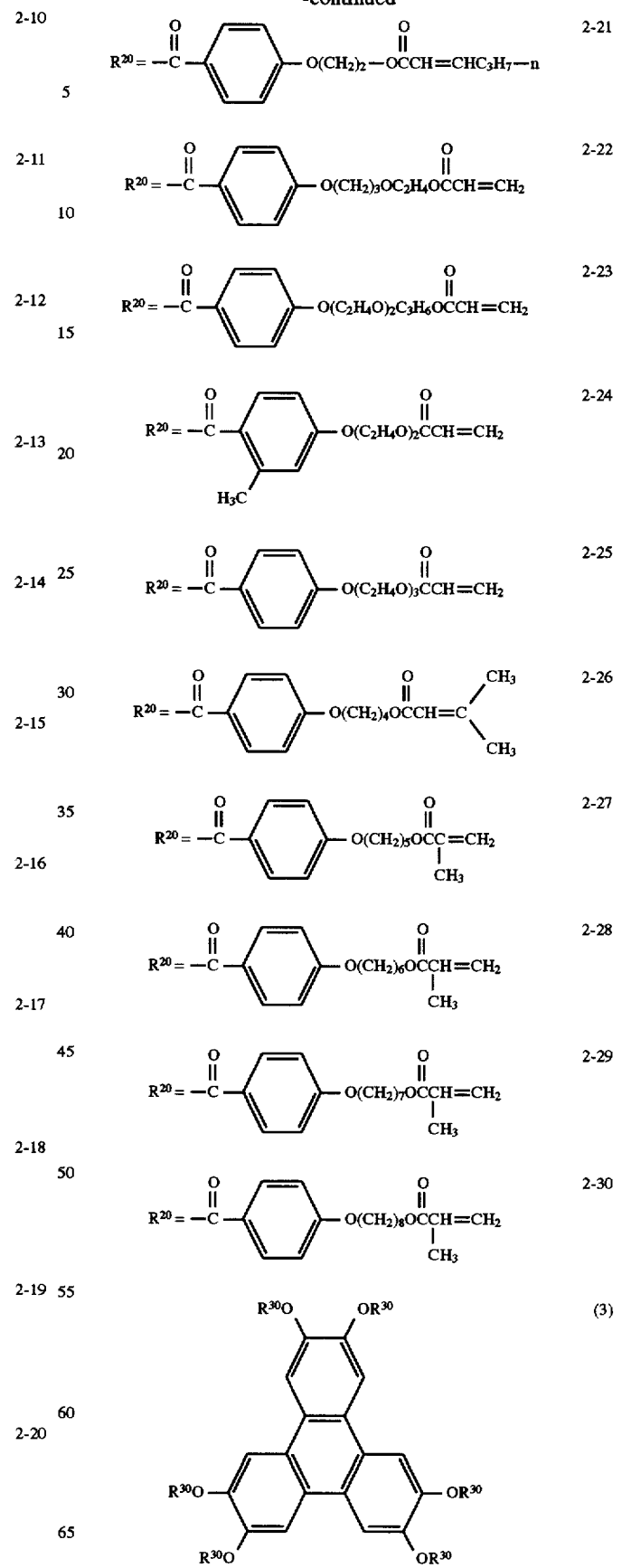

wherein $R^{30}$ is the following group:

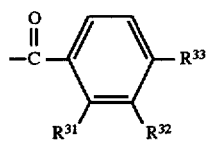

in which each of $R^{31}$ and $R^{32}$ represents independently a hydrogen atom or a methyl group, and $R^{33}$ represents an alkoxy group of 1 to 12 carbon atoms or the following group:

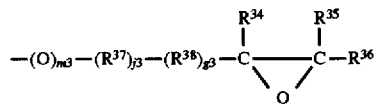

in which m3 represents 0 or 1, $R^{37}$ represents an alkyleneoxy group of 1 to 6 carbon atoms, j3 represents an integer of 0 to 4, $R^{38}$ represents an alkylene group of 1 to 12 carbon atoms, g3 represents an integer of 0 to 4, and each of $R^{34}$, $R^{35}$ and $R^{36}$ represents independently a hydrogen atom or an alkyl group of 1 to 12 carbon atoms.

$R^{31}$ and $R^{32}$ represent independently a hydrogen atom or a methyl group. $R^{33}$ represents an alkoxy group of 1 to 12 carbon atoms (preferably 1 to 9 carbon atoms) or the group of the above formula. All of $R^{33}$ preferably are groups of the above formula.

Examples of the alkoxy include ethoxy, propoxy, butoxy, pentyloxy, hexyloxy or heptyloxy.

Each of $R^{34}$ and $R^{35}$ represents independently a hydrogen atom or an alkyl group (e.g., methyl, ethyl, n-propyl, isopropyl, n-butyl, pentyl, hexyl, heptyl, octyl or nonyl). $R^{34}$ and $R^{35}$ preferably are a hydrogen atom or an lower alkyl group such as methyl or ethyl, and it is especially preferred that $R^{34}$ and $R^{35}$ are hydrogen.

$R^{36}$ represents a hydrogen atom, an alkyl group (e.g., methyl, ethyl, n-propyl, isopropyl, n-butyl, pentyl, hexyl, heptyl, octyl or nonyl). $R^{36}$ generally is a hydrogen atom or a lower alkyl (e.g., methyl, ethyl, n-propyl or isopropyl), preferably is hydrogen or methyl, and especially is hydrogen. $R^{36}$ may be a substituted alkyl group (e.g., 2-chloroethyl, 3-methoxyethyl or methoxyethoxyethyl).

m3 generally is 1.

$R^{37}$ represents an alkyleneoxy group of 1 to 6 carbon atoms, preferably an alkyleneoxy group of 1 to 4 carbon atoms. j3 represents an integer of 0 to 4, preferably an integer of 0 to 3. Examples of the alkyleneoxy group include ethyleneoxy, propyleneoxy, butyleneoxy, pentyleneoxy, hexyleneoxy, heptyleneoxy, and substituted alkyleneoxy (e.g., ethyleneoxyethoxy). Examples of polyalkyleneoxy group include diethyleneoxy, triethyleneoxy, tetraethyleneoxy, dipropyleneoxy and dibutyleneoxy.

$R^{38}$ represents an alkylene group of 1 to 12 carbon atoms, preferably an alkylene group of 1 to 9 carbon atoms. g3 represents an integer of 0 to 1. Examples of the alkylene groups include ethylene, propoylene, butylene, pentylene, hexytene and heptylene.

Preferred examples of $R^{30}$ of the formula (3) are as follows:

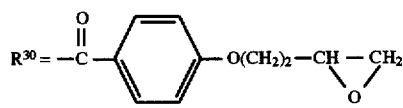

3-1

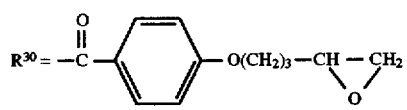

3-2

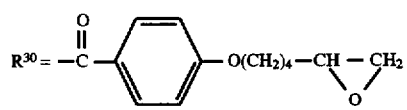

3-3

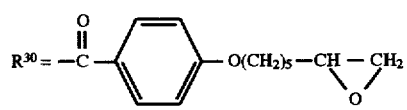

3-4

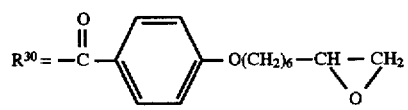

3-5

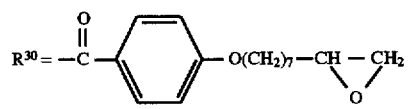

3-6

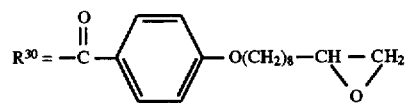

3-7

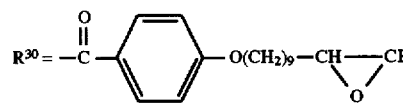

3-8

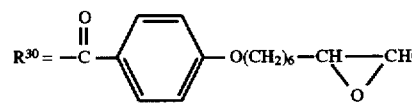

3-9

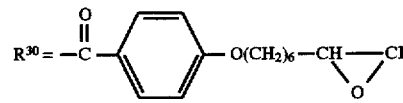

3-10

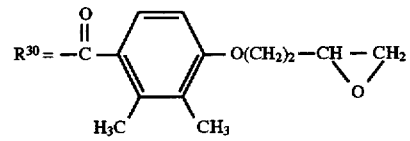

3-11

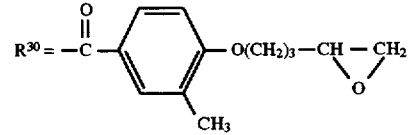

3-12

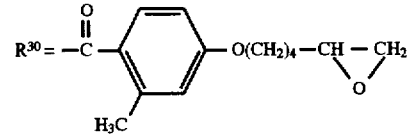

3-13

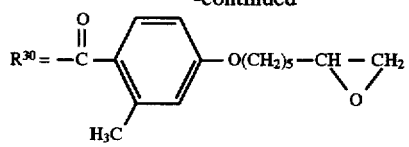 3-14
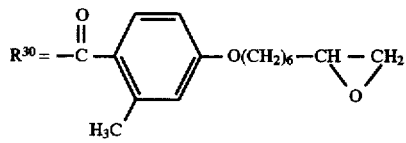 3-15
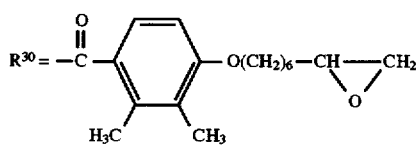 3-16
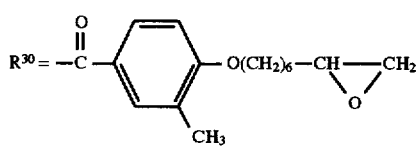 3-17
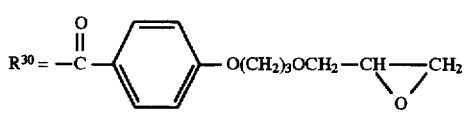 3-18
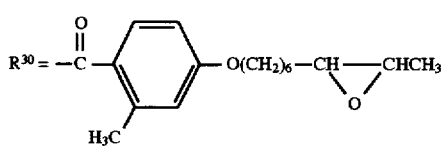 3-19
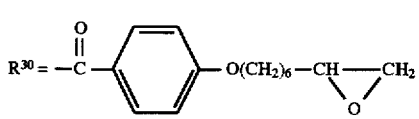 3-20
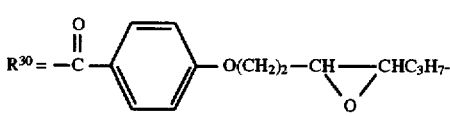 3-21
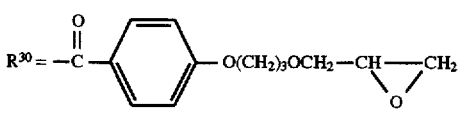 3-22
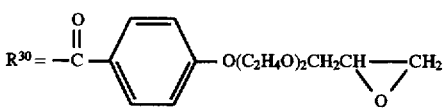 3-23
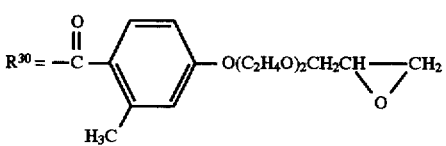 3-24
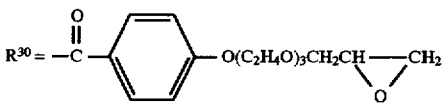 3-25
Further, examples of the polymerizable discotic compounds having liquid crystalline property include the following compounds:
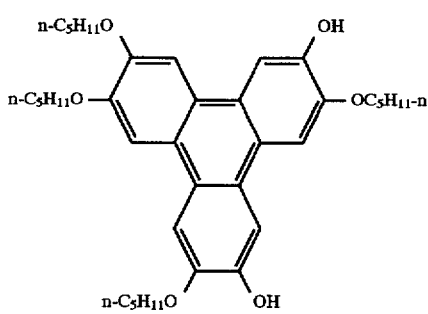 D-1
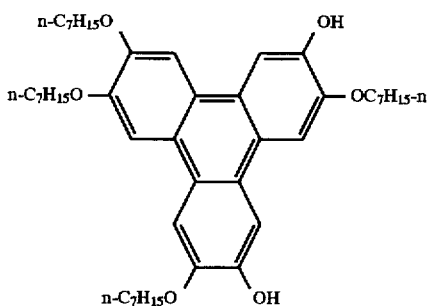 D-2

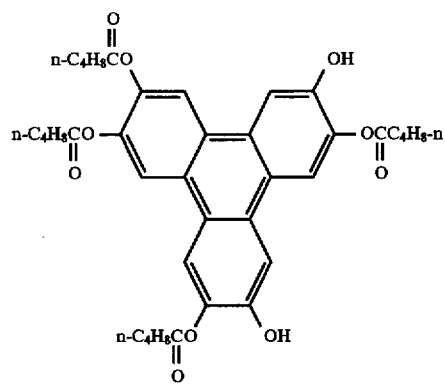
D-3
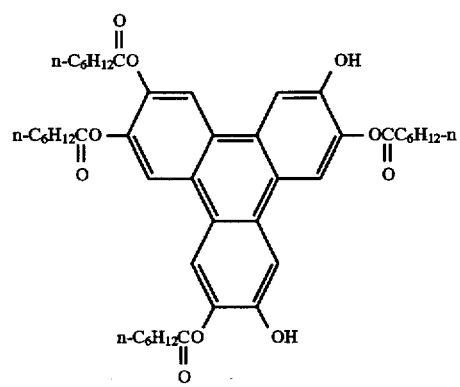
D-4
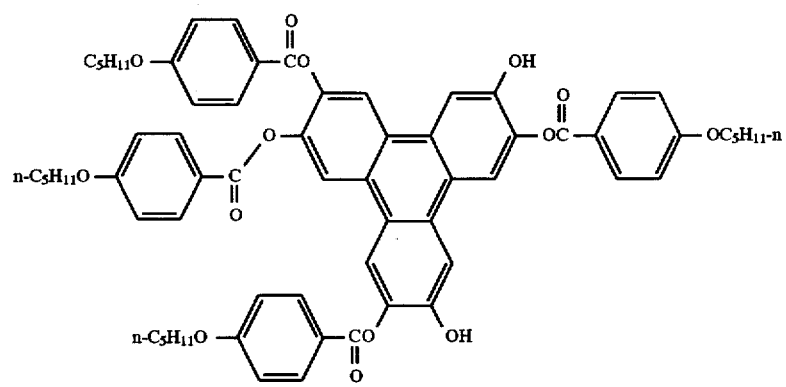
D-5
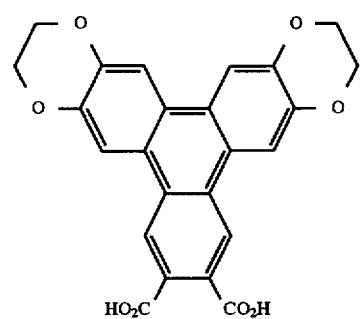
D-6

-continued
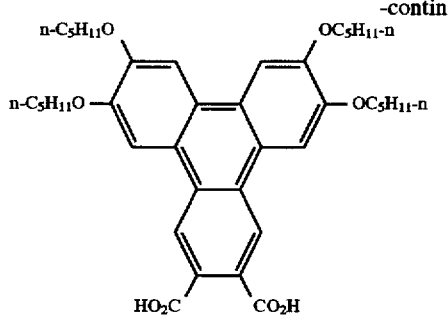
D-7
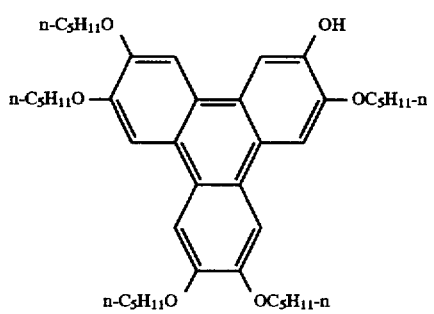
D-8
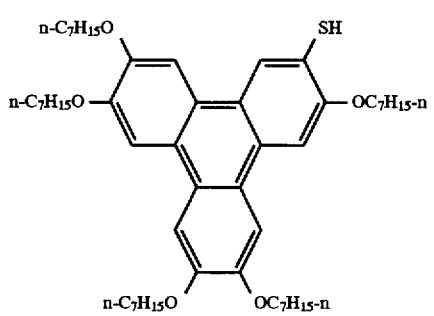
D-9
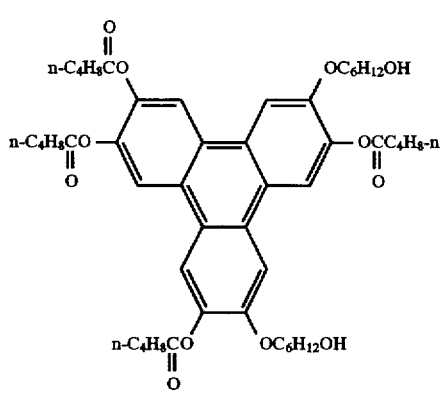
D-10
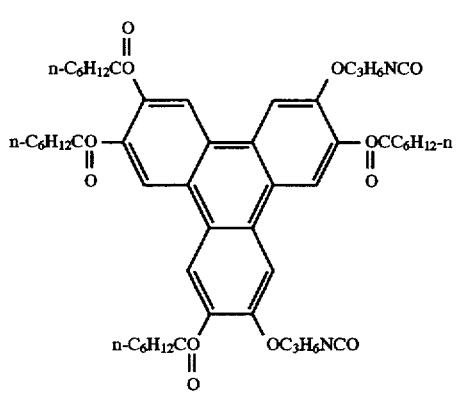
D-11

-continued
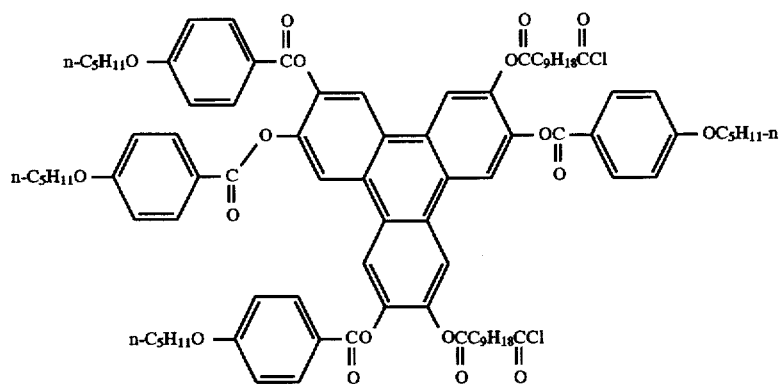
D-12
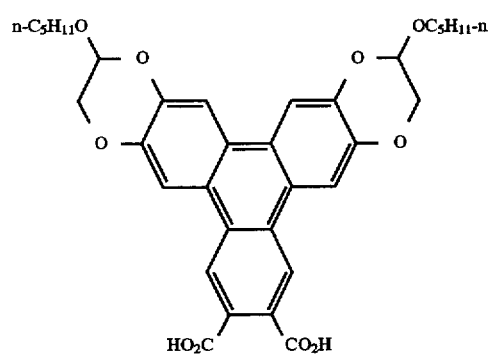
D-13
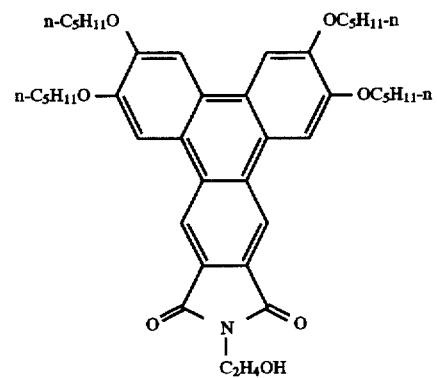
D-14
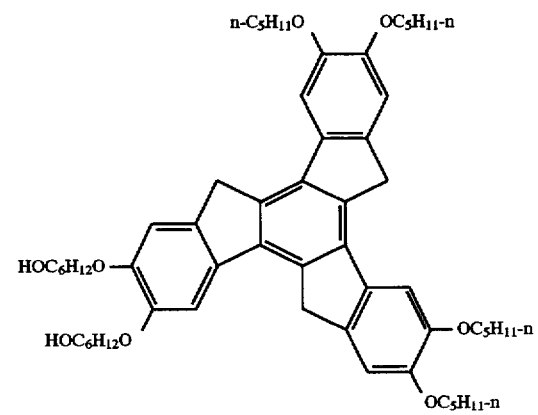
D-15

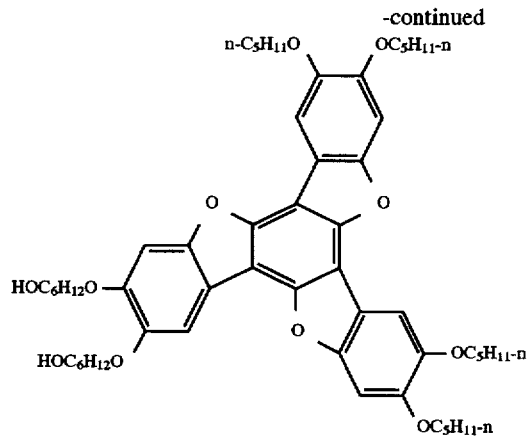
D-16
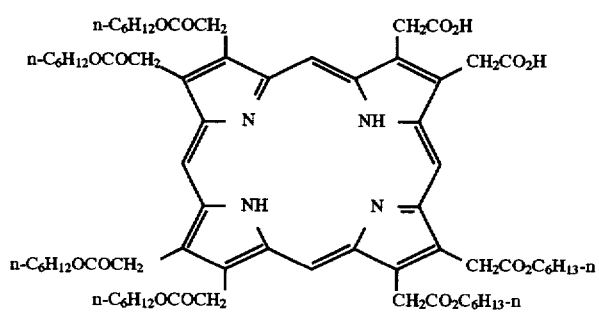
D-17
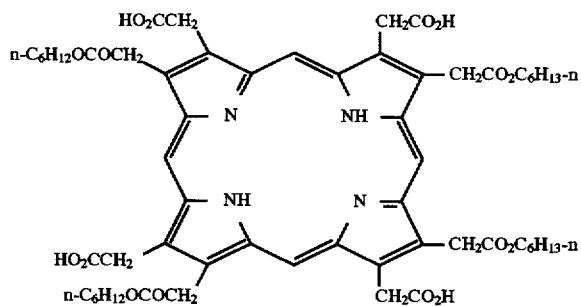
D-18
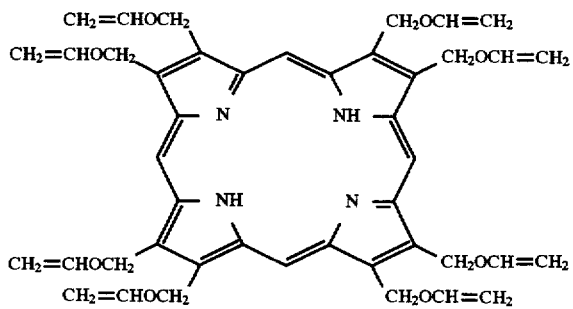
D-19
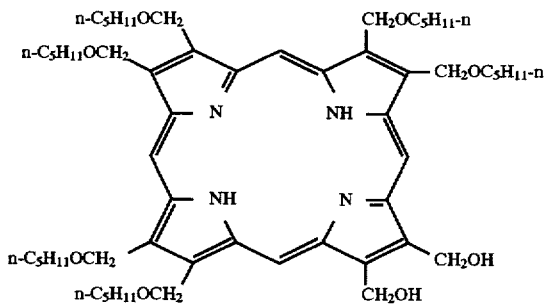
D-20

-continued
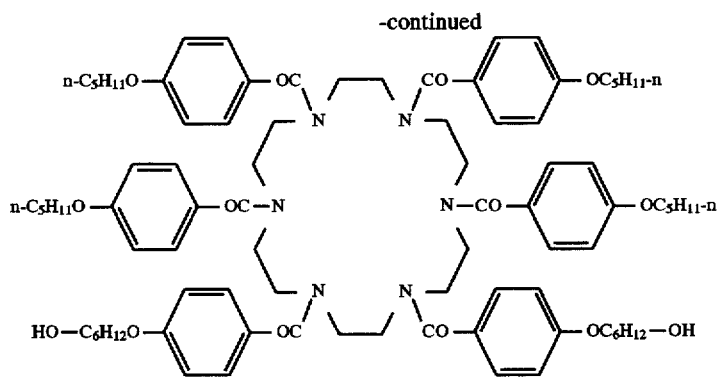
D-21
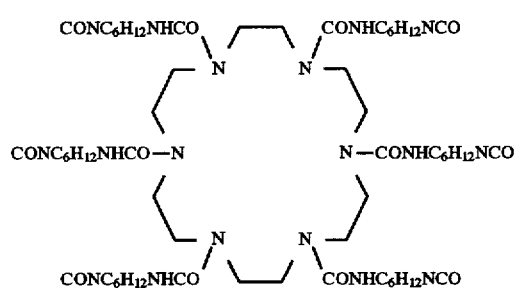
D-22
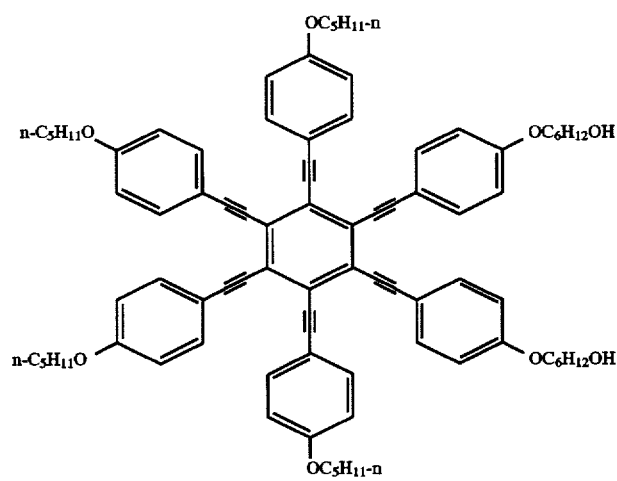
D-23
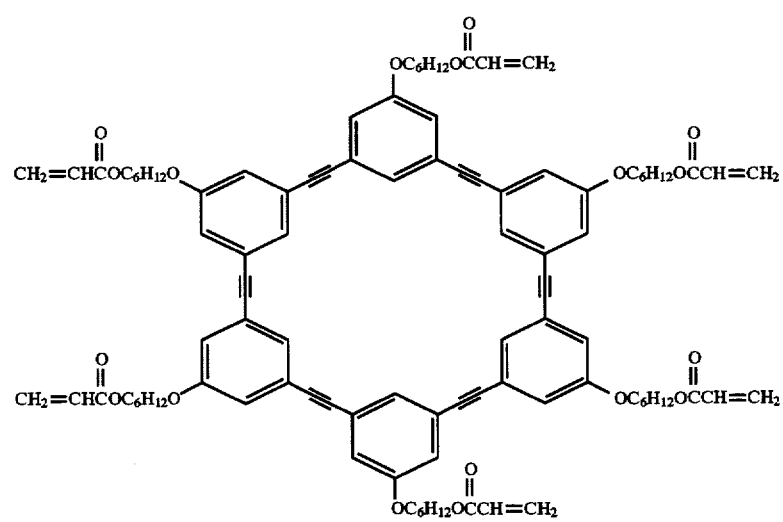
D-24
The optically anisotropic layer of the invention can be formed of the polymer which is prepared from the above polymerizable discotic compound having liquid crystalline property. However, the optically anisotropic layer is preferably formed of the polymer which is prepared from the above polymerizable discotic compound having liquid crystalline property and a polymerizable non-discotic compound or a polymerizable compound having no liquid crystalline property. The use of a polymerizable non-discotic compound or a polymerizable compound having no liquid crystalline property (preferably polymerizable non-discotic compound) enables lowering of transition temperature to discotic nematic phase of the mixture of the above two kinds of compounds and of the polymer prepared from the mixture. Especially, the effect of increased lowering is attained in the case of using the following compounds (the formula (9), especially the formulae (4), (5) and (6)) as the a polymerizable non-discotic compound or a polymerizable compound having no liquid crystalline property.

The polymerizable non-discotic compound or a polymerizable compound having no liquid crystalline property is a compound having the formula (9):

(9)

wherein D6 represents a benzene ring, a naphthalene ring, an anthracene ring, a pyrene ring, a phenanthrene ring, a truxene ring, a trithiatruxene ring, a trioxatruxene ring, a hexaethyne substituted benzene ring, a colonene ring, dibenzopyrene ring, an inositol ring, a phthalocyanine ring or a macrocycle ring of phenylacetylene, E represents a group having no reactivity, P6 represents an isocyanato group, a thiocyanato group, an amino group, an alkylamino group, an arylamino group, a mercapto group, a formyl group, an acyl group, a hydroxy group, a carboxyl group, a sulfo group, a phsophoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L6 represents a divalent connective group for linking D6 to P6, n6 represents an integer of 0 to 7 and k6 represents an integer of 1 to 8, under the condition of n6+k6≦8.

D6 preferably is a benzene ring, a naphthalene ring, a benzene ring, a naphthalene ring, an anthracene ring, a pyrene ring or a phenanthrene ring.

P6 preferably is mercapto, formyl, hydroxy, halocarbonyl, acryloyl, vinyloxy or epoxy.

E generally is alkyl, alkoxy, oligo-oxyethylene (group in which plural oxyethylenes are combined), acyl, acyloxy, benzoyloxy or benzoyl. The compound of the formula (9) has E of the number of n6, and one of groups represented by E may be combined to a group (represented by E) adjacent to said group (of E) to form a ring so long as the compound has one or two side chain radially bonded to D6.

L6 represents a divalent connective group for linking D6 with P6. Examples of the divalent connective group include an alkylene group (e.g., ethylene, propylene, butylene, pentylene, hexylene, heptylene, octylene or nonylene), an alkyleneoxy group (e.g., ethyleneoxy, propyleneoxy, butyleneoxy, pentyleneoxy, hexyleneoxy, heptyleneoxy, octyleneoxy or nonyleneoxy), a phenylene group, and an alkylene group having carbonyl at one end (e.g., 1-oxononylene). Preferred is an alkyleneoxy group. Especially, ethyleneoxy and hexyleneoxy are preferred. Otherwise, one of groups represented by L6 may be combined to a group (represented by L6) adjacent to said group (of L6) to form a ring, and one or two side chain radially bonded to the ring may be combined with P68.

The polymerizable non-discotic compound preferably has the formula (4), (5) or (6).

(4)

wherein D1 represents a benzene ring or naphthalene ring, X represents a hydrogen atom, an alkyl group of 1 to 12 carbon atoms or an alkoxy group of 1 to 12 carbon atoms, k1 represents 1, 2 or 3 under the condition of n1+k1=6 when D1 represents a benzene ring and k1 represents 1, 2 or 3 under the condition of n1+k1=6 when D1 represents a naphthalene ring, s1 represents 0 or 1, L1 is the following group:

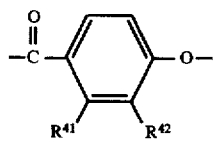

in which each of $R^{51}$ and $R^{52}$ represents independently a hydrogen atom or a methyl group, and P1 represents the following group:

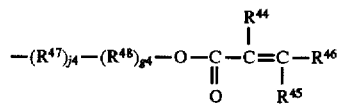

in which $R^{47}$ represents an alkyleneoxy group of 1 to 6 carbon atoms, j4 represents an integer of 0 to 4, $R^{48}$ represents an alkylene group of 1 to 12 carbon atoms, g4 represents an integer of 0 to 4, and each of $R^{44}$, $R^{45}$ and $R^{46}$ represents independently a hydrogen atom or an alkyl group of 1 to 12 carbon atoms;

X generally is a hydrogen atom, an alkyl group of 1 to 9 carbon atoms (e.g., methyl, ethyl, n-propyl, isopropyl or n-butyl), or an alkoxy group of 1 to 9 carbon atoms (e.g., methoxy, ethoxy, n-propoxy, isopropoxy or n-butoxy). X preferably is hydrogen, methyl, ethyl, methoxy or ethoxy, and more preferably hydrogen or methyl. X is especially preferred to be hydrogen.

$R^{41}$ and $R^{42}$ represent independently a hydrogen atom or a methyl group.

Each of $R^{44}$ and $R^{45}$ generally represents independently a hydrogen atom or an alkyl group of 1 to 9 carbon atoms (e.g., methyl, ethyl, n-propyl, isopropyl, n-butyl, pentyl, hexyl, heptyl, octyl or nonyl). $R^{44}$ and $R^{45}$ preferably are a hydrogen atom or an lower alkyl group such as methyl or ethyl, and it is especially preferred that $R^{44}$ is methyl and $R^{45}$ is hydrogen, or that $R^{44}$ and $R^{45}$ are hydrogen.

$R^{46}$ represents a hydrogen atom, an alkyl group (e.g., methyl, ethyl, n-propyl, isopropyl, n-butyl, pentyl, hexyl, heptyl, octyl or nonyl). $R^{46}$ generally is a hydrogen atom or a lower alkyl (e.g., methyl, ethyl, n-propyl or isopropyl), preferably is hydrogen or methyl, and especially is hydrogen. $R^{46}$ may be a substituted alkyl group (e.g., 2-chloroethyl, 3-methoxyethyl or methoxyethoxyethyl).

$R^{47}$ represents an alkyleneoxy group of 1 to 6 carbon atoms, preferably an alkyleneoxy group of 1 to 4 carbon atoms. j4 represents an integer of 0 to 4, preferably an integer of 0 to 3. Examples of the alkyleneoxy group include ethyleneoxy, propyleneoxy, butyleneoxy, pentyleneoxy, hexyleneoxy, heptyleneoxy, and substituted alkyleneoxy (e.g., ethyleneoxyethoxy). Examples of multi- or polyalkyleneoxy group include diethyleneoxy, triethyleneoxy, tetraethyleneoxy, dipropyleneoxy and dibutyleneoxy.

$R^{48}$ represents an alkylene group of 1 to 12 carbon atoms, preferably an alkylene group of 1 to 9 carbon atoms. g4 represents an integer of 0 to 1. Examples of the alkylene group include ethylene, propoylene, butylene, pentylene, hexylene and heptytene.

Preferred groups represented by P1 include an unsubstituted acryloyloxy group, an unsubstituted methacryloyloxy group and an unsubstituted crotonyloxy group, which have high polymerizability.

The groups of the number of k1 which are bonded to a benzene or naphthalene group may be the same or different from each other. k1 preferably is 2 or 3.

The formula (4) preferably has the following formulae (I)–(XVI) (R is the aforementioned —[(L1)$_{s1}$—P1]):

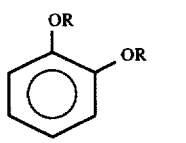 (I)

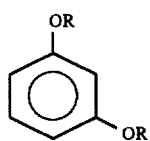 (II)

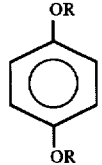 (III)

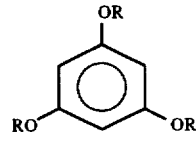 (IV)

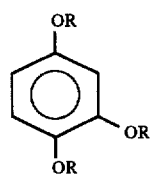 (V)

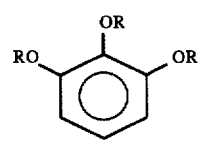 (VI)

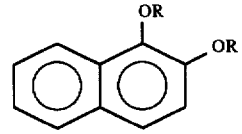 (VII)

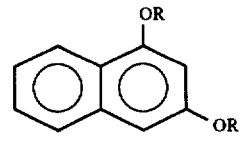 (VIII)

-continued

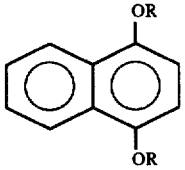 (IX)

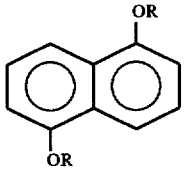 (X)

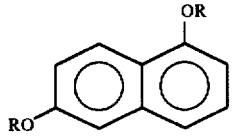 (XI)

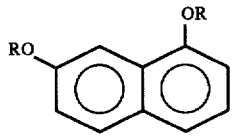 (XII)

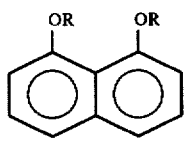 (XIII)

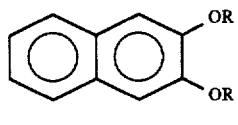 (XIV)

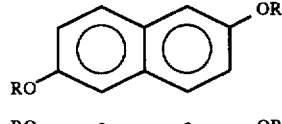 (XV)

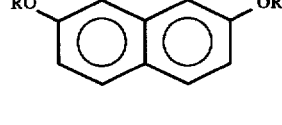 (XVI)

The formulae (5) and (6) described later also have preferably the above formulae (I)–(XVI) (wherein R is —[(L2)$_{s2}$—P2] or —[(L3)$_{s3}$—P3]).

Preferred examples of R of the formulae (I)–(XVI) are set forth below:

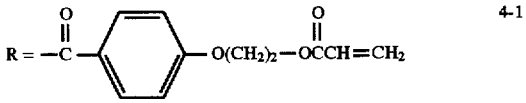 4-1

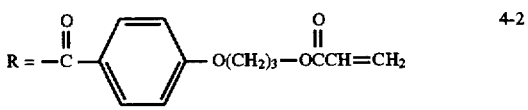 4-2

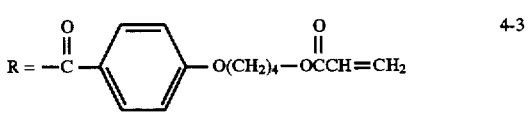 4-3

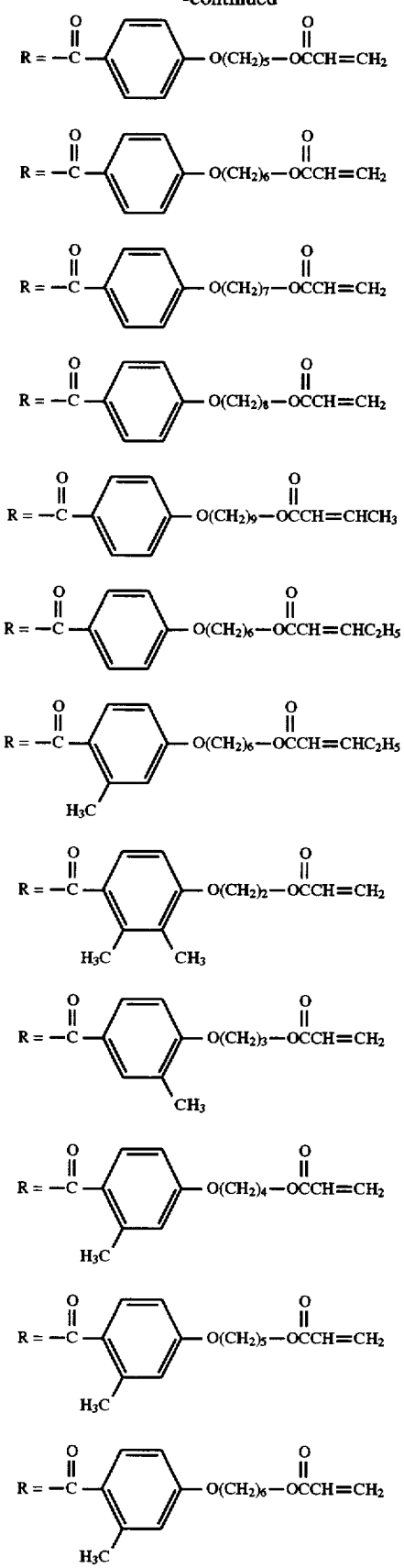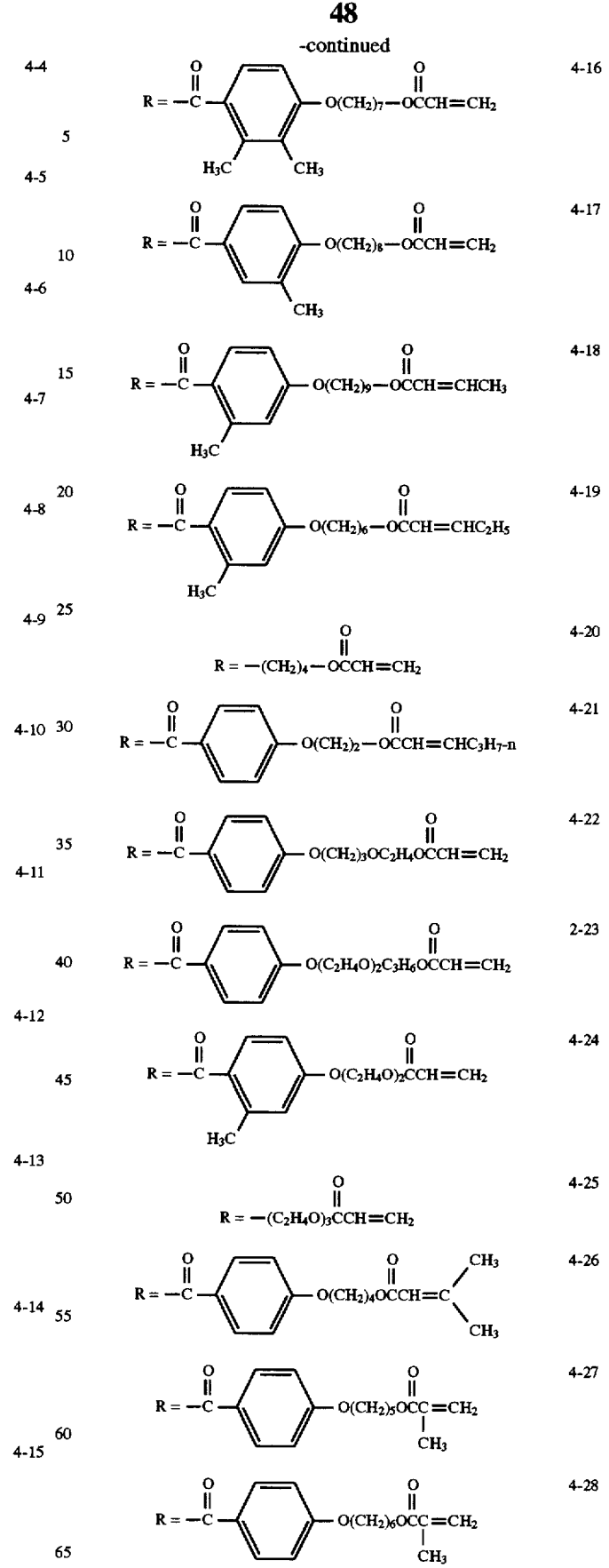

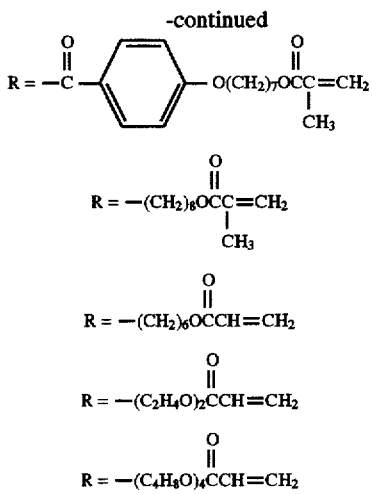

4-29

4-30

4-31

4-32

4-33

$$(Y)_{n2}D2[O—(L2)_{s2}—P2]_{k2} \quad (5)$$

wherein D2 represents a benzene ring or naphthalene ring, Y represents a hydrogen atom, an alkyl group of 1 to 12 carbon atoms or an alkoxy group of 1 to 12 carbon atoms, k2 represents 1, 2 or 3 under the condition of n2+k2=6 when D2 represents a benzene ring and k2 represents 1, 2 or 3 under the condition of n2+k2=6 when D2 represents a naphthalene ring, s2 represents 0 or 1, L2 is the following group:

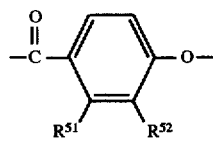

in which each of $R^{51}$ and $R^{52}$ represents independently a hydrogen atom or methyl group,
and P2 represents the following group:

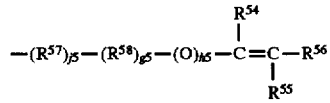

in which $R^{57}$ represents an alkyleneoxy group of 1 to 6 carbon atoms, j5 represents an integer of 0 to 4, $R^{58}$ represents an alkylene group of 1 to 12 carbon atoms, g5 represents an integer of 0 to 4, h5 represents 0 or 1, and each of $R^{54}$, $R^{55}$ and $R^{56}$ represents independently a hydrogen atom or an alkyl group of 1 to 12 carbon atoms.

Y generally is a hydrogen atom, an alkyl group of 1 to 9 carbon atoms (e.g., methyl, ethyl, n-propyl, isopropyl or n-butyl), or an alkoxy group of 1 to 9 carbon atoms (e.g., methoxy, ethoxy, n-propoxy, isopropoxy or n-butoxy). Y preferably is hydrogen, methyl, ethyl, methoxy or ethoxy, and more preferably hydrogen or methyl. Y is especially preferred to be hydrogen.

$R^{51}$ and $R^{52}$ represent independently a hydrogen atom or a methyl group.

Each of $R^{54}$ and $R^{55}$ generally represents independently a hydrogen atom or an alkyl group of 1 to 9 carbon atoms (e.g., methyl, ethyl, n-propyl, isopropyl, n-butyl, pentyl, hexyl, heptyl, octyl or nonyl). $R^{54}$ and $R^{55}$ preferably are a hydrogen atom or an lower alkyl group such as methyl or ethyl, and it is especially preferred that $R^{54}$ is methyl and $R^{55}$ is hydrogen, or that $R^{54}$ and $R^{55}$ are hydrogen.

$R^{56}$ represents a hydrogen atom, an alkyl group (e.g., methyl, ethyl, n-propyl, isopropyl, n-butyl, pentyl, hexyl, heptyl, octyl or nonyl). $R^{56}$ generally is a hydrogen atom or a lower alkyl (e.g., methyl or ethyl), and preferably is hydrogen. $R^{56}$ may be a substituted alkyl group (e.g., 2-chloroethyl, 3-methoxyethyl or methoxyethoxyethyl).

$R^{57}$ represents an alkyleneoxy group of 1 to 6 carbon atoms, preferably an atkyleneoxy group of 1 to 4 carbon atoms. j5 represents an integer of 0 to 4, preferably an integer of 0 to 3. Examples of the alkyleneoxy group include ethyleneoxy, propyleneoxy, butyleneoxy, pentyleneoxy, hexyleneoxy, heptyleneoxy, and substituted alkyleneoxy (e.g., ethyleneoxyethoxy). Examples of multi- or polyalkyleneoxy group include diethyleneoxy, triethyleneoxy, tetraethyleneoxy, dipropyleneoxy and dibutyleneoxy.

$R^{58}$ represents an alkylene group of 1 to 12 carbon atoms, preferably an alkylene group of 1 to 9 carbon atoms. g5 represents an integer of 0 to 1. Examples of the alkylene group include ethylene, propoylene, butylene, pentylene, hexylene and heptylene.

Preferred groups represented by P5 preferably is an unsubstituted vinyloxy group, which have high polymerizability.

The groups of the number of k2 which are bonded to a benzene or naphthalene group may be the same or different from each other. k2 preferably is 2 or 3.

Preferred examples of R of the above formulae (I)–(XVI) (R is the aforementioned —[(L2)$_{s2}$—P2]), are set forth below.

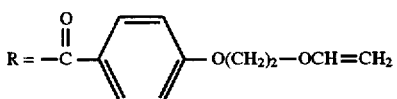

5-1

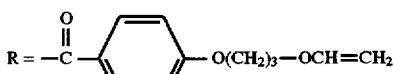

5-2

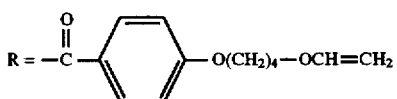

5-3

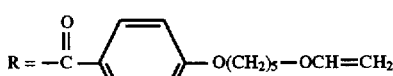

5-4

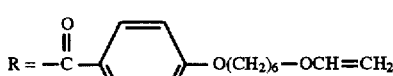

5-5

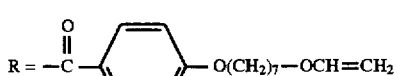

5-6

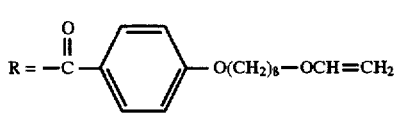

5-7

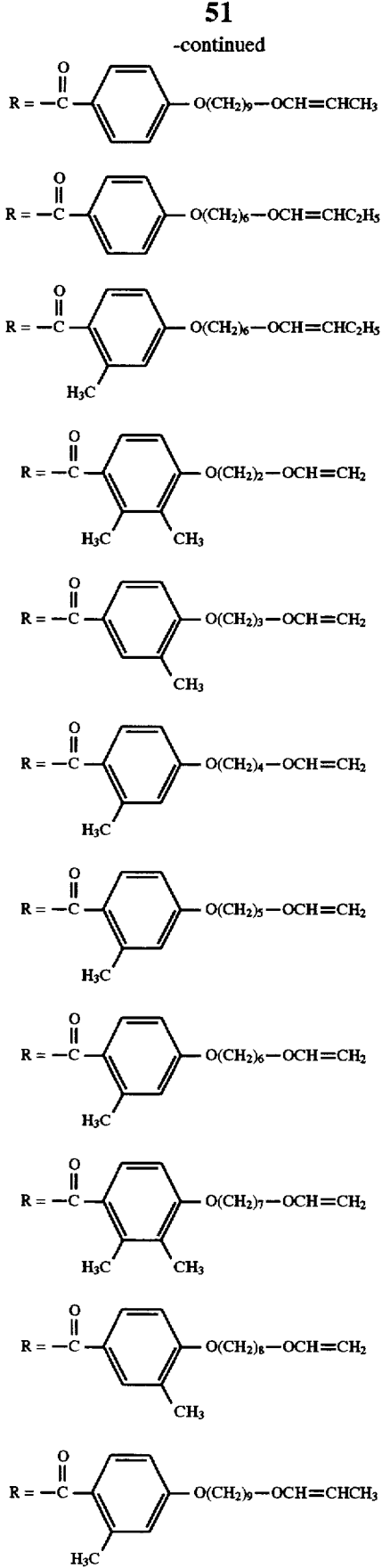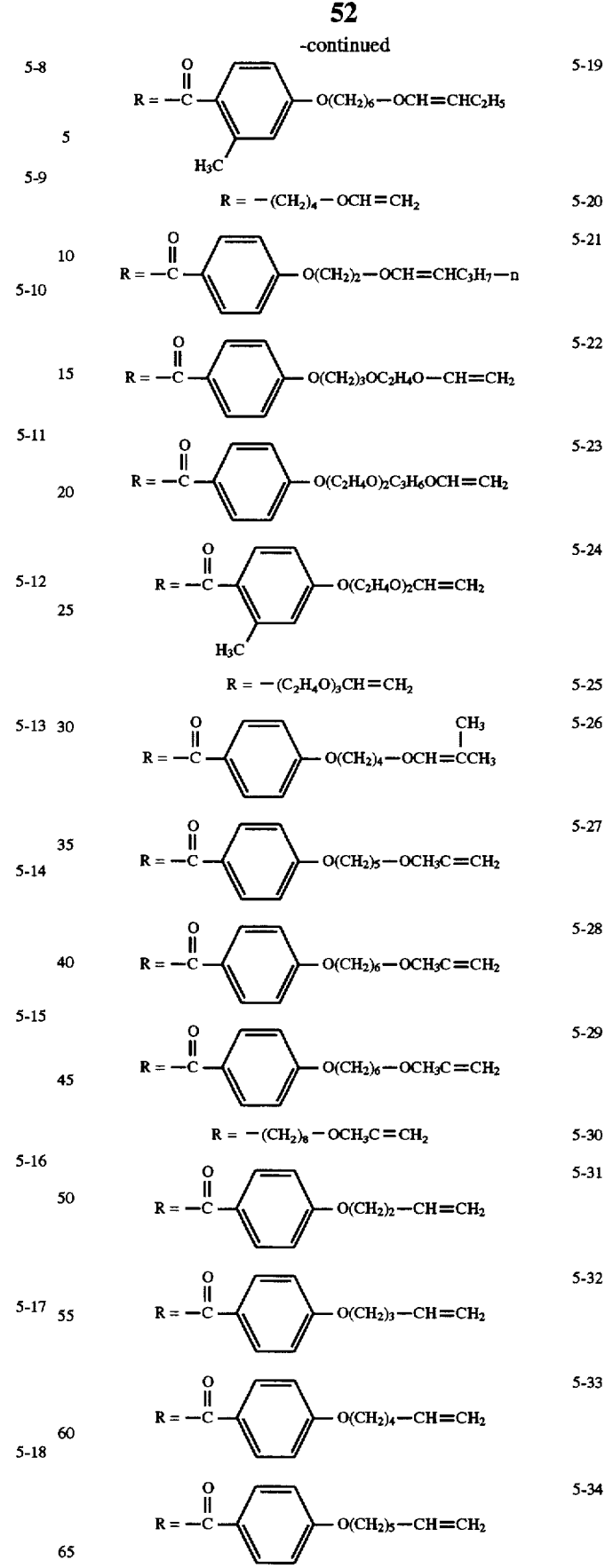

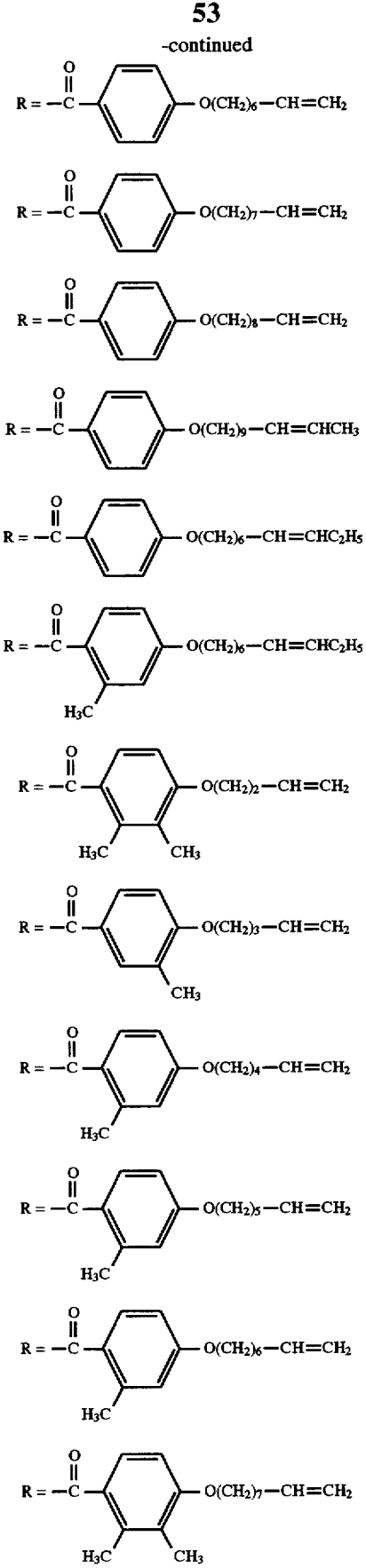
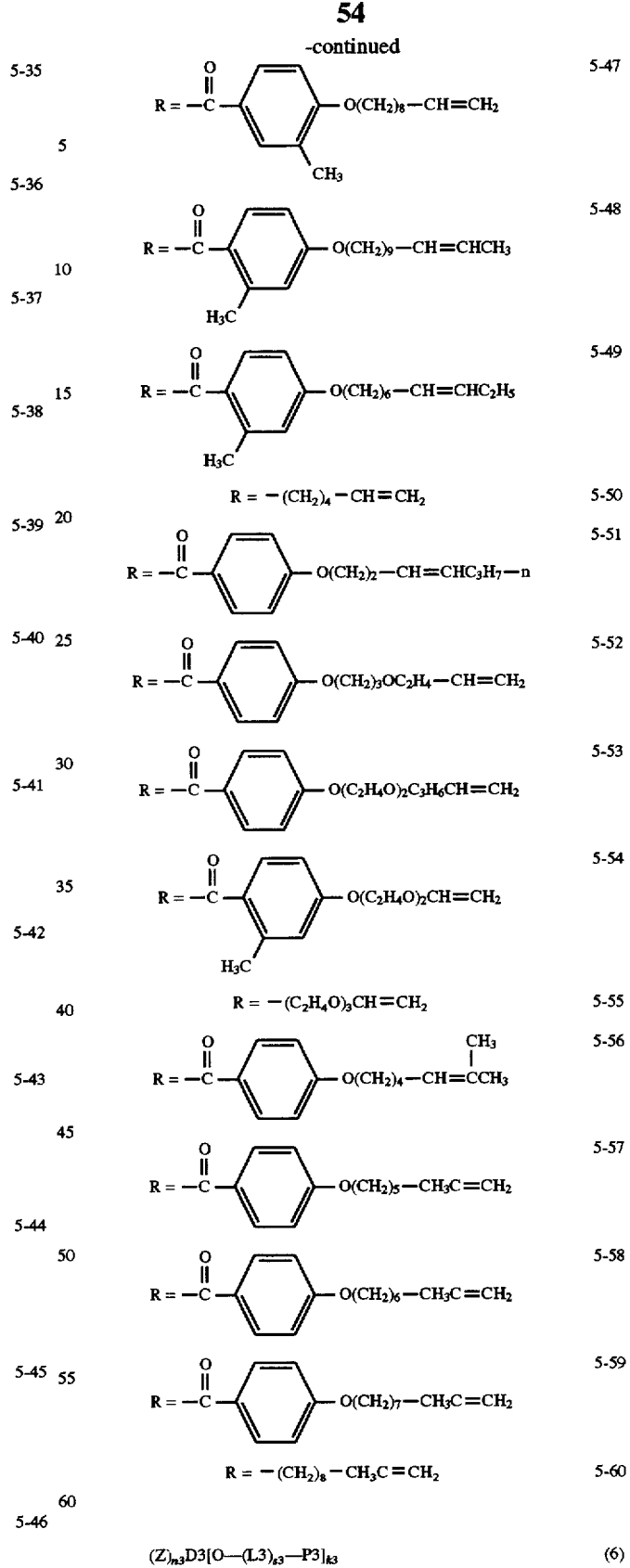
$$(Z)_{n3}D3[O-(L3)_{t3}-P3]_{k3} \qquad (6)$$
wherein D3 represents a benzene ring or naphthalene ring, Z, represents a hydrogen atom, an alkyl group of 1 to 12 carbon atoms or an alkoxy group of 1 to 12 carbon atoms, k3 represents 1, 2 or 3 under the condition of n3+k3=6 when D3 represents a benzene ring and k2 represents 1, 2 or 3 under the condition of n3+k3=6 when D3 represents a naphthalene ring, s3 represents 0 or 1, L3 is the following group:

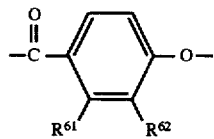

in which each of $R^{61}$ and $R^{62}$ represents independently a hydrogen atom or methyl group, and P3 represents the following group:

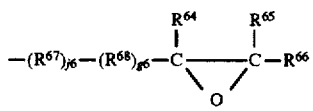

in which $R^{67}$ represents an alkyleneoxy group of 1 to 6 carbon atoms, j6 represents an integer of 0 to 4, $R^{68}$ represents an alkylene group of 1 to 12 carbon atoms, g6 represents an integer of 0 to 4, and each of $R^{64}$, $R^{65}$ and $R^{66}$ represents independently a hydrogen atom or an alkyl group of 1 to 12 carbon atoms.

Z generally is a hydrogen atom, an alkyl group of 1 to 9 carbon atoms (e.g., methyl, ethyl, n-propyl, isopropyl or n-butyl), or an alkoxy group of 1 to 9 carbon atoms (e.g., methoxy, ethoxy, n-propoxy, isopropoxy or n-butoxy). Z preferably is hydrogen, methyl, ethyl, methoxy or ethoxy, and more preferably hydrogen or methyl. Z is especially preferred to be hydrogen.

$R^{61}$ and $R^{62}$ represent independently a hydrogen atom or a methyl group.

Each of $R^{64}$ and $R^{65}$ generally represents independently a hydrogen atom or an alkyl group of 1 to 9 carbon atoms (e.g., methyl, ethyl, n-propyl, isopropyl, n-butyl, pentyl, hexyl, heptyl, octyl or nonyl). $R^{64}$ and $R^{65}$ preferably are a hydrogen atom or an lower alkyl group such as methyl or ethyl, and it is especially preferred that $R^{64}$ and $R^{65}$ are hydrogen.

$R^{66}$ represents a hydrogen atom, an alkyl group (e.g., methyl, ethyl, n-propyl, isopropyl, n-butyl, pentyl, hexyl, heptyl, octyl or nonyl). $R^{66}$ generally is a hydrogen atom or a lower alkyl (e.g., methyl, ethyl or isopropyl), and preferably is hydrogen or methyl. $R^{66}$ may be a substituted alkyl group (e.g., 2-chloroethyl, 3-methoxyethyl or methoxyethoxyethyl).

$R^{67}$ represents an alkyleneoxy group of 1 to 6 carbon atoms, preferably an alkyleneoxy group of 1 to 4 carbon atoms. j6 represents an integer of 0 to 4, preferably an integer of 0 to 3. Examples of the alkyleneoxy group include ethyleneoxy, propyleneoxy, butyleneoxy, pentyleneoxy, hexyleneoxy, heptyleneoxy, and a substituted alkyl-eneoxy (e.g., ethyleneoxyethoxy). Examples of the polyalkyleneoxy groups include diethyleneoxy, triethyleneoxy, tetraethyleneoxy, dipropyleneoxy and dibutyleneoxy.

$R^{68}$ represents an alkylene group of 1 to 12 carbon atoms, preferably an alkylene group of 1 to 9 carbon atoms. g6 represents an integer of 0 to 1. Examples of the alkylene group include ethylene, propoylene, butylene, pentylene, hexylene and heptylene.

The groups of the number k3 which are bonded to a benzene or naphthalene group may be the same or different from each other. k3 preferably is 2 or 3.

Preferred examples of R of the above formulae (I)-(XVI) (R is the aformentioned —[(L3)$_{s3}$—P3]), are set forth below.

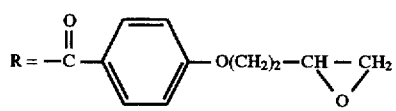
6-1

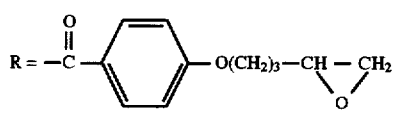
6-2

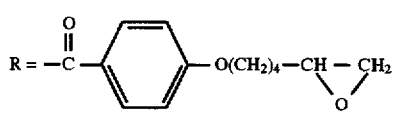
6-3

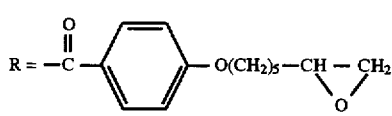
6-4

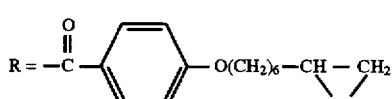
6-5

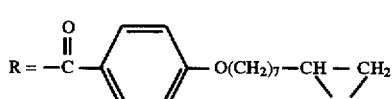
6-6

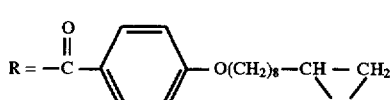
6-7

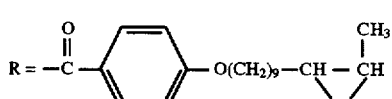
6-8

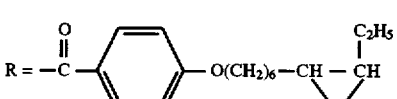
6-9

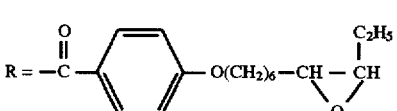
6-10

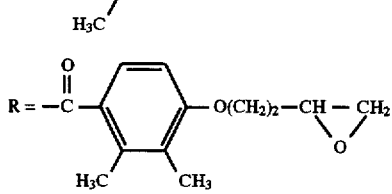
6-11

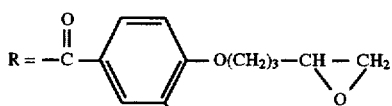
6-12

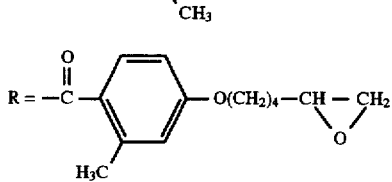
6-13

-continued 6-14 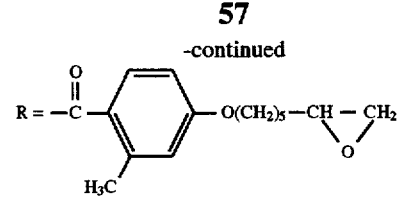

6-15 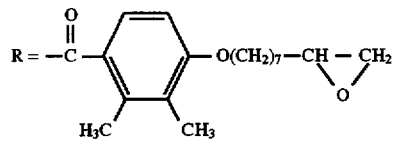

6-16 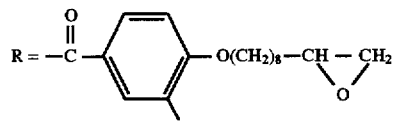

6-17 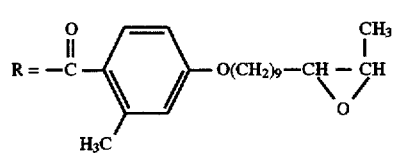

6-18 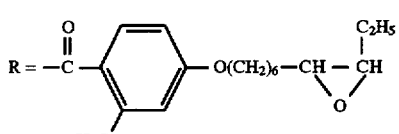

6-19 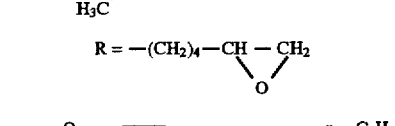

6-20 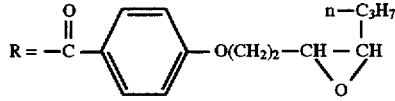

6-21 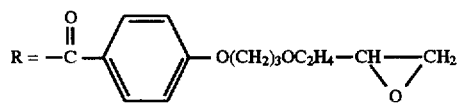

6-22 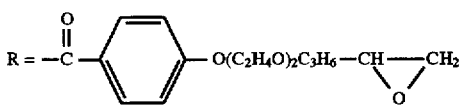

6-23 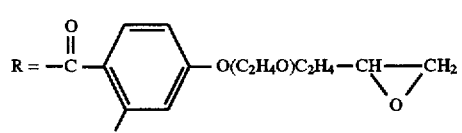

6-24 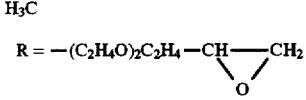

6-25 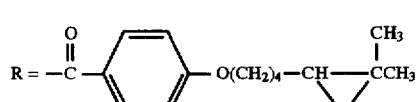

6-26

-continued 6-27 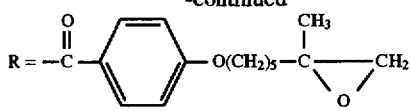

6-28 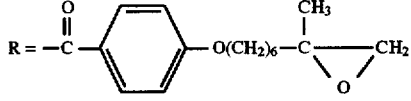

6-29 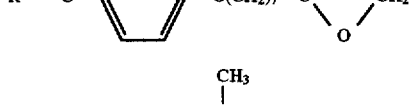

6-30 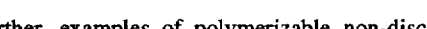

Further, examples of polymerizable non-discotic compounds include the compounds (a-1), a-2), b-1) to b-3), d)) set forth below.

a-1) 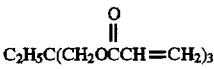

a-2) 

b) 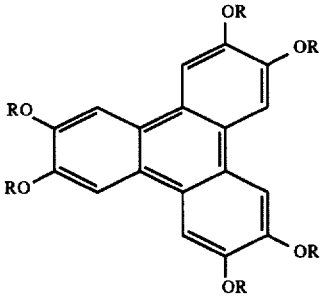

b-1) 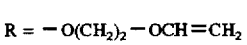

b-2) 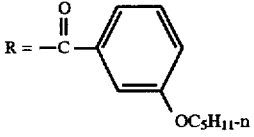

b-3) 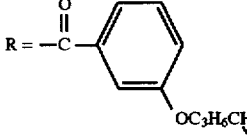

d) 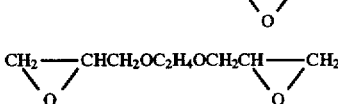

In the case that the compound for preparing the polymer is a mixture of the polymerizable discotic compound having liquid crystalline property and the polymerizable non-discotic compound, the mixture is a novel composition. It is preferred to employ the compound of the formula (1), (2) or (3) as the polymerizable discotic compound and the polymerizable non-discotic compound of the formula (4), (5) or (6) as the polymerizable compound having no liquid crystalline property.

Further, the compounds of the formulae (7) and (10), which is contained in the scope of the formula (4), are a novel compound.

$$(Q)_{n4}D4(O-L4-P4)_{k4} \quad (7)$$

wherein D4 represents a benzene ring or naphthalene ring, Q represents a hydrogen atom, an alkyl group of 1 to 12 carbon atoms or an alkoxy group of 1 to 12 carbon atoms, k4 represents 1, 2 or 3 under the condition of n4+k4=6 when D4 represents a benzene ring and k4 represents 1, 2 or 3 under the condition of n4+k4=8 when D4 represents a naphthalene ring, L4 is the following group:

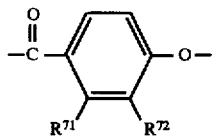

in which each of $R^{71}$ and $R^{72}$ represents independently a hydrogen atom or a methyl group, and P4 represents the following group:

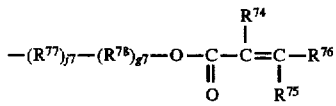

which $R^{77}$ represents an alkyleneoxy group of 1 to 6 carbon atoms, j7 represents an integer of 0 to 4, $R^{78}$ represents an alkylene group of 1 to 12 carbon atoms, g7 represents an integer of 0 to 4, and each of $R^{74}$, $R^{75}$ and $R^{76}$ represents independently a hydrogen atom of an alkyl group of 1 to 12 carbon atoms.

$R^{77}$, j7, $R^{78}$, g7 $R^{74}$, $R^{75}$ and $R^{76}$ have the same meanings as $R^{67}$, j6, $R^{68}$, g6, $R^{64}$, $R^{65}$ and $R^{66}$ of the formula (6).

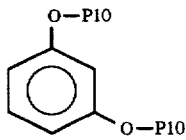

wherein P10 represents the following group:

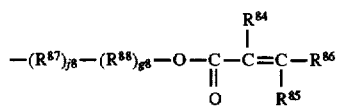

which $R^{87}$ represents an alkyleneoxy group of 1 to 6 carbon atoms, j8 represents an integer of 0 to 4, $R^{88}$ represents an alkylene group of 1 to 12 carbon atoms, g8 represents an integer of 0 to 4, and each of $R^{84}$, $R^{85}$ and $R^{86}$ represents independently a hydrogen atom or an alkyl group of 1 to 12 carbon atoms.

$R^{87}$, j8, $R^{88}$, g8 $R^{84}$, $R^{85}$ and $R^{86}$ have the same meanings as $R^{67}$, j6, $R^{68}$, g6, $R^{64}$, $R^{65}$ and $R^{66}$ of the formula (6).

The optical compensatory sheet of the invention comprises the optically anisotropic layer comprising the polymer which is, for example, prepared from the above-mentioned polymerizable discotic compound having liquid crystalline property, or the polymerizable non-discotic compound and the above-mentioned polymerizable discotic compound or polymerizable discotic compound having no liquid crystalline property. The optically anisotropic layer can be, for example, formed by coating a solution of the above compound(s) on a support or an orientation layer thereon, preferably orienting the coated layer (e.g., under heating), and then curing the coated layer by the means of a light or heating; or by coating a solution of a polymer prepared from the above compound(s) and further using other compound if desired, on a support or an orientation layer thereon, preferably orienting the coated layer (e.g., under heating or by stretching treatment), and then cooling the coated layer. The resultant optically anisotropic layer may be employed in itself, or employed in the form of a polymer film obtained by peeling the coated layer from a support. Otherwise, a polymer solution may be coated on a support, dried and peeled to form a polymer film, and then subjecting the film to a stretching treatment.

Preferred polymers employable for the polymer solution include polymers having the following units or structures:

DP-1

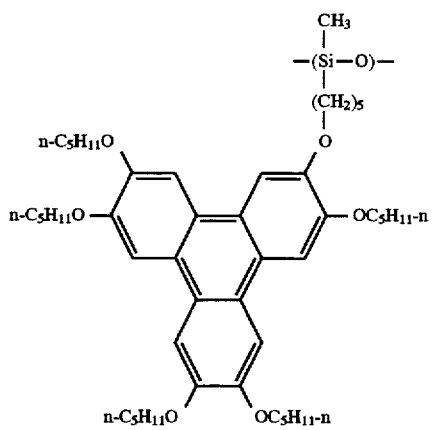

-continued
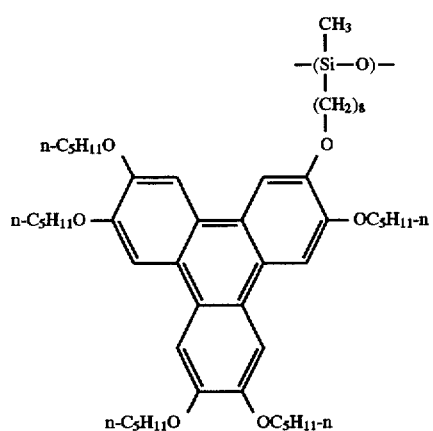
DP-2
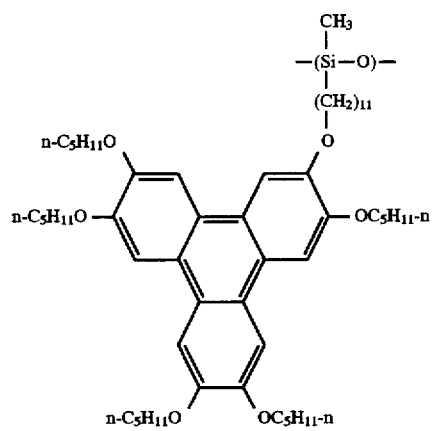
DP-3
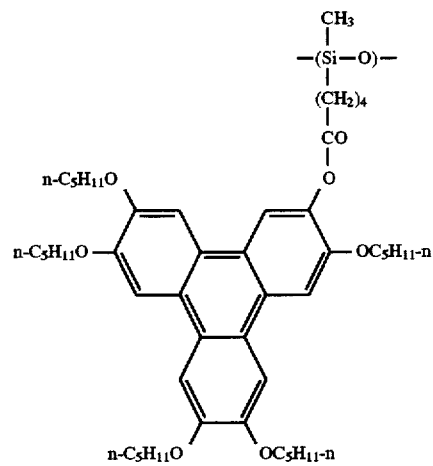
DP-4

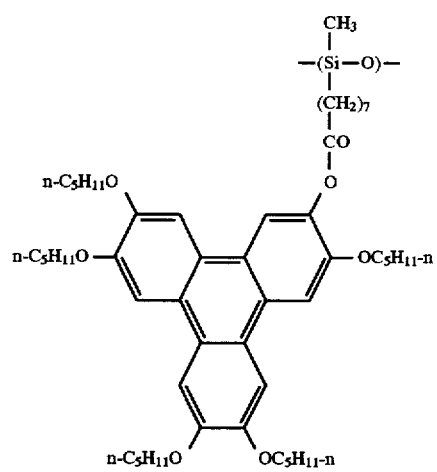
DP-5
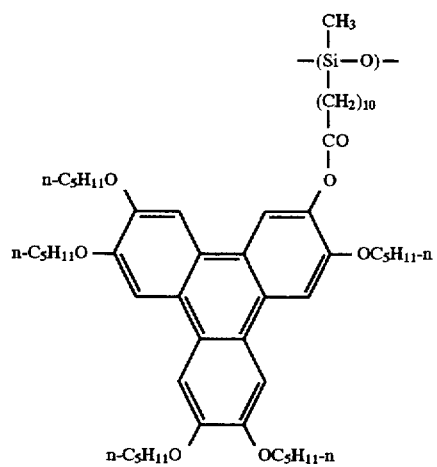
DP-6
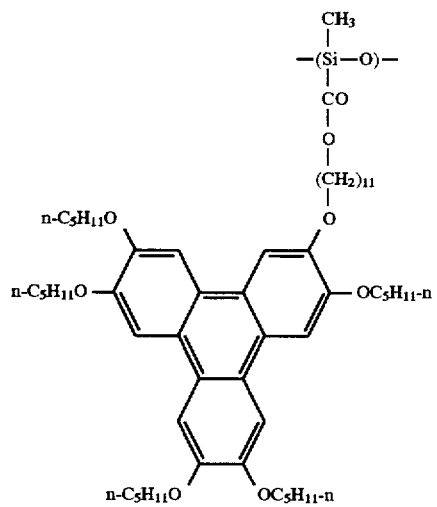
DP-7

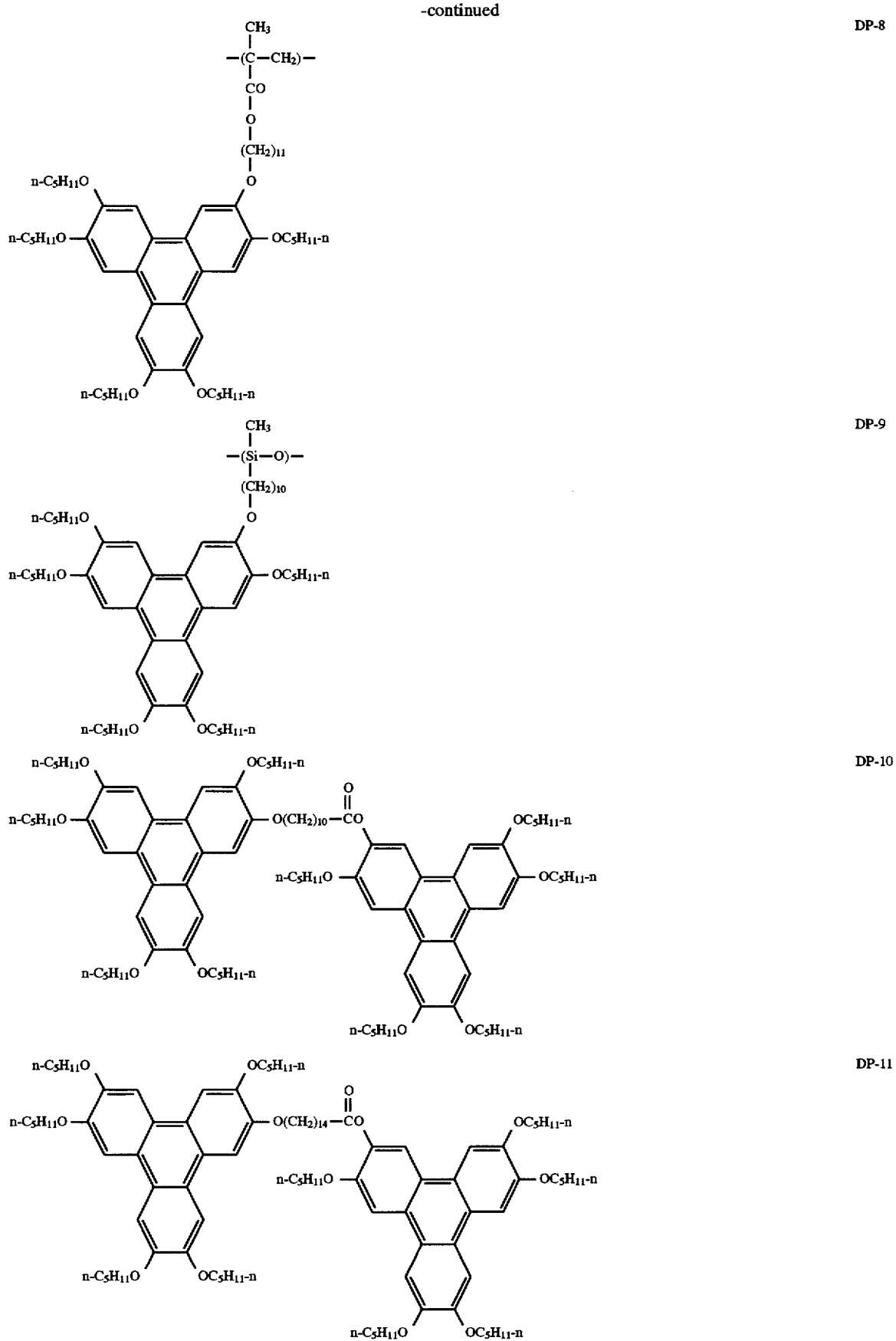
DP-8
DP-9
DP-10
DP-11

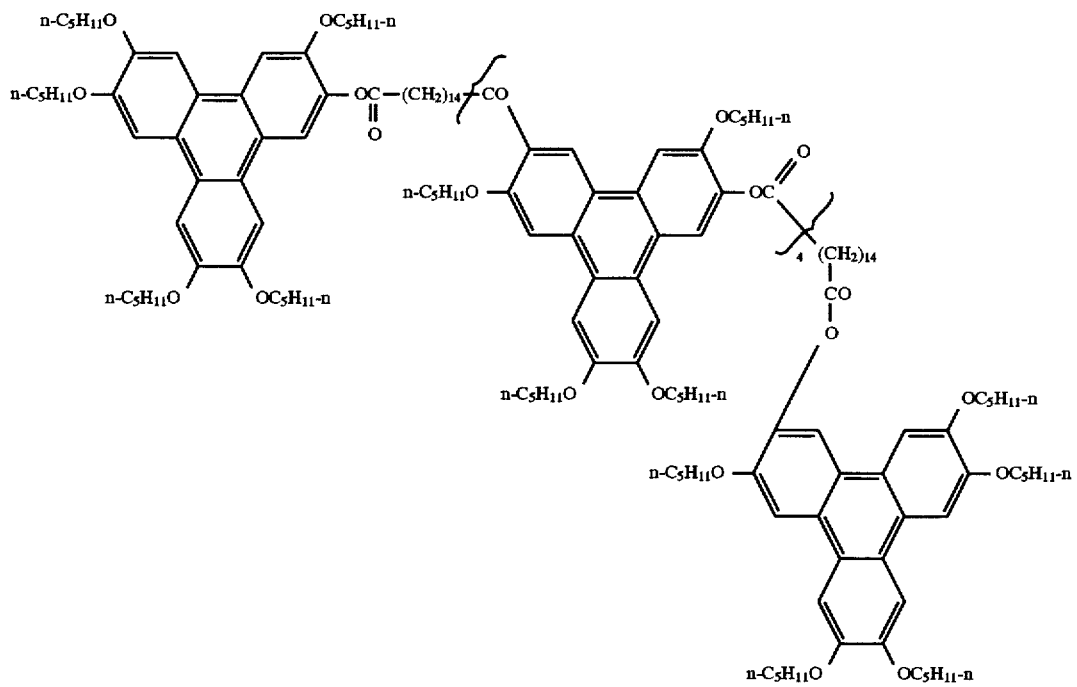
DP-12
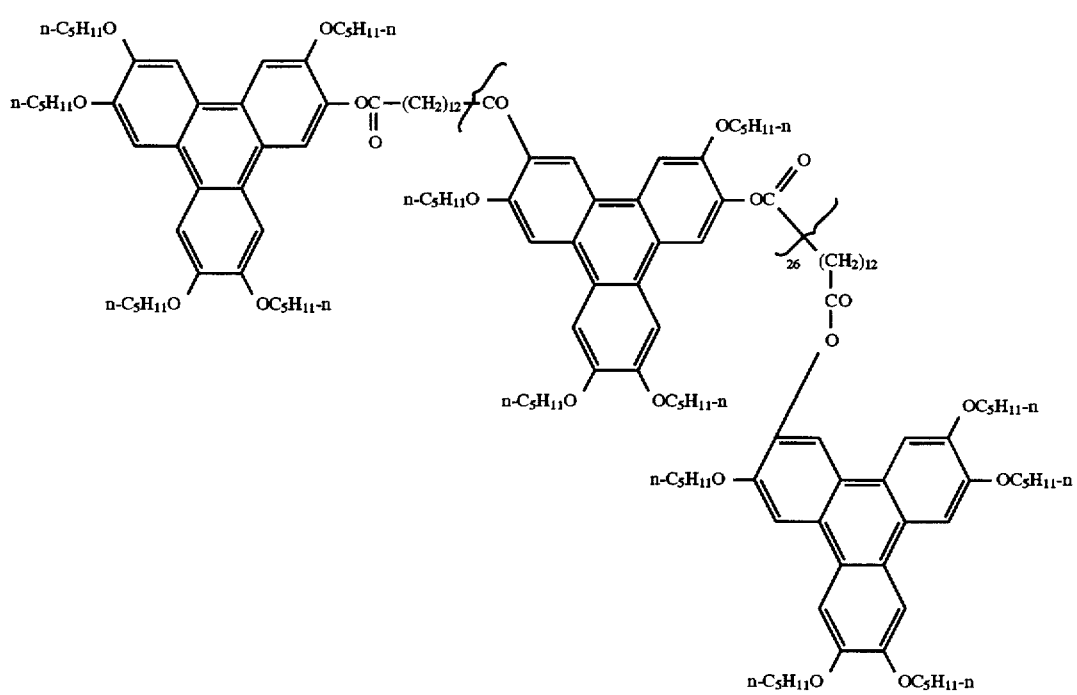
DP-13

-continued

DP-14

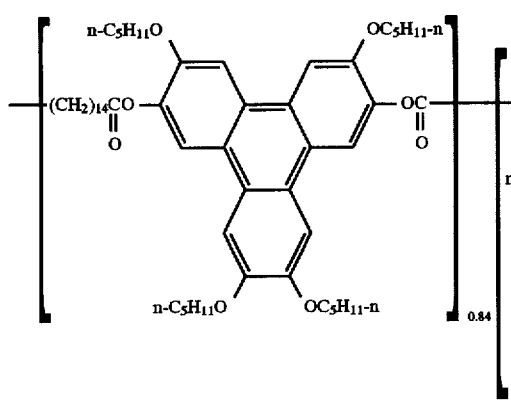 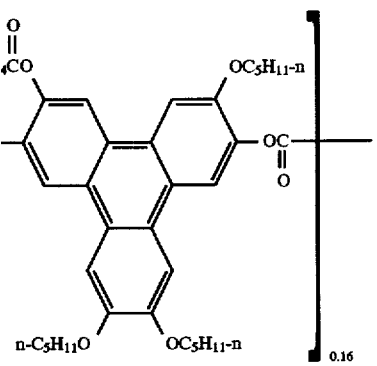

The above mentioned polymer (DP-1 to DP-14) can be advantageously prepared using the compounds D-1 to D-24 previously described.

The polymer having discotic structure at side chain can be, for example, synthesized according to the processes described in Macromol. Chem. Rapid Commun.(Vol. 4, pp. 807, 1983), and Liquid Crystals (Vol. 4, pp. 165, 1989).

The polymer having discotic structure at main chain can be, for example, synthesized according to the processes described in Macromol. Chem. Rapid Commun.(Vol. 6, pp. 367, 1985).

The optical compensatory sheet of the invention may be composed of only the optically anisotropic layer of the polymer. Generally, the sheet is composed of a transparent support and the layer of discotic liquid crystal thereon, and it is preferred that an orientation layer is further provided between the support and the layer of discotic liquid crystal. The orientation layer may be provided on the optically anisotropic layer in the case that the optically anisotropic layer plurally provided on the support. A protective film or the support may be provided on the layer or on another side of the support.

As material of the transparent support of the invention, any material can be employed so long as it is transparent. The material preferably has a transmittance of not less than 80% and specially shows optical isotropy when it is viewed from a front side. Further, the film preferably has a negative uniaxial property and an optic axis in the normal line direction.

Therefore, the film is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

However, materials having a large intrinsic birefringence such as polycarbonate, polyarylate, polysulfone and polyethersulfone can be also employed by rendering the materials optically isotropic by appropriately controlling molecular orientation in a procedure of forming a film.

The transparent film generally satisfies the condition of:

$$|nx-ny|/|nx-nz| \leq 0.2$$

in which nx and ny is main refractictive indices within the film and nz is a main refractive index in a thickness direction of the film.

The transparent film preferably satisfies the condition of:

$$0 \leq |nx-ny| \times d \leq 50 \text{ (nm)}$$

and more preferably:

$$0 \leq |nx-ny| \times d \leq 20 \text{ (nm)}$$

in which nx and ny has the same meanings as above and d is a thickness direction of the film.

Especially, the transparent film preferably satisfies the condition of:

$$20 \leq [(nx+ny)/2-nz] \times d \leq 400 \text{ (nm)}$$

in which nx, ny and nz have the same meanings as above, whereby the viewing angle can be greatly increased. Further, the transparent film preferably satisfies the condition of:

$$30 \leq [(nx+ny)/2-nz] \times d \leq 150 \text{ (nm)}$$

"nx", "ny", "nz" and "d" described above are shown in FIG. 1. "nx" and "ny" are main refractictive indices on the plane of the film, "nz" is a main refractive index in a thickness direction of the transparent film and d is the thickness of the film.

The orientation layer is generally provided on the transparent support. The orientation layer has a function of defining an orientation direction of a discotic liquid crystal provided thereon by a coating method, and the orientation gives an optic axis inclined (preferably at 5 to 50 degrees) from an optical compensatory sheet. As the orientation layer, any layers can be employed so long as they are capable of imparting orientation property to a layer of liquid crystal. Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniurnchloride, methyl stearate or an azobenzene derivative, that is isomerized by means of light to form a thin film of the molecules tilted uniformly in a certain direction, can be used as the orientation layer. In addition, a layer prepared by orienting dielectric materials by application of electric field or magnetic field can be employed as the orientation layer.

Examples of material for the orientation layer include polymers such as polymethyl metacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and organic substances such as silan coupling agents.

Preferred examples of polymers for the orientation layer include polyimide, polystyrene, gelatin, polyvinyl alcohol and polyvinyl alcohol having an alkyl group (preferably having 6 or more carbon atoms). Orientation layers obtained by subjecting films of these polymers to orientation treatment, are capable of tilting obliquely discotic liquid crystal. Further, silylated agent treated glass plate can be employed as the support having the orientation layer.

The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$H$_5$)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

Polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the discotic liquid crystal can be rubbed in the known manner which is conventionally employed to prepare an orientation layer for liquid crystal of LCD. In more detail, the treatment is to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer in several times using cloth.

As the orientation layer, an obliquely deposited layer of an inorganic compound is also employable. Examples of the inorganic compounds include metal oxides or metal fluorides such as SiO, TiO$_2$, MgF$_2$ and ZnO$_2$ and metals such as Au and Al. As the inorganic compound, any compounds can be employed so long as they have high dielectric constant (permittivity). The obliquely deposited layer of an inorganic compound can be prepared using the metallizing apparatus. The support may be metallized in the fixed condition, or the continuous support may be continuously metallized to give a continuous layer.

Other methods for orienting a layer of discotic compound having liquid crystalline property with using the orientation layer, include those applying magnetic field or electric field to the layer provided on a support at desired angle under heating for forming discotic nematic phase.

The optical compensatory sheet is preferably prepared by forming an orientation layer on a transparent support and forming an optically anisotropic layer on the orientation layer, as mentioned above.

Figure 2:
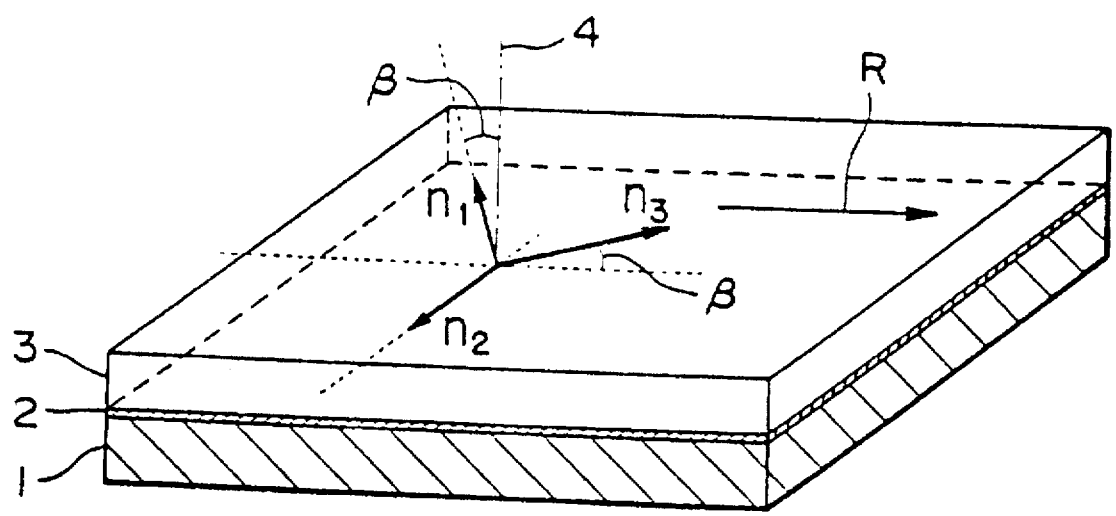
FIG. 2 is a view schematically showing the refractive indices of the three axes of the optical compensatory sheet of the invention.

The representative structure of the optical compensatory sheet employed in the invention is shown in FIG. 2. In FIG. 2, a transparent support 1, an orientation layer 2 and an optical compensatory layer 3 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number β is an inclined angle of the optic axis from the normal 4 of the optical compensatory sheet.

The negative uniaxial property, that the optical compensatory sheet of the invention generally has, means property as satisfies the condition of:

$$n_1 < n_2 = n_3$$

in which $n_1$, $n_2$ and $n_3$ are refractive indices in the three axes directions of a optical compensatory sheet and $n_1$, $n_2$ and $n_3$ satisfy $n_1 \leq n_2 \leq n_3$. However, $n_2$ and $n_3$ are not required to be strictly equal to each other and it will be satisfied that they are approximately equal to each other. In more detail, there is no problem in practical use as long as the negative uniaxial property satisfies the condition of:

$$|n_2 - n_3|/|n_2 - n_1| \leq 0.2$$

in which $n_1$, $n_2$ and $n_3$ have the meanings described above.

In order to greatly improve the viewing angle characteristics of TN-LCD or TFT-LCD, the optic axes of the optical compensatory sheet is generally inclined at 5 to 50 degrees from a normal line of the sheet (β in FIG. 2), preferably 10 to 40 degrees and especially 10 to 30 degrees.

Further, it is preferred that the sheet satisfies the condition of:

$$50 \leq [(n_3+n_2)/2 - n_1] \times D \leq 400 \text{ (nm)}$$

in which D is a thickness of the sheet; and especially the condition of:

$$100 \leq [(n_3+n_2)/2 - n_1] \times D \leq 400 \text{ (nm)}$$

The protective film may be provided on the discotic liquid crystal layer or on the reverse side (side having no layer) of the transparent support. Examples of material of the protective film include polymethyl metacrylate, acrylic acid/methacrylic acid copolymer, styrene/maleinimide anhydride copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate.

The optically anisotropic layer of the invention can be, for example, prepared by the steps of: coating a solution which contains a polymerizable discotic compound having liquid crystalline property, or a polymerizable discotic compound having liquid crystalline property and at least one of a polymerizable discotic compound having no liquid crystalline property and a polymerizable non-discotic compound, heating the coated layer to temperature for forming the discotic nematic phase, radiating light on the coated layer or applying heat to the coated layer in the condition of the phase to cure, and cooling the cured layer. The resultant cured layer has good heat-resistance and inclined optic axis.

The curing is preferably conducted by radiation of light (preferably ultraviolet (UV) light) from the viewpoint of productivity. The curing is preferably conducted after the coated layer is converted to a layer of discotic nematic phase. A mono-domain orientation can be generally obtained by heating the coated layer at higher side temperatures of the range of temperatures for discotic nematic phase.

For curing the coated layer, the solution of the polymerizable compound preferably contains photopolymerization initiator or (heat)polymerization initiator. Preferred groups in the curing include vinyl, acryloyl and epoxy. The compound having epoxy can be cured by cationic polymerization, but can be cured by orienting the coated layer containing the compound for a short time and then heating the layer at a temperature higher than the orienting temperature by a dozens of degree to polymerize.

Examples of the photopolymerization initiator include α-carbonyl compounds seen in U.S. Pat. No. 2,367,661 and U.S. Pat. No. 2,367,670, acyloin ethers described in U.S. Pat. No. 2,448,828, aromatic acyloin ethers substituted with α-hydrocarbon group described in U.S. Pat. No. 2,722,512, multi-nuclei quinone compounds described in U.S. Pat. No. 3,046,127 and U.S. Pat. No. 2,951,758, a combination of triarylimidazole and p-aminophenylketone described in U.S. Pat. No. 3,549,367, acridine and phenazine compounds described in U.S. Pat. No. 4,239,850, and oxadiazole compounds described in U.S. Pat. No. 4,212,970.

The amount of the photopolymerization initiator preferably is in the range of 0.01 to 20 weight parts, especially 0.5 to 5 weight parts, based on the amount of the polymerizable compound.

If desired, the solution of the polymerizable compound may contain various amine compounds. Examples of the amine compounds include triethanolamine, diethanoleaniline, ethyl ester of p-dimethylaminobenzoic acid and Michler's ketone. The amount of the amine compound preferably is in the range of 50 to 200 weight parts, based on the amount of the photopolymerization initiator. Further, compounds of hydrogen donor such as N-phenylglycine, 2-mercaptobenzothiazole and alkyl ester of N,N-dialkylaminobenzoic acid may be added to the solution of the polymerizable compound. Furthermore, a small amount of surface active agent may be added to the solution of the polymerizable compound to depress inhibition of polymerization by oxygen.

Examples of UV-activating cationic catalysts for polymerizable compounds having epoxy include allyldiazonium salts (e.g., hexafluorophosphate and tetrafluoroborate), diallyliodonium salt, allylonium salt of VII group (e.g., allylosulfonium salt having anion such as $PF_6$, $AsF_6$ or $SbF_6$).

Examples of light radiation for polymerization include electron beam, UV light, visible ray and infrared ray (heat radiation). Preferred is UV light. Examples of light source of the UV light include low-pressure mercury lamp (e.g., germicide, fluorescent chemical lamp or black lamp), high-pressure discharge lamp (e.g., high-pressure mercury lamp or metal halide lamp), and short-arc discharge lamp (super high-pressure mercury lamp, xenon lamp or mercury-xenon lamp).

For example, in the case of employing the high-pressure mercury lamp, irradiation is generally conducted in intensity of irradiation of 20 to 5,000 mJ, and preferably 100 to 800 mJ.

The polymerizable discotic compound (e.g., compounds represented by the formulae (1) to (3)) has λmax at wavelength of not more than 274 nm, and therefore light source emitting UV light at short wavelengths (e.g., 254 nm) is not suitably employed. Hence, preferred are the photopolymerization initiator having light absorption in region of near ultraviolet and light source emitting light in region of near ultraviolet (high-pressure mercury lamp or metal halide lamp).

Preferred examples of the photopolymerization initiator are as follows:

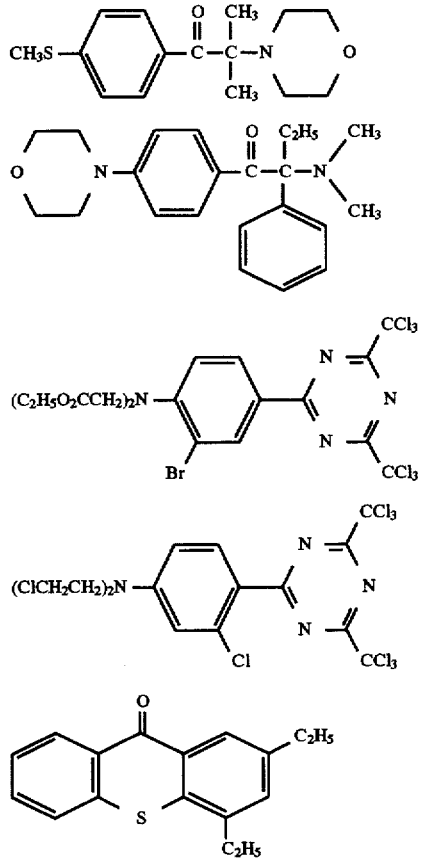

The solution for forming the optically anisotropic layer is prepared by dissolving the polymerizable compound(s) in a solvent.

Examples of solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

Examples of the method for coating the above solution thereof include curtain coating method, extrusion coating method, roll coating method, dip coating method, spin coating method, print coating method, coating method using slide coater and spray coating method. In the invention, vapor deposition method may be used, in the case of a mixture of only discotic compounds. In the invention, a continuously coating method is preferred. Therefore, coating methods such as curtain coating method, extrusion coating method, roll coating method and coating method using slide coater are preferred.

Otherwise, the optically anisotropic layer can be prepared by the steps of: coating a solution which contains the polymer in an organic solvent on an orientation layer provided on a transparent support to form a coated layer, heating the coated layer to a temperature of not less than glass transition point (heat-treatment), and cooling the layer to a temperature of not more than glass transition point.

The polymer solution preferably contains the polymer in the range of 5 to 50 weight %, especially 10 to 30 weight %. Examples of the method for coating the above solution thereof includes roll coating method, dip coating method, spin coating method, and gravure coating method.

The above heat treatment is preferably carried out in the range between temperature of not less than glass transition point preferably and temperature for forming isotropic phase. Generally, the heat treatment is conducted at a temperature of 50° C. to 300° C., especially 100° C. to 250° C. Further, he heat treatment is preferably conducted for 10 seconds to 60 minutes, especially 20 seconds to 3 minutes.

Further, the optical compensatory sheet of the invention can be prepared by the steps of: casting a solution containing a polymer having a discotic structure in its molecule on a support to form a film, and squeezing the film between two rolls having different peripheral speeds from each other to give shearing stress between both sides of the sheet. The ratio of peripheral speeds of the two rolls is in the range of 1.001 to 1.1, especially 1.01.

Furthermore, the optical compensatory sheet can be prepared by the steps of: casting or coating a solution containing a polymer having a discotic structure in its molecule on a support to form a film, and stretching the film at a temperature near glass transition point. The stretching magnification preferably is in the range of 1 to 50 times especially 3 to 8 times.

A thickness of the compensatory sheet generally is so determined as to equal to the product of birefringence of the layer and the thickness to the retardation of the liquid crystal cell. The thickness generally is in the range of 0.1 to 10 μm, preferably 1 to 3 μm.

Moreover, the optical compensatory sheet having inclined optic axis can be prepared applying magnetic field or electric field to the film (obtained by casting or coating) at desired angle under heating at a temperature of not less than glass transition temperature.

Figure 3:
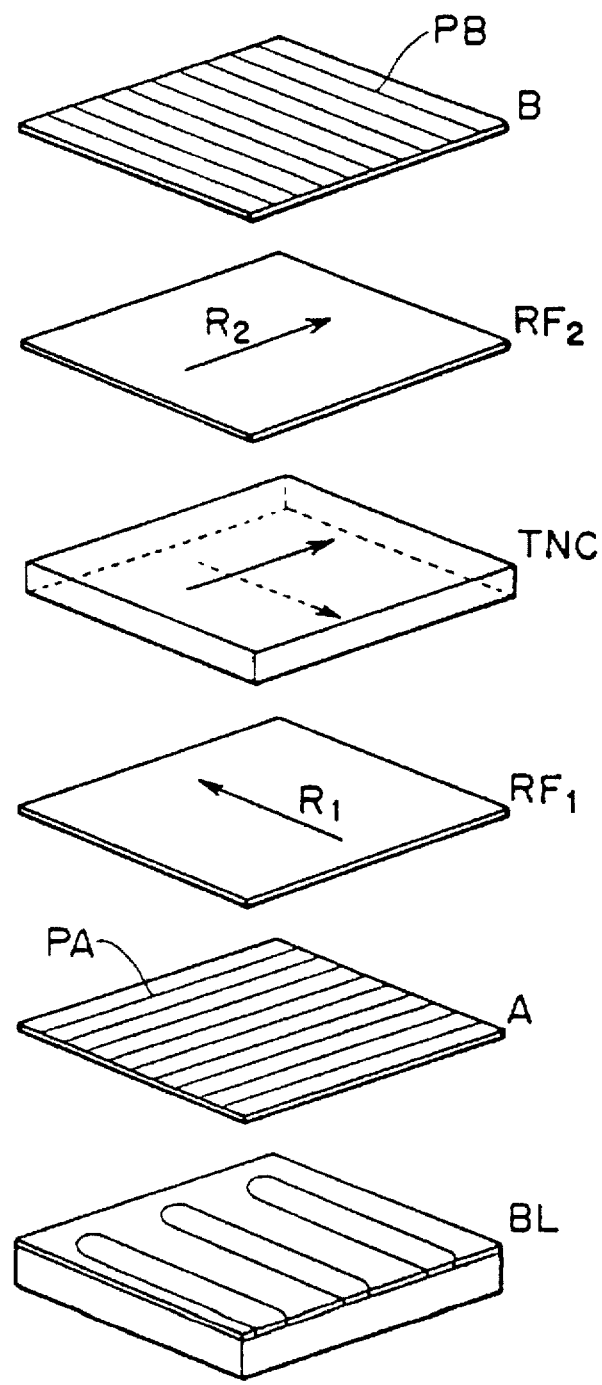
FIG. 3 is a view schematically showing the representative structure of the liquid crystal display of the invention.

The representative structure of the liquid crystal display of the invention is shown in FIG. 3. In FIG. 3, a liquid crystal cell TNC comprising a pair of substrates provided with a transparent electrode and a twist-oriented nematic liquid crystal sealed therebetween, a pair of polarizing sheets A and B arranged on the both sides of the cell, the optical compensatory sheets RF1 and RF2 between the liquid crystal cell and the polarizing sheet and back light BL are assembled to constitute the liquid crystal display. The optical compensatory sheet may be arranged only on one side (i.e., use of one of RF1 and RF2). The reference number R1 is a rubbing direction of the orientation layer of the optical compensatory sheets RF1, and the reference number R2 is the rubbing direction of the orientation layer of the optical compensatory sheets RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

The reason why the optical compensatory sheet indicated in FIG. 2 gives much increase of viewing angle is assumed as follows:

Most of TN-LCD adopt normally white mode. In the mode, a light transmittance in a black display portion extremely increases with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal to a surface of the cell. When an intermediate gradation is displayed, optic axes of the optically anisotropic substances are further inclined from the normal to a surface of the cell.

In the case that an optic axis of the TN-type liquid crystal cell is inclined from the normal to a surface of the cell, use of a optically anisotropic substance having an optic axis in a normal direction is considered not to appropriately compensate the phase difference by the cell. In other words, an optically anisotropic substance is needed for the cell to have an optic axis inclined from the normal. Further, when the cell is regarded as a composite of optically anisotropic substances with a positive uniaxial property, an optically anisotropic substance having a negative uniaxial property is suitably used for compensation of phase difference by the cell. Thus, use of an optically anisotropic substance of a negative uniaxial property having optic axis inclined from the normal (i.e., optical compensatory sheet of the invention) improves viewing angle characteristics.

Furthermore, it is mere approximation that the liquid crystal cell behaves as optically anisotropic substance with a positive uniaxial property having optic axis inclined from the normal. Therefore, use of the optically anisotropic substance does not give much satisfactorily compensation of phase difference.

Thus, the TN-type liquid crystal cell is preferably regarded as a composite of two optically anisotropic substances having a positive uniaxial property which has a inclined angle equal to each other and inclination direction differing from each other. In the case that the TN-type liquid crystal cell is considered as above, great improvement of viewing angle characteristics can be obtained by employing the optical compensatory sheet which is prepared by, for example, superposing an optically anisotropic substance (optically anisotropic layer) having an optically negative monoaxial and an optic axis inclined to the normal, on an optically anisotropic substance (transparent support) having an optically negative monoaxial and an optic axis in the normal direction.

As materials of liquid crystal employed for the liquid crystal cell, any known materials can be employed so long as they are TN-CL or STN-CL.

Examples of the present invention and comparison examples are given below, but these examples by no means restrict the invention.

SYNTHETIC EXAMPLE

The polymerizable discotic compound employable in the invention was synthesized according to the following reaction scheme.

1) Synthesis of 2, 3, 6, 7, 10, 11-hexahydroxytriphenylene (TP-B)

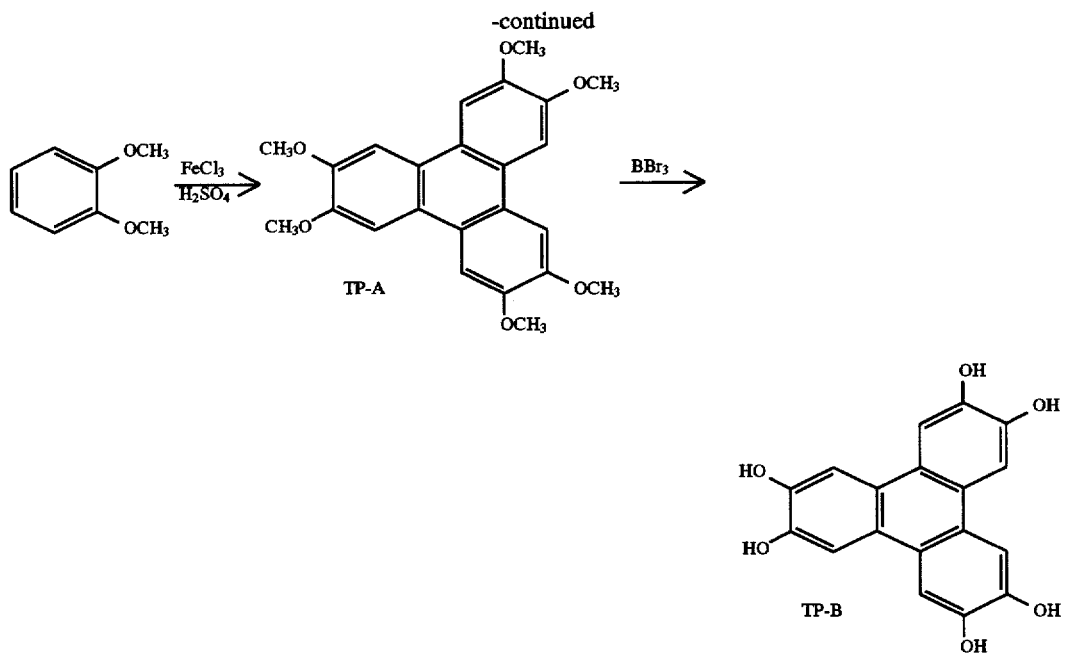
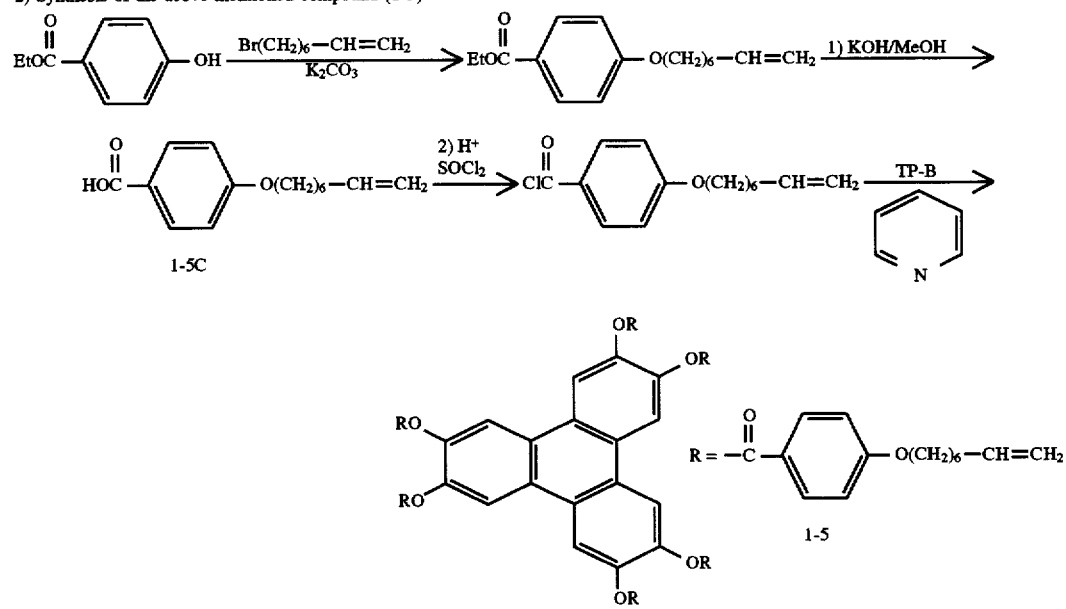
3) Synthesis of the above mentioned compound (1-30)
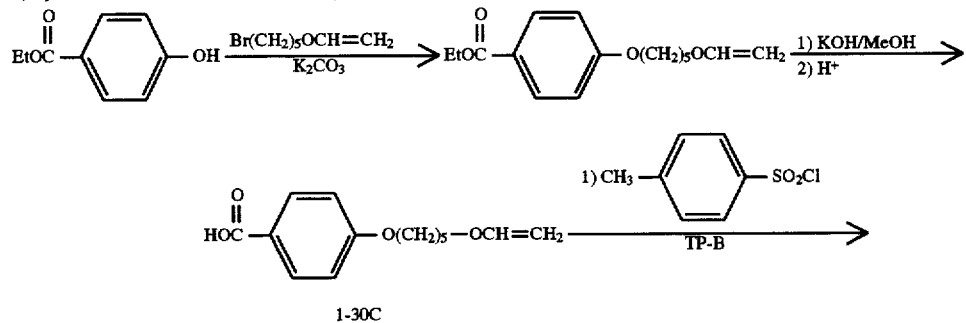

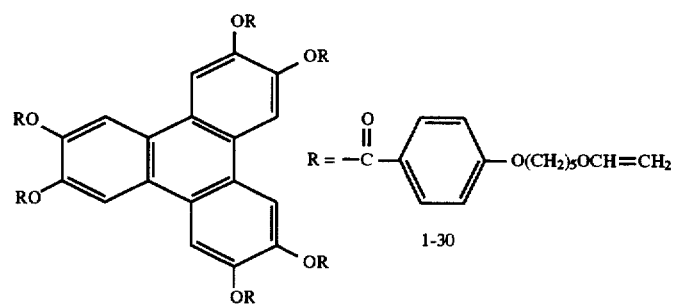
4) Synthesis of the above mentioned compound (3-5)
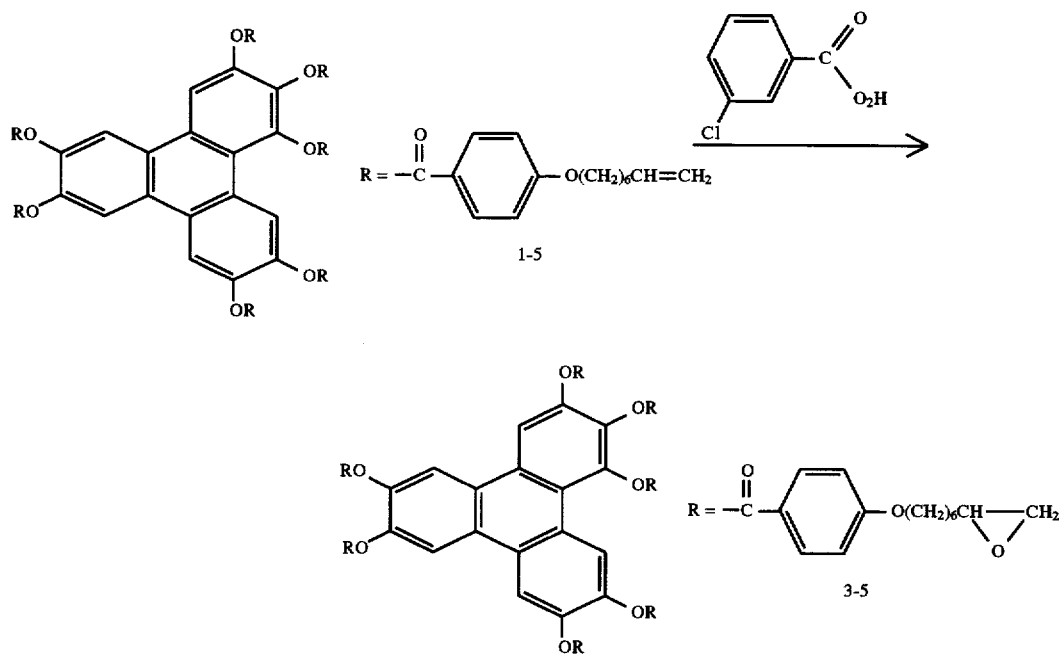
5) Synthesis of the above mentioned compound (2-5)
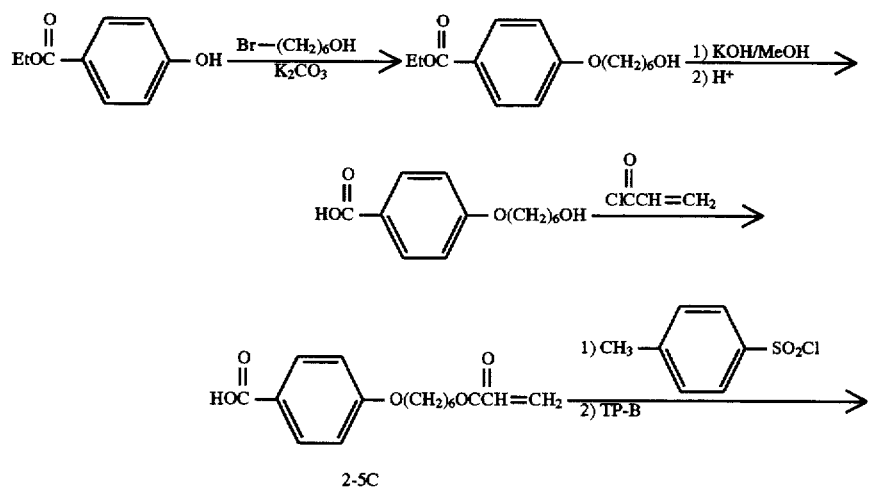

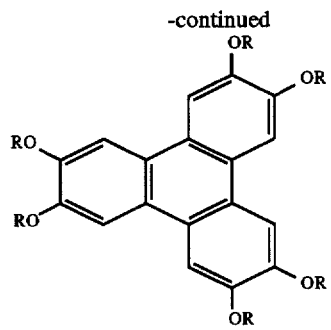
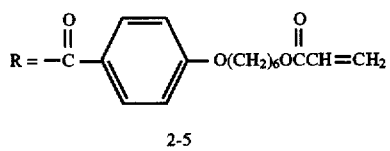

2-5

SYNTHETIC EXAMPLE 1

Synthesis of Discotic Compound (1-5: Above Mentioned Discotic Compound)

1-a) Synthesis of 2,3,6,7,10,11-hexamethoxytriphenylene (TP-A)

In a 2-liter three-necked flask chilled with ice, 455 g of iron(III) sulfate hexahydrate and 193 ml of ice-water were placed, and vigorously stirred to completely dissolve iron (III) sulfate hexa-hydrate in water. Thereafter, 58.7 g of 1,2-dimethoxybenzene was further added to the solution and 882 ml of concentrated sulfuric acid was gradually added with cooling to prepare a mixture. After reaction of 24 hours, 9 liter of ice-water was gradually added to the reaction mixture. After stirring of 5 hours, the reaction mixture was filtered through a glass filter to obtain crude crystals of the above compound (TP-A) of 48.1 g (yield: 83%)

1-b) Synthesis of 2,3,6,7,10,11-hexahydroxytriphenylene (TP-B)

In 850 ml of dichloromethane, 48.1 g of the compound (TP-A) was suspended to prepare a suspension and 150 g of boron trifluoride was gradually added to the suspension. After reaction of 2 hours, 7 l (liter) of ice water was added to the suspension, and the suspension was filtered through Celite (diatomaceous earth). After the obtained residue containing Celite was dissolved in methanol and filtered, the filtrate was concentrated in vacuo, and the resultant residue was washed with a mixed solvent of acetonitrile and dichloromethane to obtain the above compound (TP-B) of 32.7 g (yield: 86%).

1-c) Synthesis of 4-(7-octenyloxy)-benzoic Acid (1-5c)

In a 500 ml three-necked flask were placed 33.2 g of p-hydroxybenzoic acid, 57.3 g of 8-bromo-1-octene, 41.5 g of potassium carbonate and 200 ml of N,N-dimethylacetamide, and were vigorously stirred at 120° C. for 5 hours with a mechanical stirrer. After the obtained reaction mixture was cooled, it was poured into 200 ml of water, and the mixture was extracted with 500 ml of ethyl acetate, and then the extract was washed with two portions of 100 ml of water. After the obtained extract was dried by mixing with anhydrous magnesium sulfate and filtered. The filtrate was concentrated by evaporating the solvent in vacuo, and the resultant residue was dissolved in 100 ml of methanol. Then, an aqueous solution (20 ml) containing potassium hydroxide of 16.8 g was dropwise added to the methanol solution and heated under reflux for 2 hour. After the resultant reaction mixture was cooled, the precipitated crystals were suctioned, and the residue was washed with water. The washed residue was dried to obtain the above compound (1-5C) of 63.3 g (yield: 85%).

1-d) Synthesis of 2,3,6,7,10,11-hexa(4-(7-octenyloxy)benzoyloxy) triphenylene (1-5)

In a 100 ml flask, 4.5 g of the compound (1-5C) and 5 ml of thionyl chloride were placed, and heated under reflux for 2 hours. The excess thionyl chloride was evaporated in vacuo under heating. To the reaction mixture, 0.7 g of the compound (TP-B) and 20 ml of pyridine were added and stirred at room temperature for 4 hours. After the excess pyridine was evaporated in vacuo, and then the above compound (1-5) of 2.73 g (yield: 75%) was isolated by silica-gel chromatography.

Data of the compound (1-5)

IR ($cm^{-1}$): 3080, 2940, 2860, 1740, 1605, 1580, 1510, 1470, 1420, 1315, 1250, 1170, 1120, 1070, 1010, 900, 840, 760, 695

Measurement of phase transition temperature by DSC and polarization microscope

Crystal phase ←132° C.→Columnar phase ←143° C.→Discotic nematic phase ←227° C.→Isotropic phase

SYNTHETIC EXAMPLE 2

Synthesis of Discotic Compound (1-30: Above Mentioned Discotic Compound)

2-c) Synthesis of 4-(5-vinyloxypentyloxy)-benzoic Acid (1-30c)

In a 500 ml three-necked flask were placed 33.2 g of p-hydroxybenzoic acid, 58.0 g of 5-bromopentylvinylether, 41.5 g of potassium carbonate and 200 ml of N,N-dimethylacetamide, and were vigorously stirred at 120° C. for 5 hours with a mechanical stirrer. After the reaction mixture was cooled, it was poured into 200 ml of water, and the mixture was extracted with 500 ml of ethyl acetate, and then the extract was washed with two portions of 100 ml of water. The obtained extract was dried by mixing with anhydrous magnesium sulfate and filtered. The filtrate was concentrated by evaporating the solvent in vacuo, and the resultant residue was dissolved in 100 ml of methanol. Then, an aqueous solution (20 ml) containing potassium hydroxide of 16.8 g was dropwise added to the methanol solution and heated under reflux for 2 hour. The resultant reaction mixture was cooled, the precipitated crystals were filtered, and the residue was dissolved in 1 liter of water. 25.7 ml of concentrated hydrochloric acid was added to the solution, and the precipitated crystals were filtered and washed with water. The residue was dried to obtain the above compound (1-30C) of 64.3 g (yield: 90%).

2-d) Synthesis of 2,3,6,7,10,11-hexa(4-(5-vinyloxypentyloxy)benzoyloxy)triphenylene (1-30)

In a 300 ml three-necked flask, 5.72 g of the compound (1-30C), 6.7 ml of triethylamine and 60 ml of 1,2-dimethoxyethane were placed, and 2.75 g of methylsulfonyl chloride was dropwise added to the mixture at 0° C. and then stirred for 2 hours. After the reaction mixture was cooled to room temperature, 0.65 g of the compound (TP-B) and 0.3 g of 4-dimethylaminopyridine were added and stirred for 6 hours. After the reaction mixture was filtered, the filtrate was concentrated in vacuo, and the above compound (1-30) of 2.8 g (yield: 82%) was isolated by silica-gel chromatography.

Data of the compound (1-30)

IR ($cm^{-1}$): 2960, 2955, 2880, 1765, 1690, 1625, 1605, 1520, 1495, 1480, 1435, 1420, 1375, 1360, 1290, 1260, 1220, 1195, 1140, 1110, 1080, 1050, 1030, 880, 810, 780, 740

SYNTHETIC EXAMPLE 3

Synthesis of Discotic Compound (2-5: Above Mentioned Discotic Compound)

3-c) Synthesis of 4-(6-acryloyloxyhexyloxy)-benzoic acid (2-5c)

In a 500 ml three-necked flask were placed 33.2 g of p-hydroxybenzoic acid, 54.3 g of 6-bromohexanol, 41.5 g of potassium carbonate and 200 ml of N,N-dimethylacetamide, and were vigorously stirred at 120° C. for 5 hours with a mechanical stirrer. After the obtained reaction mixture was cooled, it was poured in 200 ml of water, and the mixture was extracted with 500 ml of ethyl acetate, and then the extract was washed with two portions of 100 ml of water. The obtained extract was dried by mixing with anhydrous magnesium sulfate and filtered. The filtrate was concentrated by evaporating the solvent in vacuo, and the resultant residue was dissolved in 100 ml of methanol. Then, a methanol solution (20 ml) containing potassium hydroxide of 16.8 g was dropwise added to the methanol solution and heated under reflux for 2 hour. The resultant reaction mixture was cooled, the precipitated crystals were filtered, and the residue was dissolved in 1 liter of water. 25.7 ml of concentrated hydrochloric acid was added to the solution, and the precipitated crystals were filtered and washed with water. The residue was dried to obtain the 4-(6-hydroxyhexyloxy)benzoic acid of 61.5 g (yield: 86%).

In a 300 ml three-necked flask, 9.53 g of 4-(6-hydroxyhexyloxy)benzoic acid, 5.33 g of N,N-dimethylaniline and 100 ml of dioxane were placed, and 3.98 g of acryloyl chloride was dropwise added gradually to the mixture at 60° C. and then stirred for 6 hours. After the reaction mixture was cooled, it was poured into 200 ml of ice-water. After the reaction mixture was filtered with suction, the filtrate was washed with hexane, and dried to obtain the above compound (2-5C) of 9.4 g (yield: 80%).

3-d) Synthesis of 2,3,6,7,10,11-hexa(4-(6-acryloyloxyhexyloxy)benzoyloxy)triphenylene (2-5)

In a 300 ml three-necked flask, 5.67 g of the compound (2-5C), 6.7 ml of triethylamine and 60 ml of 1,2-dimethoxyethane were placed, and 2.75 g of methylsulfonyl chloride was dropwise added to the mixture at 0° C. and then stirred for 2 hours. After the reaction mixture was cooled to room temperature, 0.65 g of the compound (TP-B) and 0.3 g of 4-dimethylaminopyridine were added and stirred for 6 hours. After the reaction mixture was filtered, the filtrate was concentrated in vacuo, and the above compound (2-5) of 3.2 g (yield: 80%) was isolated by silica-gel chromatography.

Data of the compound (2-5)

IR ($cm^{-1}$): 2950, 2870, 1740, 1730, 1610, 1605, 1585, 1520, 1480, 1430, 1415, 1375, 1320, 1300, 1260, 1200, 1180, 1130, 1080, 1010, 990, 905, 850, 820, 760, 700

Measurement of phase transition temperature by DSC and polarization microscope

Crystal phase ←112° C.→Discotic nematic phase←180° C.→Isotropic phase

SYNTHETIC EXAMPLE 4

4-d) Synthesis of 2,3,6,7,10,11-hexa(4-(7,8-epoxyoctyloxybexyloxy)benzoyloxy)triphenylene (3-5)

In a 100 ml three-necked flask, 3.67 g of the compound (1-5), 6.33 g of m-chloroperbenzoic acid and 30 ml of 1,2-dimethoxyethane were placed, and stirred at 60° C. for 2 hours. After the reaction mixture was cooled, precipitated m-chloroperbenzoic acid was removed and the above compound (3-5) of 3.17 g (yield: 82%) was isolated by silica-gel chromatography.

Data of the compound (3-5)

IR ($cm^{-1}$): 3050, 2940, 2850, 1740, 1605, 1580, 1510, 1470, 1420, 1320, 1250, 1170, 1120, 1070, 1010, 900, 840, 760, 695

Measurement of phase transition temperature by DSC and polarization microscope

Crystal phase←114° C.→Discotic nematic phase←220° C.→Isotropic phase

Subsequently, synthetic examples of the polymerizable compounds having no liquid crystalline property (which are represented by the formula (4) and the formulae (I)–(XVI)) are set forth below.

SYNTHETIC EXAMPLE 5

Synthesis of Compound (4-3-(VI): Above Mentioned Compound (4-3: Compound Number of the Formula (4), and (VI): Number of the Formulae (I)–(XVI)))

In a 300 ml three-necked flask, 5.0 g of 4-(4-acryloyloxybutyloxy)benzoic acid, 5.3 ml of triethylamine and 50 ml of tetrahydrofuran were placed to prepare a mixture. To the mixture, 1.46 ml of methylsulfonyl chloride was dropwise added at 0° C., subsequently 57.8 mg of 4-dimethylaminopyridine was added and then stirred for 10 minutes. To the reaction mixture, 0.6 g of pyrogallol was added and stirred at room temperature for 2 hours. After the reaction mixture was filtered, the filtrate was concentrated in vacuo, and the oily compound (4-3-(VI)) of 3.93 g (yield: 96%) was isolated by silica-gel chromatography.

Data of compound (4-3-(VI))

$H^1$-NMR (Solvent for measurement: $CDCl_3$)

δ:7.9 (4H, d), 7.8 (2H, d), 7.5 (3H, m), 7.0 (4H, d), 6.9 (2H, d), 6.3 (3H, m), 6.1 (3H, m), 5.9 (3H, m) 4.1 (12H, m), 1.7 (12H, m).

SYNTHETIC EXAMPLE 6

Synthesis of Compound (4-3-(XI): Above Mentioned Compound (4-3: Compound Number of the Formula (4), and (XI): Number of the Formulae (I)–(XVI)))

In a 50 ml three-necked flask, 5.0 g of 4-(4-acryloyloxybutyloxy)benzoic acid, 25 ml of dichloromethane, 4.4 ml of thionyl chloride and N,N-dimethylformamide as catalyst were placed and stirred at room temperature for 30 minutes to prepare a reaction mixture. Excess thionyl chloride and dichloromethane were evaporated from the reaction mixture in vacuo. To the reaction mixture, 1.5 g of 1,7-hydroxynaphthalene and 10 ml of pyridine were added and stirred for one day. The reaction mixture was concentrated by evaporating excess pyridine in vacuo, and the oily compound (4-3-(XI)) of 2.4 g (yield: 49%) was isolated by silica-gel chromatography.

Data of compound (4-3-(XI))

$H^1$-NMR (Solvent for measurement: $CDCl_3$)

δ:8.1 (5H, m), 7.6 (4H, m), 7.1 (4H, m), 6.4 (2H, dd), 6.2 (2H, dd), 5.9 (2H, dd), 4.2 (8H, m), 1.8 (8H, m).

SYNTHETIC EXAMPLES 7–12

Synthesis of Compound (4-3-(I), 4-3-(II),4-3-(III), (4-3(IV), 4-3-(IX), 4-3-(X): Above Mentioned Compound Compound Number of the Formula (4) and (XI): Number of the Formulae (I)–(XVI))

The compounds were prepared in the same manner as Synthetic Example 5 or 6.

Data of compound (4-3-(I))

NMR (Solvent for measurement: $CDCl_3$)

δ:7.9 (4H, d), 7.4 (4H, m), 7.0 (4H, d), 6.4 (2H, m), 6.2 (2H, m), 6.0 (2H, m), 4.2 (8H, m), 1.8 (8H, m).

Measurement of phase transition temperature by DSC and polarization microscope

Crystal phase←−92° C.→Liquid crystalline phase←−107° C.→isotropic phase

Data of compound (4-3-(II))

$H^1$-NMR (Solvent for measurement: $CDCl_3$)

δ:8.1 (4H, d), 7.2 (4H, m), 7.1 (4H, d), 6.4 (2H, dd), 6.2 (2H, dd), 6.0 (2H, dd), 4.2 (8H, m), 1.9 (8H, m).

Crystal phase←−60° C.→nematic liquid crystalline phase←−64° C. →Isotropic phase

Data of compound (4-3-(III))

$H^1$-NMR (Solvent for measurement: $CDCl_3$)

δ:8.1 (4H, d), 7.3 (4H, s), 7.1 (4H, d), 6.4 (2H, dd), 6.2 (2H, dd), 6.0 (2H, dd), 4.2 (8H, m), 1.8 (8H, m).

Crystal phase←−97° C.→Nematic liquid crystalline phase←−155° C.→Isotropic phase

Data of compound (4-3-(IV))

$H^1$-NNR (Solvent for measurement: $CDCl_3$)

δ: 8.1 (6H, d), 7.1 (3H, s), 7.0 (6H, d), 6.5 (3H, dd), 6.1 (3H, dd), 5.8 (3H, dd), 4.3 (6H, m), 4.1 (6H, m), 1.9 (12H, m).

Data of compound (4-3-(V))

$H^1$-NMR (Solvent for measurement: $CDCl_3$)

δ: 8.1 (2H, d), 7.9 (4H, dd), 7.5 (2H, m), 7.3 (1H, dd), 7.1 (2H, d), 7.0 (4H, d), 6.3 (H, m), 6.1 (3H, m), 5.9 (3H, m), 4.1 (12H, m), 1.8 (12H, m).

Data of compound (4-3-(IX))

$H^1$-NMR (Solvent for measurement: $CDCl_3$)

δ: 8.2 (4H, d), 7.8 (2H, d), 7.6 (2H, d), 7.5 (2H, d), 7.2 (4H, d), 6.4 (2H, dd), 6.2 (2H, dd), 6.0 (2H, dd), 4.2 (8H, m), 1.8 (8H, m).

Data of compound (4-3- (X))

$H^1$-NMR (Solvent for measurement: $CDCl_3$)

δ: 8.1 (5H, m), 7.9 (2H, d), 7.7 (1H, t), 7.5 (2H, m), 7.1 (4H, t), 6.4 (2H, d), 6.2 (2H, m), 6.0 (2H, dd), 4.2 (8H, m), 1.8 (8H, m).

Subsequently, synthetic examples of the polymerizable compounds having no liquid crystalline property (which are represented by the formula (4) in S1=0 and the formulae (II)) are set forth below.

SYNTHETIC EXAMPLE 13

Synthesis of compound (4-20-(II): Above Mentioned Discotic Compound (4-20: Compound Number of the Formula (4), and (II): Number of the Formulae (I)–(XVI)))

a) Synthesis of 1,3-di-(4-hydroxybutoxy) benzene

In a 300 ml three-necked flask, 18.0 g of resorcinol, 50.0 g of potassium carbonate, and 100 ml of N,N-dimethylacetamide were placed to prepare a mixture. To the mixture, 52.0 g of 4-chlorobutylacetate was dropwise added at 120° C. and then stirred for 5 hours. The reaction mixture was cooled, the reaction mixture was poured into 150 ml of water, and was extracted with 300 ml of ethyl acetate. The extract was washed with two portions of 100 ml water, and dried by mixing with anhydrous magnesium sulfate and then filtered. The filtrate was concentrated by evaporating the solvent in vacuo, and the resultant residue was dissolved in 75 ml of methanol. Then, an aqueous solution (75 ml) containing potassium hydroxide of 31.4 g was dropwise added gradually to the methanol solution and heated under reflux for 2 hour. After the resultant reaction mixture was cooled, 200 ml of water and 48 ml of concentrated hydrochloric acid were added to the reaction mixture. The precipitated crystals were filtered, and the residue was washed with water. After the residue was dried, it was recrystallized from a mixed solvent (hexane/ethyl acetate=1/1, by volume) to obtain the above compound (1,3-di- (4-hydroxybutoxy) benzene) of 32.0 g (yield: 90%).

Data of compound (1,3-di-(4-hydroxybutoxy)benzene)

$H^1$-NMR (Solvent for measurement: $CDCl_3$, ppm)

δ:7.15 (1H, t), 6.4–6.6 (3H, m), 4.0 (4H, t), 3.7 (4H, t), 1.6–2.0 (8H, m)

b) Synthesis of 4-20-(II)

In a 100 ml three-necked flask, 18.0 g of 1,3-di-(4-hydroxybutoxy)benzene, 24 ml of triethylamine and 50 ml of acetonitrile were placed to prepare a mixture. To the mixture, 15.4 g of acryloyl chloride was dropwise added while the mixture was cooled with ice water, and stirred for 10 minutes. After the reaction mixture was cooled to room temperature, it was further stirred for 2 hours. The reaction mixture was poured in 150 ml of water, was extracted with 300 ml of ethyl acetate, and the extract was washed with two portions of 100 ml of water. The extract was dried by mixing anhydrous magnesium sulfate, and filtered. The filtrate was concentrated by evaoporating solvent in vacuo, and 1,3-di-(4-acryloyloxybutoxy)benzene (4-20- (II)) of 21 g (yield: 85%) was isolated by silica-gel chromatography.

Data of compound 4-20-(II) (1,3-di-(4-acryloyloxybutoxy) benzene)

$H^1$-NMR (Solvent for measurement: $CDCl_3$, ppm)

δ:7.15 (1H, t), 6.4–6.6 (3H, m), 5.7–6.4 (6H), 4.25 (4H, t), 3.95 (4H, t), 1.7–2.0 (8H, m)

SYNTHETIC EXAMPLE 14

Synthesis of Compound (4-31-(II): Above Mentioned Discotic Compound (4-31: Compound Number of the Formula (4), and (II): Number of the Formulae (I)–(XVI)))

a) Synthesis of 1,3-di-(6-hydroxyhexyloxy)benzene

In a 300 ml three-necked flask, 5.5 g of resorcinol, 21.0 g of potassium carbonate, and 50 ml of N,N- dimethylacetamide were placed to prepare a mixture. To the mixture, 19.0 g of 6-chloro-1-hexanol was dropwise added at 120° C. and then stirred for 6 hours. After the reaction mixture was cooled, the reaction mixture was poured into 100 ml of water, and was extracted with 200 ml of ethyl acetate. The extract was washed with two portions of 100 ml water, and dried by mixing with anhydrous magnesium sulfate and then filtered. The filtrate was concentrated by evaporating the solvent in vacuo, and the residue (crystals) was washed with hexane. The crystals were dried to obtain the above compound (1,3-di-(6-hydroxyhexyloxy)benzene) of 11.5 g (yield: 74%).

Data of compound (1,3-di-(6-hydroxyhexyloxy)benzene)

$H^1$-NMR (Solvent for measurement: $CDCl_3$, ppm)

δ:7.15 (1H, t), 6.4–6.6 (3H, m), 3.95 (4H, t), 3.65 (4H, t), 1.3–1.9 (8H, m)

b) Synthesis of 4-31-(II)

In a 100 ml three-necked flask, 9.3 g of 1,3-di-(6-hydroxyhexyloxy)benzene, 10 ml of triethylamine and 30 ml of acetonitrile were placed to prepare a mixture. To the mixture, 6.5 g of acryloyl chloride was dropwise added while the mixture was cooled with ice water, and stirred for 1 hour. After the reaction mixture was cooled to room temperature, it was further stirred for 2 hours. The reaction mixture was poured in 100 ml of water, extracted with 200 ml of ethyl acetate, and the extract was washed with two portions of 100 ml of water. The extract was dried by mixing anhydrous magnesium sulfate, and filtered. The filtrate was concentrated by removing solvent in vacuo, and 1,3-di-(4-acryloyloxyhexyloxy)benzene (4-31-(II)) of 10.4 g (yield: 80%) was isolated by silica-gel chromatography.

Data of compound 4-31-(II) (1,3-di-(4-acryloyloxyhexyloxy)benzene)

$H^1$-NMR (Solvent for measurement: $CDCl_3$, ppm)

δ:7.15 (1H, t), 6.4–6.6 (3H, m), 5.8–6.4 (6H), 4.15 (4H, t), 3.9 (4H, t), 1.3–1.9 (8H, m)

SYNTHETIC EXAMPLES 15–17

Synthesis of Compound (4-32-(II), 4-25-(II), 4-33-(II): Above Mentioned Compound (4-3: Compound Number of the Formula (4) and (II): Number of the Formulae (I)–(XVI)))

The compounds were prepared in the same manner as Synthetic Example 13 or 14.

Data of compound 4-32-(II)

$H^1$-NMR (Solvent for measurement: $CDCl_3$, ppm)

δ:7.15 (1H, t), 6.4–6.6 (3H, m), 5.8–6.4 (6H), 4.3 (4H, t), 4.1 (4H, t), 3.8 (8H, m)

Data of compound 4-25-(II)

$H^1$-NMR (Solvent for measurement: $CDCl_3$, ppm)

δ:7.15 (1H, t), 6.4–6.6 (3H, m), 5.8–6.4 (6H), 4.3 (4H, t), 4.1 (4H, t), 3.6–3.9 (16H, m)

Data of compound 4-33-(II)

$H^1$-NMR (Solvent for measurement: $CDCl_3$, ppm)

δ:7.15 (1H, t), 6.4–6.6 (3H, m), 5.9–6.4 (6H), 4.2 (4H, t), 3.95 (4H, t), 3.5 (8H, m), 1.4–2.0 (16H, m)

EXAMPLE 1

A triphenylene compounds and non-discotic compound set forth in Table were mixed at ratio set forth below, and dissolved in 2-butanone or dichloromethane. The solvent was vaporized from the solution to prepare a liquid crystal composition.

Subsequently, each of the liquid crystal compositions was observed on phase transition by DSC and a polarizing microscope.

The results were set forth in Table.

TABLE

| No. | Composition (by weight) | phase transition |
|---|---|---|
| 1 | 2-3/4-3 (III) = 9/1 | C 99° C. → D 120° C. → Nd 157° C. → I |
| 2 | 2-3/4-3 (I) = 9/1 | C 99° C. → D 120° C. → Nd 155° C. → I |
| 3 | 2-3/4-3 (II) = 9/1 | C 105° C. → D 130° C. → Nd 162° C. → I |
| 4 | 2-3/4-3 (VI) = 9/1 | C 100° C. → D 135° C. → Nd 146° C. → I |
| 5 | 2-3/4-3 (V) = 9/1 | C 100° C. → D 132° C. → Nd 155° C. → I |
| 6 | 2-3/4-3 (VII) = 9/1 | C 97° C. → D 131° C. → Nd 165° C. → I |
| 7 | 2-3/4-3 (XI) = 9/1 | C 125° C. → D 135° C. → I |
| 8 | 2-3/4-3 (XI) = 9/1 | I 125° C. → Nd 80° C. → D |
| 9 | 2-5/4-3 (III) = 9/1 | C 77° C. → D 91° C. → Nd 130° C. → I |
| 10 | 2-5/4-3 (III) = 19/1 | C 88° C. → D 95° C. → Nd 133° C. → I |
| 11 | 2-3/4-20 (II) = 9/1 | C 91° C. → Nd 155° C. → I |
| 12 | 2-5/4-3 (XI) = 9/1 | C 85° C. → Nd 125° C. → I |
| 13 | 2-5/4-3 (X) = 9/1 | C 100° C. → D 112° C. → Nd 135° C. → I |
| 14 | 2-5/4-3 (VI) = 9/1 | C 91° C. → D 108° C. → I |
| 15 | 2-5/4-20 (II) = 9/1 | C 70° C. → D 120° C. → Nd 155° C. → I |
| 16 | 2-3/4-20 (III) = 9/1 | C 70° C. → D 103° C. → Nd 148° C. → I |
| 17 | 2-3/4-31 (II) = 9/1 | C 98° C. → Nd 151° C. → I |
| 18 | 2-3/4-32 (II) = 9/1 | C 112° C. → Nd 154° C. → I |
| 19 | 2-3/4-25 (II) = 9/1 | C 112° C. → Nd 156° C. → I |
| 20 | 2-3/4-33 (II) = 9/1 | C 129° C. → Nd 157° C. → I |
| 21 | 2-3/— = 10/— | C 130° C. → D 175° C. → Nd 194° C. → I |
| 22 | 2-5/— = 10/— | C 112° C. → D 135° C. → Nd 180° C. → I |

Note;
C: Crystal phase
D: Columnar phase
Nd: Discotic nematic phase
I: Isotropic phase

EXAMPLE 2

Preparation of Uncured Optical Compensatory Sheet

On a subbing layer of gelatin (0.1 μm) provided on polyethersulfone film (PES) (thickness: 100 μm; size: 100 mm×100 mm, available from Sumitomo Bakelite Co., Ltd.), a coating solution of polyamic acid (SE-7210, available from Nissan Chemical Industries, Ltd.) was coated, burned at 180° C. to form a polyimide layer and rubbing a surface of the layer using a rubbing machine to form an orientation layer.

The compound 1-39 (compound previously mentioned) as a polymerizable discotic compound having liquid crystalline property was dissolved in methyl ethyl ketone to prepare 10 weight % solution of the discotic compound. The solution was coated on the orientation layer at 1,000 rpm using a spin-coater to form a discotic compound layer.

Subsequently, each of the coated layers was heated on a hot plate (FP82HT, available from Metlet Co., Ltd.) and its phase transition was observed by a polarizing microscope.

The optically anisotropic layer of discotic compound (1-39) was observed by a polarizing microscope and it was confirmed that the layer had discotic nematic phase in the range of 130° to 183° C. Therefore, the temperature to orient the layer of discotic compound was set for 190° C.

According to the above findings, the support side of the composite (film) consisting of the polyethersulfone film, orientation layer and the discotic compound layer was pressed to a heated metal roller having a surface of temperature of 190° C. for 10 seconds, and immediately the support side of the composite was pressed to a metal roller having a surface of temperature of 170° C. for 30 seconds and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle (β) where the optic axis (or direction in which retardation value shows the minimum) and the normal line of the sheet intersect, and retardation (Δn.d) were determined.

Preparation of Cured Optical Compensatory Sheet of the Invention

As photopolymerization initiator, a mixture of Michler's ketone and benzophenone (1:1, by weight) was added to the above solution of the discotic compound in the amount of 1 weight % based on the amount of the discotic compound to the photopolymerization initiator containing solution.

Michler's ketone

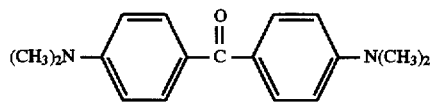

Benzophenone

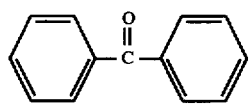

The solution was coated on the orientation layer at 1,000 rpm using a spin-coater to form a discotic compound layer.

The support side of the composite (film) consisting of the polyethersulfone film, orientation layer and the discotic compound layer was heated at a temperature of 170° C. for 1 minute, subsequently the composite was exposed to UV light for 2 minutes using UV-light radiation machine (UVSL-58 (16W), available from ULTRA-VIOLET PRODUCTS Corporation), and then cooled to form a cured optically anisotropic layer. Thus, a cured optical compensatory sheet was prepared.

As to the obtained film, the angle (β) where the optic axis (or direction in which retardation value shows the minimum) and the normal line of the sheet intersect, and retardation (Δn.d) were determined.

EXAMPLE 3

Preparation of Uncured Optical Compensatory Sheet

On a subbing layer of gelatin of polyethersulfone film (PES), a coating solution of polyamic acid (SE-7210, available from Nissan Chemical Industries, Ltd.) was coated to form an orientation layer in the same manner as in Example 2.

The compound 3-5 (compound previously mentioned) as a polymerizable discotic compound having liquid crystalline property was dissolved in methyl ethyl ketone to prepare 10 weight % solutions of the discotic compound. The solution was coated on the orientation layer at 1,000 rpm using a spin-coater to form a discotic compound layer.

Subsequently, each of the coated layers was heated on a hot plate (FP82HT, available from Metler Co., Ltd.) and its phase transition was observed by a polarizing microscope.

The optically anisotropic layer of discotic compound (3-5) was observed by a polarizing microscope and it was confirmed that the discotic compound (3-5) had discotic nematic phase in the range of 171° to 211° C. Therefore, the temperature to orient the layer of discotic compound was set for 180° C.

According to the above findings, the support side of the composite (film) consisting of the polyethersulfone film, orientation layer and the optically anisotropic layer was pressed to a heated metal roller having a surface of temperature of 180° C. for 50 seconds, and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle (β) where the optic axis (or direction in which retardation value shows the minimum) and the normal line of the sheet intersect, and retardation (Δn.d) were determined.

Preparation of Cured Optical Compensatory Sheet of the Invention

As photopolymerization initiator, a mixture of Michler's ketone and benzophenone (1:1, by weight) and diphenyliodnium.tetrafluoroborate were added to the above solution of the discotic compound. Each of them was added in the amount of 1 weight % based on the amount of the discotic compound to the photopolymerization initiator containing solution.

The solution was coated on the orientation layer at 1,000 rpm using a spin-coater to form a discotic compound layer.

The support side of the composite (film) consisting of the polyethersulfone film, orientation layer and the discotic compound layer was heated at a temperature of 180° C. for 1 minute, subsequently the composite was exposed to UV light for 2 minutes using UV-light radiation machine (UVSL-58 (16W), available from ULTRA-VIOLET PRODUCTS Corporation), and then cooled to prepare form a cured optically anisotropic layer. Thus, a cured optical compensatory sheet was prepared.

As to the obtained film, the angle (β) where the optic axis (or direction in which retardation value shows the minimum) and the normal line of the sheet intersect, and retardation (Δn.d) were determined.

EXAMPLE 4

Preparation of Uncured Optical Compensatory Sheet

On a subbing layer of gelatin of polyethersulfone film (PES), a coating solution of polyamic acid (SE-7210, available from Nissan Chemical Industries, Ltd.) was coated to form an orientation layer in the same manner as in Example 2.

The compound 3-5 (compound previously mentioned) as a polymerizable discotic compound having liquid crystalline property and EGDGE (ethyleneglycol diglycidylether) (mixed ratio=4:1, by weight) was dissolved in methyl ethyl ketone to prepare 10 weight % solutions of the discotic compound. The solution was coated on the orientation layer at 1,000 rpm using a spin-coater to form a discotic compound layer.

Subsequently, each of the coated layers was heated on a hot plate (FP82HT, available from Metler Co., Ltd.) and its phase transition was observed by a polarizing microscope.

The optically anisotropic layer of discotic compound (3-5) and EGDGE was observed by a polarizing microscope and it was confirmed that the discotic compound (3-5) and EGDGE had discotic nematic phase in the range of 109° to 158° C. Therefore, the temperature to orient the layer of discotic compound was set for 115° C.

According to the above findings, the support side of the composite (film) consisting of the polyethersulfone film, orientation layer and the discotic compound layer was pressed to a heated metal roller having a surface of temperature of 115° C. for 30 seconds, and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle ($\beta$) where the optic axis (or direction in which retardation value shows the minimum) and the normal line of the sheet intersect, and retardation ($\Delta n.d$) were determined.

Preparation of Cured Optical Compensatory Sheet of the Invention

As photopolymerization initiator, a mixture of Michler's ketone and benzophenone (1:1, by weight) and diphenyliodnium.tetrafluoroborate were added to the above solution of the discotic compound. Each of them was added in the amount of 1 weight % based on the amount of the discotic compound to the photopolymerization initiator containing solution.

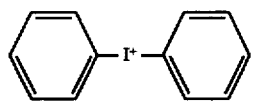

BF$_4^-$

The solution was coated on the orientation layer at 1,000 rpm using a spin-coater.

The support side of the composite (film) consisting of the polyethersulfone film, orientation layer and the optically anisotropic layer was heated at a temperature of 115° C. for 1 minute, subsequently the composite was exposed to UV light for 2 minutes using UV-light radiation machine (UVSL-58 (16W), available from ULTRA-VIOLET PRODUCTS Corporation), and then cooled to form a cured optically anisotropic layer. Thus, a cured optical compensatory sheet was prepared.

As to the obtained film, the angle ($\beta$) where the optic axis (or direction in which retardation value shows the minimum) and the normal line of the sheet intersect, and retardation ($\Delta n.d$) were determined.

EXAMPLE 5

Preparation of Uncured Optical Compensatory Sheet

The uncured optical compensatory sheet was obtained in the same manner as Example 4.

Preparation of Cured Optical Compensatory Sheet of the Invention

As photopolymerization initiator, a mixture of Michler's ketone and benzophenone (1:1, by weight) and diphenyliodnium.tetrafluoroborate were added to the above solution of the discotic compound. Each of them was added in the amount of 1 weight % based on the amount of the discotic compound to the photopolymerization initiator containing solution.

The solution was coated on the orientation layer at 1,000 rpm using a spin-coater to form a discotic compound layer.

The support side of the composite (film) consisting of the polyethersulfone film, orientation layer and the discotic compound layer was heated at a temperature of 115° C. for 1 minute, subsequently the composite was exposed to UV light for 2 minutes using UV-light radiation machine (UVSL-8 (16W), available from ULTRA-VIOLET PRODUCTS Corporation), and then cooled to form a cured optically anisotropic layer. Thus, a cured optical compensatory sheet was prepared. Further, the sheet was heated at 160° C. for 4 hours.

As to the obtained film, the angle ($\beta$) where the optic axis (or direction in which retardation value shows the minimum) and the normal line of the sheet intersect, and retardation ($\Delta n.d$) were determined.

Evaluation of Optical Compensatory Sheet

As for the optical compensatory sheets obtained in Examples 2 to 5, optical characteristics were evaluated below.

The angle ($\beta$) where the optic axis (or direction in which retardation value shows the minimum) and the normal line of the sheet intersect, and retardation ($\Delta n.d$) were determined. Re values at various incident angles were measured by an ellipsometer (AEP-100, available from Shimadzu Seisakusho, Ltd.) in transmission mode to determine incident angle dependence of Re. From data of the incident angle dependence of Re, the optimum refraction indices in the three directions ($n_1$, $n_2$ and $n_3$), the optimum retardation ($\Delta n.d$) and angle ($\beta$) of the optic axis were calculated.

The obtained optical compensatory sheets were allowed to stand in environment at 85° C. for 1,000 hours. The resultant sheets were evaluated in the same manner above.

Further, solubility of the sheets in methyl ethyl ketone was evaluated.

AA: soluble in methyl ethyl ketone

CC: insoluble in methyl ethyl ketone

The obtained results were set forth in Table 1.

TABLE 1

| Example | Solubility | Before heating Optic angle (β) (degree) | Before heating Δn·d (nm) | After heating Optic angle (β) (degree) | After heating Δn·d (nm) |
|---|---|---|---|---|---|
| Ex. 2 | | | | | |
| Uncured sheet | AA | 35 | 125 | *— | — |
| Cured sheet | CC | 34 | 122 | 35 | 120 |
| Ex. 3 | | | | | |
| Uncured sheet | AA | 70 | 155 | *— | — |
| Cured sheet | CC | 69 | 148 | 69 | 149 |
| Ex. 4 | | | | | |
| Uncured sheet | AA | 44 | 120 | **— | — |
| Cured sheet | CC | 41 | 125 | 43 | 125 |
| Ex. 5 | | | | | |
| Cured sheet | CC | 43 | 121 | 43 | 121 |

Note:
*A surface of the optically anisotropic layer was damaged.
**Crystals of the discotic compound were deposited.

As is apparent from results of Table 1, the uncured and cured optically anisotropic layers of Examples 2–5 have negative birefringence and inclined optic axis.

The uncured optically anisotropic layers of Examples 2–5 are damaged by heating. In contrast, although the cured optically anisotropic layer of Examples 2–5 are not changed in optically anisotropic property even under heating.

In the uncured optically anisotropic layer of Example 2, its discotic nematic phase was changed into isotropic phase at a temperature of not less than 183° C. In contrast, although the cured optically anisotropic layer of Example 2 was heated at 250° C. for 10 or more minutes, its discotic nematic phase was not changed, i.e., the optically anisotropic property was maintained even under heating.

From the above result, it is confirmed that the polymerizable discotic compound of the invention is polymerized in the condition of discotic nematic phase under heating, and that the polymerized (cured) layer is greatly enhanced in durability under environment of high temperature.

EXAMPLE 6

Preparation of Cured Optically Anisotropic Layer

On a subbing layer of gelatin (0.1 μm) provided on triacetylcellulose film (TAC) (thickness: 127 μm; size: 100 mm×100 mm, Fuji Tack, available from Sumitomo Bakelite Co., Ltd.), a coating solution of polyvinyl alcohol having long chain alkyl groups was coated, to form a polyvinyl alcohol layer and rubbing a surface of the layer using a rubbing machine to form an orientation layer.

The compound 3-5 (compound previously mentioned) as a polymerizable discotic compound having liquid crystalline property and EGDGE (ethyleneglycol diglycidylether) (mixed ratio=4:1, by weight) was dissolved in methyl ethyl ketone to prepare 10 weight % solutions of the discotic compound. Further, as photopolymerization initiator, a mixture of Michler's ketone and benzophenone (1:1, by weight) and diphenyliodnium.tetrafluoroborate were added to the above solution of the discotic compound. Each of them was added in the amount of 1 weight % based on the amount of the discotic compound to the photopolymerization initiator containing solution.

The solution was coated on the orientation layer at 1,000 rpm using a spin-coater to form a discotic compound layer.

The support side of the composite (film) consisting of the polyethersulfone film, orientation layer and the discotic compound layer was pressed to a heated metal roller having a surface of temperature of 115° C. for 30 seconds, and subsequently the composite was exposed to UV light for 2 minutes using UV-light radiation machine (UVSL-58 (16W), available from ULTRA-VIOLET PRODUCTS Corporation) with maintaining the heating, and then cooled to form a cured optically anisotropic layer. Thus, a cured optical compensatory sheet was prepared.

The cured optical compensatory sheet was observed by a polarizing microscope, and it was confirmed that the layer of discotic compound showed negative birefringence and discotic nematic phase and that was macroscopically oriented in one direction.

Preparation of Liquid Crystal Display

The optical compensatory sheet was attached to TN-type liquid crystal cell that the product of the difference between an extraordinary ray and an ordinary ray of the liquid crystal and the clearance between the substrates of the liquid crystal cell was 480 nm, and the twisted angle of the liquid crystal was 90 degrees.

The obtained TN-LCD has a structure shown in FIG. 3.

Evaluation of Liquid Crystal Display

To the TN-LCD, a rectangular wave of 30 Hz was applied at a voltage of 0 to 5 V, and transmittances (T) were measured by varying viewing angle using a spectrophotometer (LCD-5000, available from Otsuka Electronics Co., Ltd.). From the measured data, the angle against the normal at which the contrast ($T_{0V}/T_{5V}$) on a black-and-white display showed 10 was defined as viewing angle and the viewing angles in a height (upper-lower) direction and a width (left-right) direction of the TN-LCD were determined.

Further, the TN-LCD having no optical compensatory sheet (Comparison Example 1) was evaluated in the same manner as above.

The obtained result is set forth in Table 2.

TABLE 2

| | Viewing Angle | |
|---|---|---|
| Example | upper-lower (degree) | left-right (degree) |
| Ex. 6 | 75–79 | 82–85 |
| Com. Ex. 1 | 23–27 | 33–36 |

EXAMPLE 7

Preparation of Uncured Optical Compensatory Sheet

On a subbing layer of gelatin (0.1 μm) provided on polyethersulfone film (PES) (thickness: 100 μm; size: 100 mm ×100 mm, available from Sumitomo Bakelite Co., Ltd.), a coating solution of polyamic acid (SE-7210, available from Nissan Chemical Industries, Ltd.) was coated, burned at 180° C. to form a polyimide layer and rubbing a surface of the layer using a rubbing machine to form an orientation layer.

The liquid crystal composition No. 1 (composition previously set forth in Table) as a polymerizable discotic compound having liquid crystalline property was dissolved in methyl ethyl ketone to prepare 10 weight % solution of the discotic compound. Further, a photopolymerization initiator (Irgacure 907, available from Ciba-Guigy) was added to the above solution of the discotic compound in the amount of 1 weight % based on the amount of the discotic compound. The solution was coated on the orientation layer at 1,000 rpm using a spin-coater to form a discotic compound layer.

According to the transition phase in Table previously mentioned, the support side of the composite (film) consisting of the polyethersulfone film, orientation layer and the discotic compound layer was pressed to a heated metal roller having a surface of temperature of 155° C. for 10 seconds, and immediately the support side of the composite was pressed to a metal roller having a surface of temperature of 140° C. for 30 seconds and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle ($\beta$) where the optic axis (or direction in which retardation value shows the minimum) and the normal line of the sheet intersect, and retardation ($\Delta$n.d) were determined.

Preparation of Cured Optical Compensatory Sheet of the Invention

The support side of the composite (film) consisting of the polyethersulfone film, orientation layer and the discotic compound layer (obtained above) was heated at a temperature of 155° C. for 10 seconds, and immediately the support side of the composite was pressed to a metal roller having a surface of temperature of 140° C. for 30 seconds. Subsequently, the composite was exposed to UV light for 30 seconds using metal-halide lamp, and the support side of the composite was pressed to a metal roller having a surface of temperature of 20° C. for 10 seconds to form a cured optically anisotropic layer. Thus, an cured optical compensatory sheet was prepared.

As to the obtained film, the angle ($\beta$) where the optic axis (or direction in which retardation value shows the minimum) and the normal line of the sheet intersect, and retardation ($\Delta$n.d) were determined.

EXAMPLE 8

Preparation of Uncured Optical Compensatory Sheet

On a subbing layer of gelatin of polyethersulfone film (PES), a coating solution of polyamic acid (SE-7210, available from Nissan Chemical Industries, Ltd.) was coated to form an orientation layer in the same manner as in Example 7.

The liquid crystal composition No. 3 (composition previously set forth in Table) as a polymerizable discotic compound having liquid crystalline property was dissolved in methyl ethyl ketone to prepare 10 weight % solution of the discotic compound. Further, a photopolymerization initiator (Irgacure 907, available from Ciba-Guigy Corporation) was added to the above solution of the discotic compound in the amount of 1 weight % based on the amount of the discotic compound. The solution was coated on the orientation layer at 1,000 rpm using a spin-coater to form a discotic compound layer.

According to the transition phase in Table previously mentioned, the support side of the composite (film) consisting of the polyethersulfone film, orientation layer and the discotic compound layer was pressed to a heated metal roller having a surface of temperature of 150° C. for 30 seconds, and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle ($\beta$) where the optic axis (or direction in which retardation value shows the minimum) and the normal line of the sheet intersect, and retardation ($\Delta$n.d) were determined.

Preparation of Cured Optical Compensatory Sheet of the Invention

The support side of the composite consisting of the polyethersulfone film, orientation layer and the discotic compound layer, which was obtained above, was heated at a temperature of 150° C. for 30 seconds. Subsequently, the composite was exposed to UV light for 20 seconds using a xenon lamp, and the support side of the composite was pressed to a metal roller having a surface of temperature of 20° C. for 10 seconds to form a cured optically anisotropic layer. Thus, a cured optical compensatory sheet was prepared.

As to the obtained film, the angle ($\beta$) where the optic axis (or direction in which retardation value shows the minimum) and the normal line of the sheet intersect, and retardation ($\Delta$n.d) were determined.

EXAMPLE 9

Preparation of Incured Optical Compensatory Sheet

On a subbing layer of gelatin of polyethersulfone film (PES), a coating solution of polyamic acid (SE-7210, available from Nissan Chemical Industries, Ltd.) was coated to form an orientation layer in the same manner as in Example 7.

The liquid crystal composition No. 4 (composition previously set forth in Table) as a polymerizable discotic compound having liquid crystalline property was dissolved in methyl ethyl ketone to prepare 10 weight % solution of the discotic compound. Further, a photopolymerization initiator (Irgacure 907, available from Ciba-Geigy Corporation) was added to the above solution of the discotic compound in the amount of 1 weight % based on the amount of the discotic compound. The solution was coated on the orientation layer at 1,000 rpm using a spin-coater to form a discotic compound layer.

According to the transition phase in Table previously mentioned, the support side of the composite (film) consisting of the polyethersulfone film, orientation layer and the discotic compound layer was pressed to a heated metal roller having a surface of temperature of 140° C. for 30 seconds, and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle (β) where the optic axis (or direction in which retardation value shows the minimum) and the normal line of the sheet intersect, and retardation (Δn.d) were determined.

Preparation of Cured Optical Compensatory Sheet of the Invention

The support side of the composite (film) consisting of the polyethersulfone film, orientation layer and the discotic compound layer, which was obtained above, was heated at a temperature of 140° C. for 30 seconds. Subsequently, the composite was exposed to UV light for 20 seconds using a high-pressure mercury lamp, and the support side of the composite was pressed to a metal roller having a surface of temperature of 20° C. for 10 seconds to form a cured optically anisotropic layer. Thus, a cured optical compensatory sheet was prepared.

As to the obtained film, the angle (β) where the optic axis (or direction in which retardation value shows the minimum) and the normal line of the sheet intersect, and retardation (Δn.d) were determined.

EXAMPLE 10

Preparation of Uncured Optical Compensatory Sheet

On a subbing layer of gelatin of polyethersulfone film (PES), a coating solution of polyamic acid (SE-7210, available from Nissan Chemical Industries, Ltd.) was coated to form an orientation layer in the same manner as in Example 7.

The liquid crystal composition No. 11 (composition previously set forth in Table) as a polymerizable discotic compound having liquid crystalline property was dissolved in methyl ethyl ketone to prepare 10 weight % solution of the discotic compound. Further, a photopolymerization initiator (Irgacure 907, available from Ciba-Geigy Corporation) was added to the above solution of the discotic compound in the amount of 1 weight % based on the amount of the discotic compound. The solution was coated on the orientation layer at 1,000 rpm using a spin-coater to form a discotic compound layer.

According to the transition phase in Table, the support side of the composite (film) consisting of the polyethersulfone film, orientation layer and the discotic compound layer was pressed to a heated metal roller having a surface of temperature of 130° C. for 30 seconds, and then the support side of the composite was pressed to a metal roller having a surface of temperature of 20° C. for 10 seconds to form an uncured optically anisotropic layer. Thus, an uncured optical compensatory sheet was prepared.

The uncured optical compensatory sheet was observed by a polarizing microscope, and it was confirmed that the layer of discotic compound showed discotic nematic phase and was macroscopically oriented in one direction.

As to the obtained film, the angle (β) where the optic axis (or direction in which retardation value shows the minimum) and the normal line of the sheet intersect, and retardation (Δn.d) were determined.

Preparation of Cured Optical Compensatory Sheet of the Invention

The support side of the composite (film) consisting of the polyethersulfone film, orientation layer and the discotic compound layer (obtained above) was heated at a temperature of 130° C. for 30 seconds. Subsequently, the composite was exposed to UV light for 20 seconds using a halogen lamp, and the support side of the composite was pressed to a metal roller having a surface of temperature of 20° C. for 10 seconds to form a cured optically anisotropic layer. Thus, a cured optical compensatory sheet was prepared.

As to the obtained film, the angle (β) where the optic axis (or direction in which retardation value shows the minimum) and the normal line of the sheet intersect, and retardation (Δn.d) were determined.

Evaluation of Optical Compensatory Sheet

As for the optical compensatory sheets obtained in Examples 7 to 10, optical characteristics were evaluated below.

The angle (β) where the optic axis (or direction in which retardation value shows the minimum) and the normal line of the sheet intersect, and retardation (Δn.d) were determined. Re values at various incident angles were measured by an ellipsometer (AEP-100, available from Shimadzu Seisakusho, Ltd.) in transmission mode to determine incident angle dependence of Re. From data of the incident angle dependence of Re, the optimum refraction indices in the three directions ($n_1$, $n_2$ and $n_3$), the optimum retardation (Δn.d) and angle (β) of the optic axis were calculated.

The obtained results were set forth in Table 3.

TABLE 3

| Example | Optic angle (β, degree) | Δn · d (nm) |
|---|---|---|
| Ex. 7 | | |
| Uncured sheet | 35 | 122 |
| Cured sheet | 35 | 125 |
| Ex. 8 | | |
| Uncured sheet | 31 | 157 |
| Cured sheet | 32 | 155 |
| Ex. 9 | | |
| Uncured sheet | 33 | 118 |
| Cured sheet | 33 | 120 |
| Ex. 10 | | |
| Uncured sheet | 30 | 122 |
| Cured sheet | 31 | 122 |

As is apparent from results of Table 3, the uncured and cured optically anisotropic layers of Examples 7–10 have negative birefringence and inclined optic axis.

EXAMPLE 11

Preparation of Cured Optically Anisotropic Layer

On a subbing layer of gelatin (0.1 μm) provided on triacetylcellulose film (TAC) (thickness: 127 μm; size: 100 mm×100 mm, Fuji Tack, available from Sumitomo Bakelite Co., Ltd.), a coating solution of polyvinyl alcohol having long chain alkyl groups was coated, to form a polyvinyl alcohol layer and rubbing a surface of the layer using a rubbing machine to form an orientation layer.

The solution employed in Example 7 was coated on the orientation layer at 1,000 rpm using a spin-coater to form a discotic compound layer.

According to the transition phase in Table previously mentioned, the support side of the composite (film) consisting of the polyethersulfone film, orientation layer and the discotic compound layer was pressed to a heated metal roller having a surface of temperature of 155° C. for 10 seconds, and immediately the support side of the composite was pressed to a metal roller having a surface of temperature of 140° C. for 30 seconds and then the support side of the composite was pressed to a metal roller having a surface of temperature of 20° C. for 10 seconds to form cured optically anisotropic layer. Thus, an uncured optical compensatory sheet was prepared.

The cured optical compensatory sheet was observed by a polarizing microscope, and it was confirmed that the layer of discotic compound showed negative birefringence and discotic nematic phase and that was macroscopically oriented in one direction.

Preparation of Liquid Crystal Display

The optical compensatory sheet was attached to TN-type liquid crystal cell that the product of the difference between an extraordinary ray and an ordinary ray of the liquid crystal and the clearance between the substrates of the liquid crystal cell was 480 nm, and the twisted angle of the liquid crystal was 90 degrees.

The obtained TN-LCD has a structure shown in FIG. 3.

Evaluation of Liquid Crystal Display

To the TN-LCD, a rectangular wave of 30 Hz was applied at a voltage of 0 to 5 V, and transmittances (T) were measured by varying viewing angle using a spectrophotometer (LCD-5000, available from Otsuka Electronics Co., Ltd.). From the measured data, the angle against the normal at which the contrast ($T_{ov}/T_{sv}$) on a black-and-white display showed 10 was defined as viewing angle and the viewing angles in a height (upper-lower) direction and a width (left-right) direction of the TN-LCD were determined.

Further, the TN-LCD having no optical compensatory sheet (Comparison Example 2) was evaluated in the same manner as above.

The obtained result is set forth in Table 4.

TABLE 4

| Example | Viewing Angle | |
|---|---|---|
| | upper-lower (degree) | left-right (degree) |
| Ex. 11 | 75–79 | 100–105 |
| Com. Ex. 2 | 23–27 | 33–36 |

EXAMPLE 12

Preparation of Optically Anisotropic Layer

On a glass plate, a coating solution of polyamic acid (SE-7210, available from Nissan Chemical Industries, Ltd.) was coated, burned at 180° C. to form a polyimide layer and rubbing a surface of the layer using a rubbing machine to form an orientation layer.

On the orientation layer, a 10 weight % dichloromethane solution of a polymer having discotic structure (DP-1; polymer previously described) was coated using spin coater, heated at 130° C. for 10 minutes, and cooled to form an optically anisotropic layer. Hence, an optical compensatory sheet was prepared.

The sheet was observed by a polarizing microscope under cross-nicol. The sheet showed dark viewing when the rubbing direction was parallel to transmission axis of a polarizing plate, and the sheet showed almost colorless bright viewing when the rubbing direction was rotated from the transmission axis by 45 degrees. Hence, it was confirmed that the sheet had an orientation of negative monoaxis.

EXAMPLE 13

Preparation of Optical Compensatory Sheet

Procedures of Example 12 were repeated except for using DP-3 as the polymer having discotic structure and changing the heating temperature to the temperature set fort in Table 5 to prepare an optical compensatory sheet.

The sheet was observed by a polarizing microscope under cross-nicol.

EXAMPLE 14

Preparation of Optical Compensatory Sheet

Procedures of Example 12 were repeated except for using DP-4 as the polymer having discotic structure and changing the heating temperature to the temperature set fort in Table 5 to prepare an optical compensatory sheet.

The sheet was observed by a polarizing microscope under cross-nicol.

EXAMPLE 15

Preparation of Optical Compensatory Sheet

Procedures of Example 12 were repeated except for using DP-9 as the polymer having discotic structure and changing the heating temperature to the temperature set fort in Table 5 to prepare an optical compensatory sheet.

The sheet was observed by a polarizing microscope under cross-nicol.

EXAMPLE 16

Preparation of Optical Compensatory Sheet

Procedures of Example 12 were repeated except for using DP-12 as the polymer having discotic structure and changing the heating temperature to the temperature set fort in Table 5 to prepare an optical compensatory sheet.

The sheet (having optically anisotropic layer) was observed by a polarizing microscope under cross-nicol.

COMPARISON EXAMPLE 3

Preparation of Optical Compensatory Sheet

Procedures of Example 11 were repeated except for conducting no rubbing treatment to prepare an optical compensatory sheet.

The sheet was observed by a polarizing microscope under cross-nicol.

The obtained results were set forth in Table 5.

TABLE 5

| Example | Polymer No. | Temperature for heating (°C.) | Orientation of negative monoaxis |
|---|---|---|---|
| Ex. 12 | DP-1 | 130 | Observed |
| Ex. 13 | DP-3 | 60 | Observed |
| Ex. 14 | DP-4 | 150 | Observed |
| Ex. 15 | DP-9 | 100 | observed |
| Ex. 16 | DP-12 | 170 | Observed |
| Com. Ex. 3 | DP-1 | 130 | None |

As is apparent from results of Table 5, the uncured and cured optically anisotropic layers of Examples 12–16 have negative birefringence and inclined optic axis.

EXAMPLE 17

Preparation of Optical Compensatory Sheet

A 20 weight % dichloromethane solution of a polymer having discotic structure (DP-14; polymer previously described) was casted on a steel drum, and the casted polymer was continuously peeled from the drum. Subsequently, the peeled film was dried to prepare a film having a thickness of 10 μm. The film was heated at 130° C. for 10 minutes and cooled to prepare an heat-treated film.

The film was observed by a polarizing microscope under cross-nicol. The film showed dark viewing in all direction and therefore it was confirmed that the film was in non-oriented condition.

Subsequently, the film was stretched at 80° C. by almost four times in length-direction, and was gradually cooled with fixing the both ends to prepare a stretched film. It was confirmed that the stretched film was optically uniaxial and the discotic units of the film were almost oriented parallel to the film by X-ray analysis.

Further, the above film was passed between two rolls heated at 130° C. and having different peripheral speeds each other to prepare a squeezed film. The peripheral speeds were 3,500 cm/min. and 3.510 cm/min. It was confirmed that the squeezed film was optically uniaxial and has negative birefringence, and its optic axis was inclined at approx. 20 degrees from the normal of the film (i.e., the discotic units of the film were oriented) by X-ray analysis.

EXAMPLE 18

Preparation of Optical Compensatory Sheet

On a glass plate, an obliquely deposited SiO layer having an inclined angle of 45 degrees and a thickness of about 80 nm was formed.

A 10 weight % dichloromethane solution of a polymer having discotic structure (DP-13; polymer previously described) was coated on the obliquely deposited SiO layer, and dried to form a polymer layer. The resultant polymer layer was cloudy. The film was heated at 130° C. for 10 minutes and cooled to room temperature. The resultant polymer layer was transparent.

The film was observed by a polarizing microscope under cross-nicol. The film was an optically mono-domain layer. It was confirmed that the film was optically uniaxial and has negative birefringence and its optic axis was inclined at approx. 13 degrees from the normal of the film (i.e., the discotic units of the film were oriented) by X-ray analysis.

EXAMPLE 19

Preparation of Liquid Crystal Display

The optical compensatory sheet obtained in Example 18 was attached to TN-type liquid crystal cell that the product of the difference between an extraordinary ray and an ordinary ray of the liquid crystal and the clearance between the substrates of the liquid crystal cell was 480 nm, and the twisted angle of the liquid crystal was 90 degrees.

The obtained TN-LCD has a structure shown in FIG. 3.

Evaluation of Liquid Crystal Display

To the TN-LCD, a rectangular wave of 30 Hz was applied at a voltage of 0 to 5 V, and transmittances (T) were measured by varying viewing angle using a spectrophotometer (LCD-5000, available from Otsuka Electronics Co., Ltd.). From the measured data, the angle against the normal at which the contrast ($T_{OV}/T_{SV}$) on a black-and-white display showed 10 was defined as viewing angle and the viewing angles in a height (upper-lower) direction and a width (left-right) direction of the TN-LCD were determined.

Further, the TN-LCD having no optical compensatory sheet (Comparison Example 4) was evaluated in the same manner as above.

The obtained result is set forth in Table 6.

TABLE 6

| | Viewing Angle | |
|---|---|---|
| Example | upper-lower (degree) | left-right (degree) |
| Ex. 19 | 54–56 | 69–72 |
| Com. Ex. 4 | 23–27 | 33–36 |

We claim:

1. An optical compensatory sheet which comprises a transparent support, an orientation layer provided thereon and an optically anisotropic layer provided on the orientation layer, wherein the optically anisotropic layer has negative birefringence and comprises a polymer having a discotic structure in its molecule.

2. The optical compensatory sheet as defined in claim 1, wherein the polymer is a homopolymer of a polymerizable discotic compound having liquid crystalline property.

3. The optical compensatory sheet as defined in claim 1, wherein the polymer is a copolymer of a polymerizable discotic compound having liquid crystalline property and at least one polymerizable compound selected from the group consisting of compounds having the formula (9):

$$(E_{n6}D6(L6-P6)_{A6} \tag{9}$$

wherein D6 represents a benzene ring, a naphthalene ring, an anthracene ring, a pyrene ring, a phenanthrene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene, E represents an alkyl group, an alkoxy group, an oligo-oxyethylene group in which plural oxyethylenes are combined, an acyl group, an acyloxy group, a benzoyloxy group or a benzoyl group, P6 represents an isocyanato group, a thiocyanato group, an amino group, an alkylamino group, an arylamino group, a mercapto group, a formyl group, an acyl group, a hydroxy group, a carboxyl group, a sulfo group, a phosphoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L6 represents one divalent connective group selected from the group consisting of an alkylene group, an alkyleneoxy group, a phenylene group, and an alkylene group having carbonyl at one end, n6 represents an integer of 0 to 7 and k6 represents an integer of 1 to 8, under the condition of n6+k6≦8.

4. The optical compensatory sheet as defined in claim 2 or 3, wherein the polymerizable discotic compound having liquid crystalline property is at least one compound having liquid crystalline property selected from the group consisting of compounds having the formula (8):

wherein D5 represents a triphenylene ring, a truxene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene, B represents an alkyl group, an alkoxy group, an oligo-oxyethylene group in which plural oxyethylenes are combined, an acyl group, an acyloxy group, a benzoyloxy group or a benzoyl group, P6 represents an isocyanato group, P5 represents an isocyanato group, a thiocyanato group, an amino group, an alkylamino group, an arylamino group, a mercapto group, a formyl group, an acyl group, a hydroxy group, a carboxyl group, a sulfo group, a phosphoryl group, a halocarbonyl group, a halosulfonyl group, a halophosphoryl group, an acryloyl group, a vinyloxy group, an epoxy group, a methacryloyl group, an acetylene group, an allenyl group or a propargyl group, L5 represents a divalent connective group selected from the group consisting of an alkylene group, an alkyleneoxy group, a phenylene group, and an alkylene group having carbonyl at one end, n5 represents an integer of 0 to 7 and k5 represents an integer of 1 to 8, under the condition of n5+k5≦8.

5. The optical compensatory sheet as defined in claim 2 or 3, wherein the polymerizable discotic compound having liquid crystalline property has the formula (1), (2) or (3):

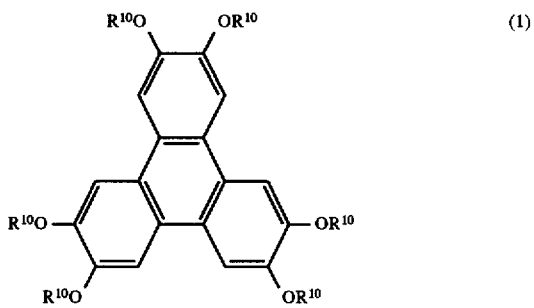 (1)

wherein $R^{10}$ is the following group:

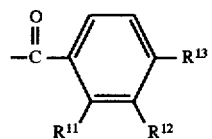

in which each of $R^{11}$ and $R^{12}$ represents independently a hydrogen atom or a methyl group, and $R^{13}$ represents an alkoxy group of 1 to 12 carbon atoms or the following group:

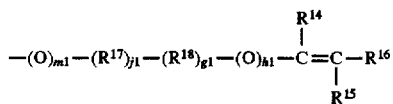

in which m1 represents 0 or 1, $R^{17}$ represents an alkyleneoxy group of 1 to 6 carbon atoms, j1 represents an integer of 0 to 4, $R^{18}$ represents an alkylene group of 1 to 12 carbon atoms, g1 represents an integer of 0 to 4, h1 represents 0 or 1, and each of $R^{14}$, $R^{15}$ and $R^{16}$ represents independently a hydrogen atom or an alkyl group of 1 to 12 carbon atoms;

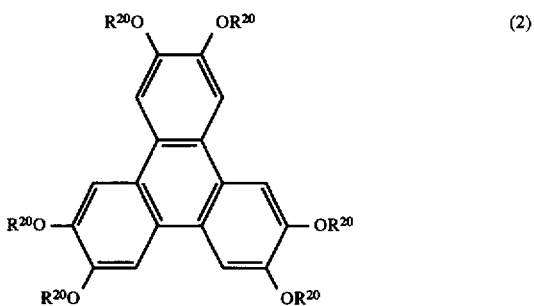 (2)

wherein $R^{20}$ is the following group:

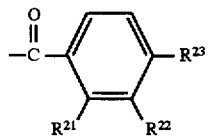

in which each of $R^{21}$ and $R^{22}$ represents independently a hydrogen atom or a methyl group, and $R^{23}$ represents an alkoxy group of 1 to 12 carbon atoms or the following group:

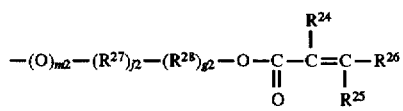

in which m2 represents 0 or 1, $R^{27}$ represents an alkyleneoxy group of 1 to 6 carbon atoms, j2 represents an integer of 0 to 4, $R^{28}$ represents an alkylene group of 1 to 12 carbon atoms, g2 represents an integer of 0 to 4, and each of $R^{24}$, $R^{25}$ and $R^{26}$ represents independently a hydrogen atom or an alkyl group of 1 to 12 carbon atoms;

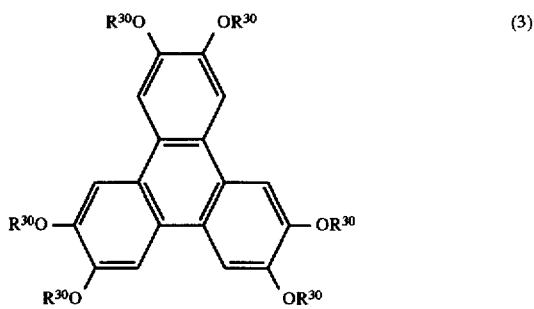 (3)

wherein $R^{30}$ is the following group:

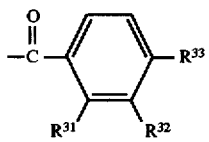

in which each of $R^{31}$ and $R^{32}$ represents independently a hydrogen atom or a methyl group, and $R^{33}$ represents an alkoxy group of 1 to 12 carbon atoms or the following group:

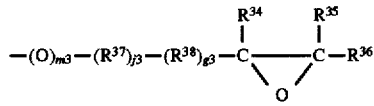

in which m3 represents 0 or 1, $R^{37}$ represents an alkyleneoxy group of 1 to 6 carbon atoms, j3 represents an integer of 0 to 4, $R^{38}$ represents an alkylene group of 1 to 12 carbon atoms, g3 represents an integer of 0 to 4, and each of $R^{34}$, $R^{35}$ and $R^{36}$ represents independently a hydrogen atom or an alkyl group of 1 to 12 carbon atoms.

6. The optical compensatory sheet as defined in claim 3, wherein the polymerizable compound of the formula (9) has the formula (4), (5) or (6):

wherein D1 represents a benzene ring or naphthalene ring, X represents a hydrogen atom, an alkyl group of 1 to 12 carbon atoms or an alkoxy group of 1 to 12 carbon atoms, k1 represents 1, 2 or 3 under the condition of n1+k1=6 when D1 represents a benzene ring and k1 represents 1, 2 or 3 under the condition of n1+k1=6 when D1 represents a naphthalene ring, s1 represents 0 or 1, L1 is the following group:

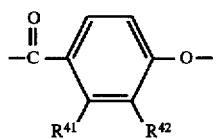

in which each of $R^{41}$ and $R^{42}$ represents independently a hydrogen atom or a methyl group, and P1 represents the following group:

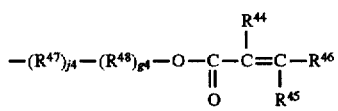

in which $R^{47}$ represents an alkyleneoxy group of 1 to 6 carbon atoms, j4 represents an integer of 0 to 4, $R^{48}$ represents an alkylene group of 1 to 12 carbon atoms, g4 represents an integer of 0 to 4, and each of $R^{44}$, $R^{45}$ and $R^{46}$ represents independently a hydrogen atom or an alkyl group of 1 to 12 carbon atoms;

wherein D2 represents a benzene ring or naphthalene ring, Y represents a hydrogen atom, an alkyl group of 1 to 12 carbon atoms or an alkoxy group of 1 to 12 carbon atoms, k2 represents 1, 2 or 3 under the condition of n2+k2=6 when D2 represents a benzene ring and k2 represents 1, 2 or 3 under the condition of n2+k2=6 when D2 represents a naphthalene ring, s2 represents 0 or 1, L2 is the following group:

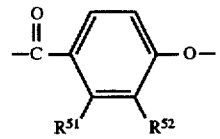

in which each of $R^{51}$ and $R^{52}$ represents independently a hydrogen atom or methyl group, and P2 represents the following group:

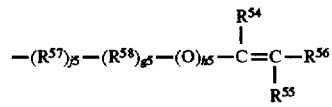

in which $R^{57}$ represents an alkyleneoxy group of 1 to 6 carbon atoms, j5 represents an integer of 0 to 4, $R^{58}$ represents an alkylene group of 1 to 12 carbon atoms, g5 represents an integer of 0 to 4, h5 represents 0 or 1, and each of $R^{54}$, $R^{55}$ and $R^{56}$ represents independently a hydrogen atom or an alkyl group of 1 to 12 carbon atoms;

wherein D3 represents a benzene ring or naphthalene ring, Z represents a hydrogen atom, an alkyl group of 1 to 12 carbon atoms or an alkoxy group of 1 to 12 carbon atoms, k3 represents 1, 2 or 3 under the condition of n3+k3=6 when D3 represents a benzene ring and k2 represents 1, 2 or 3 under the condition of n3+k3=6 when D3 represents a naphthalene ring, s3 represents 0 or 1, L3 is the following group:

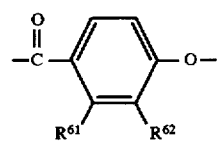

in which each of $R^{61}$ and $R^{62}$ represents independently a hydrogen atom or methyl group, and P3 represents the following group:

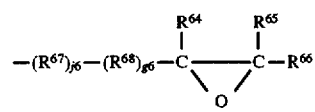

in which $R^{67}$ represents an alkyleneoxy group of 1 to 6 carbon atoms, j6 represents an integer of 0 to 4, $R^{68}$ represents an alkylene group of 1 to 12 carbon atoms, g6 represents an integer of 0 to 4, and each of $R^{64}$, $R^{65}$ and $R^{66}$ represents independently a hydrogen atom or an alkyl group of 1 to 12 carbon atoms.

7. The optical compensatory sheet as defined in claim 1, wherein the discotic structure is triphenylene ring, a, truxene ring, a trithiatruxene ring, a trioxatruxene ring, a hexaethyne substituted benzene ring, a colonene ring, a dibenzopyrene ring, an inositol ring, a phthalocyanine ring or a macrocycle ring of phenylacetylene.

8. A liquid crystal display comprising a liquid crystal cell which comprises a pair of substrates each of which is provided with a transparent electrode and twist-oriented or super twist-oriented nematic liquid crystal sealed therebetween, a polarizing sheet arranged on each side of the cell, and an optical compensatory sheet of claim 1 provided between at least one side of the liquid crystal cell and the polarizing sheet.

9. A process for preparation of an optical compensatory sheet having negative birefringence, which comprises the steps of:

coating a solution which contains a polymerizable discotic compound having liquid crystalline property, on an orientation layer provided on a transparent support to form a coated layer, heating the coated layer to form a discotic nematic phase, radiating light on the coated layer to cure, and cooling the cured layer.

10. A liquid crystalline composition which comprising a polymerizable discotic compound having liquid crystalline property and a polymerizable compound having the formula (4), (5) or (6):

$$(X)_{n1}D1[O—(L1)_{s1}—P1]_{k1} \qquad (4)$$

wherein D1 represents a benzene ring or naphthalene ring, X represents a hydrogen atom, an alkyl group of 1 to 12 carbon atoms or an alkoxy group of 1 to 12 carbon atoms, k1 represents 1, 2 or 3 under the condition of n1+k1=6 when D1 represents a benzene ring and k1 represents 1, 2 or 3 under the condition of n1+k1=8 when D1 represents a naphthalene ring, s1 represents 0 or 1, L1 is the following group:

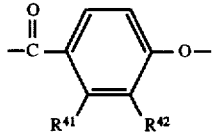

in which each of $R^{51}$ and $R^{52}$ represents independently a hydrogen atom or a methyl group, and P1 represents the following group;

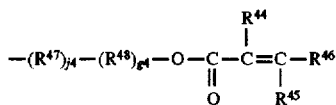

in which $R^{47}$ represents an alkyleneoxy group of 1 to 6 carbon atoms, j4 represents an integer of 0 to 4, $R^{48}$ represents an alkylene group of 1 to 12 carbon atoms, g4 represents an integer of 0 to 4, and each of $R^{44}$, $R^{45}$ and $R^{46}$ represents independently a hydrogen atom or an alkyl group of 1 to 12 carbon atoms;

$$(Y)_{n2}D2[O—(L2)_{s2}—P2]_{k2} \qquad (5)$$

wherein D2 represents a benzene ring or naphthalene ring, Y represents a hydrogen atom, an alkyl group of 1 to 12 carbon atoms or an alkoxy group of 1 to 12 carbon atoms, k2 represents 1, 2 or 3 under the condition of n2+k2=6 when D2 represents a benzene ring and k2 represents 1, 2 or 3 under the condition of n2+k2=8 when D2 represents a naphthalene ring, s2 represents 0 or 1, L2 is the following group:

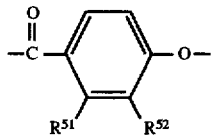

in which each of $R^{51}$ and $R^{52}$ represents independently a hydrogen atom or methyl group, and P2 represents the following group:

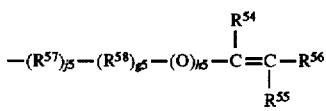

in which $R^{57}$ represents an alkyleneoxy group of 1 to 6 carbon atoms, j5 represents an integer of 0 to 4, $R^{58}$ represents an alkylene group of 1 to 12 carbon atoms, g5 represents an integer of 0 to 4, h5 represents 0 or 1, and each of $R^{54}$, $R^{55}$ and $R^{56}$ represents independently a hydrogen atom or an alkyl group of 1 to 12 carbon atoms;

$$(Z)_{n3}D3[O—(L3)_{s3}—P3]_{k3} \qquad (6)$$

wherein D3 represents a benzene ring or naphthalene ring, Z represents a hydrogen atom, an alkyl group of 1 to 12 carbon atoms or an alkoxy group of 1 to 12 carbon atoms, k3 represents 1, 2 or 3 under the condition of n3+k3=6 when D3 represents a benzene ring and k2 represents 1, 2 or 3 under the condition of n3+k3=8 when D3 represents a naphthalene ring, s3 represents 0 or 1, L3 is the following group:

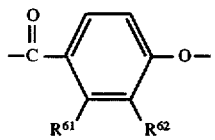

in which each of $R^{61}$ and $R^{62}$ represents independently a hydrogen atom or methyl group, and P3 represents the following group:

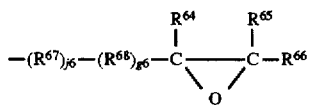

in which $R^{67}$ represents an alkyleneoxy group of 1 to 6 carbon atoms, j6 represents an integer of 0 to 4, $R^{68}$ represents an alkylene group of 1 to 12 carbon atoms, g6 represents an integer of 0 to 4, and each of $R^{64}$, $R^{65}$ and $R^{66}$ represents independently a hydrogen atom or an alkyl group of 1 to 12 carbon atoms.

11. The liquid crystalline composition as defined in claim 10, wherein the polymerizable discotic compound has the formula (1), (2) or (3):

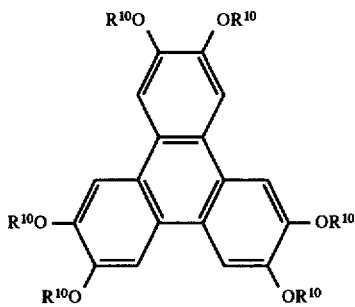
(1)

wherein $R^{10}$ is the following group:

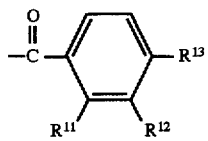

in which each of $R^{11}$ and $R^{12}$ represents independently a hydrogen atom or a methyl group, and $R^{13}$ represents an alkoxy group of 1 to 12 carbon atoms or the following group:

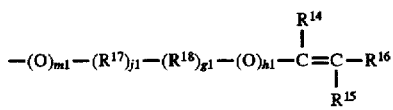

in which m1 represents 0 or 1, $R^{17}$ represents an alkyleneoxy group of 1 to 6 carbon atoms, j1 represents an integer of 0 to 4, $R^{18}$ represents an alkylene group of 1 to 12 carbon atoms, g1 represents an integer of 0 to 4, h1 represents 0 or 1, and each of $R^{14}$, $R^{15}$ and $R^{16}$ represents independently a hydrogen atom or an alkyl group of 1 to 12 carbon atoms;

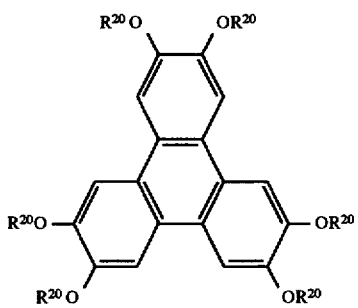
(2)

wherein $R^{20}$ is the following group:

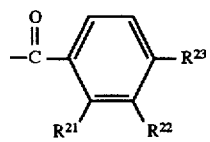

in which each of $R^{21}$ and $R^{22}$ represents independently a hydrogen atom or a methyl group, and $R^{23}$ represents an alkoxy group of 1 to 12 carbon atoms or the following group:

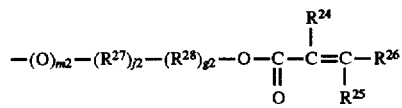

in which m2 represents 0 or 1, $R^{27}$ represents an alkyleneoxy group of 1 to 6 carbon atoms, j2 represents an integer of 0 to 4, $R^{28}$ represents an alkylene group of 1 to 12 carbon atoms, g2 represents an integer of 0 to 4, and each of $R^{24}$, $R^{25}$ and $R^{26}$ represents independently a hydrogen atom or an alkyl group of 1 to 12 carbon atoms;

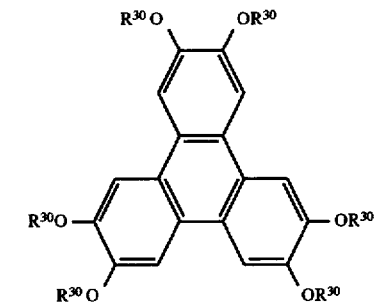
(3)

wherein $R^{30}$ is the following group:

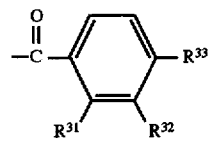

in which each of $R^{31}$ and $R^{32}$ represents independently a hydrogen atom or a methyl group, and $R^{33}$ represents an alkoxy group of 1 to 12 carbon atoms or the following group:

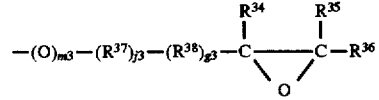

in which m3 represents 0 or 1, $R^{37}$ represents an alkyleneoxy group of 1 to 6 carbon atoms, j3 represents an integer of 0 to 4, $R^{38}$ represents an alkylene group of 1 to 12 carbon atoms, g3 represents an integer of 0 to 4, and each of $R^{34}$, $R^{35}$ and $R^{36}$ represents independently a hydrogen atom or an alkyl group of 1 to 12 carbon atoms.

12. A compound having the formula (7):

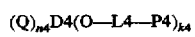
(7)

wherein D4 represents a benzene ring or naphthalene ring, Q represents a hydrogen atom, an alkyl group of 1 to 12 carbon atoms or an alkoxy group of 1 to 12 carbon atoms, k4 represents 1, 2 or 3 under the condition of n4+k4=6 when D4 represents a benzene ring and k4 represents 1, 2 or 3 under the condition of n4+k4=8 when D4 represents a naphthalene ring, L4 is the following group:

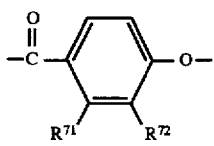

in which each of $R^{71}$ and $R^{72}$ represents independently a hydrogen atom or a methyl group, and P4 represents the following group:

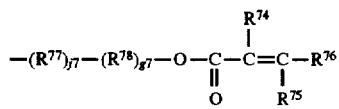

which $R^{77}$ represents an alkyleneoxy group of 1 to 6 carbon atoms, j7 represents an integer of 0 to 4, $R^{78}$ represents an alkylene group of 1 to 12 carbon atoms, g7 represents an integer of 0 to 4, and each of $R^{74}$, $R^{75}$ and $R^{76}$ represents independently a hydrogen atom or an alkyl group of 1 to 12 carbon atoms.

13. A compound having the formula (10):

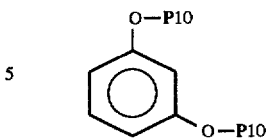
(10)

wherein P10 represents the following group:

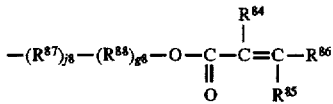

which $R^{87}$ represents an alkyleneoxy group of 1 to 6 carbon atoms, j8 represents an integer of 0 to 4, $R^{88}$ represents an alkylene group of 1 to 12 carbon atoms, g8 represents an integer of 0 to 4, and each of $R^{84}$, $R^{85}$ and $R^{86}$ represents independently a hydrogen atom or an alkyl group of 1 to 12 carbon atoms.

* * * * *